United States Patent
Semsey

(10) Patent No.: US 12,528,842 B2
(45) Date of Patent: Jan. 20, 2026

(54) METHOD OF PRODUCING TRANSDUCTION PARTICLES

(71) Applicant: SNIPR Biome ApS, Copenhagen (DK)

(72) Inventor: Szabolcs Semsey, Copenhagen (DK)

(73) Assignee: SNIPR Biome ApS, Copenhagen (DK)

( * ) Notice: Subject to any disclaimer, the term of this patent is extended or adjusted under 35 U.S.C. 154(b) by 1003 days.

(21) Appl. No.: 17/310,205

(22) PCT Filed: Jan. 27, 2020

(86) PCT No.: PCT/EP2020/051937
§ 371 (c)(1),
(2) Date: Jul. 26, 2021

(87) PCT Pub. No.: WO2020/152369
PCT Pub. Date: Jul. 30, 2020

(65) Prior Publication Data
US 2022/0162270 A1  May 26, 2022

(30) Foreign Application Priority Data

Jan. 27, 2019  (GB) ..................... 1901099

(51) Int. Cl.
| C07K 14/245 | (2006.01) |
| C12N 9/22 | (2006.01) |
| C12N 15/11 | (2006.01) |
| C12N 15/86 | (2006.01) |

(52) U.S. Cl.
CPC .............. *C07K 14/245* (2013.01); *C12N 9/22* (2013.01); *C12N 15/111* (2013.01); *C12N 15/86* (2013.01); *C12N 2310/20* (2017.05); *C12N 2795/00042* (2013.01)

(58) Field of Classification Search
CPC ...... C07K 14/245; C12N 9/22; C12N 15/111; C12N 15/86; C12N 2310/20; C12N 2795/00042; A61K 35/76
See application file for complete search history.

(56) References Cited

U.S. PATENT DOCUMENTS

| | | |
|---|---|---|
| 9,701,964 B2 | 7/2017 | Clube et al. |
| 10,195,273 B2 | 2/2019 | Clube |
| 10,300,138 B2 | 5/2019 | Clube |
| 10,300,139 B2 | 5/2019 | Clube |
| 10,363,308 B2 | 7/2019 | Clube et al. |
| 10,463,049 B2 | 11/2019 | Clube et al. |
| 10,506,812 B2 | 12/2019 | Clube |
| 10,524,477 B2 | 1/2020 | Clube et al. |
| 10,561,148 B2 | 2/2020 | Clube |
| 10,582,712 B2 | 3/2020 | Clube et al. |
| 10,596,255 B2 | 3/2020 | Clube |
| 10,603,379 B2 | 3/2020 | Clube et al. |
| 10,624,349 B2 | 4/2020 | Clube |
| 10,751,427 B2 | 8/2020 | Clube |
| 10,760,075 B2 | 9/2020 | Sommer et al. |
| 10,765,740 B2 | 9/2020 | Clube |
| 10,920,222 B2 | 2/2021 | Sommer et al. |
| 10,953,090 B2 | 3/2021 | Clube et al. |
| 11,141,481 B2 | 10/2021 | Clube |
| 11,147,830 B2 | 10/2021 | Clube |
| 11,291,723 B2 | 4/2022 | Clube |
| 11,351,252 B2 | 6/2022 | Clube |
| 11,400,110 B2 | 8/2022 | Clube |
| 11,421,227 B2 | 8/2022 | Sommer et al. |
| 11,471,530 B2 | 10/2022 | Clube |
| 11,471,531 B2 | 10/2022 | Clube et al. |
| 11,485,973 B2 | 11/2022 | Sommer et al. |
| 11,517,582 B2 | 12/2022 | Clube et al. |
| 11,547,716 B2 | 1/2023 | Clube |
| 11,578,333 B2 | 2/2023 | Martinez et al. |
| 11,612,617 B2 | 3/2023 | Clube |
| 11,629,350 B2 | 4/2023 | Martinez et al. |
| 11,642,363 B2 | 5/2023 | Clube et al. |
| 11,643,653 B2 | 5/2023 | Sommer et al. |
| 11,788,085 B2 | 10/2023 | Sommer et al. |
| 11,844,760 B2 | 12/2023 | Clube et al. |
| 11,851,663 B2 | 12/2023 | Martinez et al. |
| 11,891,629 B2 | 2/2024 | Clube |

(Continued)

FOREIGN PATENT DOCUMENTS

| WO | 00/69269 A1 | 11/2000 |
| WO | 01/93904 A1 | 12/2001 |

(Continued)

OTHER PUBLICATIONS

Krom et al. Engineered Phagemids for Nonlytic, Targeted Antibacterial Therapies. Nano Lett. Jul. 8, 2015;15(7):4808-13. (Year: 2015).*
Christie (Bacteriophage 6.1 (2016): e1145782) (Year: 2016).*
Ainsworth, S. et al. (May/Jun. 2014). "Differences In Lactococcal Cell Wall Polysaccharide Structure Are Major Determining Factors in Bacteriophage Sensitivity," mBio 5(3):e00880-14, 11 pages.
Baba, T. et al. (Feb. 2006). "Construction of *Escherichia coli* K-12 in-frame, Single-Gene Knockout Mutants: The Keio Collection," Molecular Systems Biology 10(21):1-11.
Bae, H.-W. et al. (2013). "Complete Genome Sequence of Pseudomonas aeruginosa Podophage MPK7, Which Requires Type IV Pili for Infection," Genome Announce 1(5):e00744-13, 1 page.
Baptista, C. et al. (Jul. 2008, e-pub. May 16, 2008). "C Phage SPP1 Reversible Adsorption to Bacillus Subtilis Cell Wall Teichoic Acids Accelerates Virus Recognition of Membrane Receptor Yueb," J Bacteriol 190(14):4989-4996.

(Continued)

*Primary Examiner* — Nancy J Leith
(74) *Attorney, Agent, or Firm* — MORRISON & FOERSTER LLP

(57) ABSTRACT

The invention relates to the production of transduction particles, such as phage, as well as compositions comprising the particles and use of these. The particles are particularly useful for delivering toxic payloads into target bacteria for antibacterial action. The invention is also useful for the production of wild-type ("native") phage and phage cocktails comprising different types of phage. Embodiments enable production of compositions of such particles for use in medical, environmental or food production settings.

20 Claims, 3 Drawing Sheets
Specification includes a Sequence Listing.

(56) References Cited

U.S. PATENT DOCUMENTS

| | | |
|---|---|---|
| 11,931,426 B2 | 3/2024 | Clube |
| 12,076,375 B2 | 9/2024 | Haaber et al. |
| 12,178,884 B2 | 12/2024 | Clube |
| 12,226,430 B2 | 2/2025 | Clube et al. |
| 12,318,445 B2 | 6/2025 | Clube |
| 2001/0026795 A1 | 10/2001 | Merril et al. |
| 2002/0001590 A1 | 1/2002 | Kelly et al. |
| 2002/0044922 A1 | 4/2002 | Mardh |
| 2002/0058027 A1 | 5/2002 | Nelson et al. |
| 2009/0155768 A1* | 6/2009 | Scholl .............. C12N 15/70 435/320.1 |
| 2016/0333348 A1 | 11/2016 | Clube et al. |
| 2017/0196225 A1 | 7/2017 | Clube et al. |
| 2017/0246221 A1 | 8/2017 | Clube et al. |
| 2018/0064114 A1 | 3/2018 | Clube |
| 2018/0064115 A1 | 3/2018 | Clube et al. |
| 2018/0070594 A1 | 3/2018 | Clube et al. |
| 2018/0084785 A1 | 3/2018 | Clube |
| 2018/0084786 A1 | 3/2018 | Clube |
| 2018/0140698 A1 | 5/2018 | Clube et al. |
| 2018/0146681 A1 | 5/2018 | Clube |
| 2018/0273940 A1 | 9/2018 | Sommer et al. |
| 2018/0303934 A1 | 10/2018 | Clube et al. |
| 2018/0326057 A1 | 11/2018 | Clube et al. |
| 2018/0326093 A1 | 11/2018 | Clube |
| 2019/0133135 A1 | 5/2019 | Clube |
| 2019/0134194 A1 | 5/2019 | Clube et al. |
| 2019/0160120 A1 | 5/2019 | Haaber |
| 2019/0230936 A1 | 8/2019 | Clube |
| 2019/0240325 A1 | 8/2019 | Clube |
| 2019/0240326 A1 | 8/2019 | Clube |
| 2019/0321468 A1 | 10/2019 | Clube |
| 2019/0321469 A1 | 10/2019 | Clube et al. |
| 2019/0321470 A1 | 10/2019 | Clube |
| 2020/0030444 A1 | 1/2020 | Clube |
| 2020/0068901 A1 | 3/2020 | Clube et al. |
| 2020/0077663 A1 | 3/2020 | Clube et al. |
| 2020/0085066 A1 | 3/2020 | Clube |
| 2020/0087660 A1 | 3/2020 | Sommer et al. |
| 2020/0115716 A1 | 4/2020 | Martinez et al. |
| 2020/0121787 A1 | 4/2020 | Clube |
| 2020/0128832 A1 | 4/2020 | Clube et al. |
| 2020/0164070 A1 | 5/2020 | Clube |
| 2020/0205416 A1 | 7/2020 | Clube |
| 2020/0254035 A1 | 8/2020 | Haaber |
| 2020/0267992 A1 | 8/2020 | Clube |
| 2020/0337313 A1 | 10/2020 | Clube et al. |
| 2020/0390886 A1 | 12/2020 | Clube |
| 2021/0009996 A1 | 1/2021 | Sommer et al. |
| 2021/0060180 A1 | 3/2021 | Clube |
| 2021/0113689 A1 | 4/2021 | Clube |
| 2021/0147827 A1 | 5/2021 | Clube |
| 2021/0147857 A1 | 5/2021 | Clube |
| 2021/0163960 A1 | 6/2021 | Martinez et al. |
| 2021/0189406 A1 | 6/2021 | Martinez et al. |
| 2021/0198665 A1 | 7/2021 | Sommer et al. |
| 2021/0230559 A1 | 7/2021 | Clube |
| 2021/0283167 A1 | 9/2021 | Clube |
| 2021/0290654 A1 | 9/2021 | Clube |
| 2021/0386773 A1 | 12/2021 | Clube |
| 2022/0233575 A1 | 7/2022 | Clube et al. |
| 2022/0241318 A1 | 8/2022 | Clube et al. |
| 2022/0259588 A1 | 8/2022 | Sommer et al. |
| 2022/0273696 A1 | 9/2022 | Clube |
| 2022/0275380 A1 | 9/2022 | Porse |
| 2022/0282245 A1 | 9/2022 | Sommer et al. |
| 2022/0290133 A1 | 9/2022 | Sommer et al. |
| 2022/0362280 A1 | 11/2022 | Clube |
| 2022/0387559 A1 | 12/2022 | Haaber et al. |
| 2023/0193241 A1 | 6/2023 | Clube et al. |
| 2023/0248822 A1 | 8/2023 | Clube |
| 2023/0330167 A1 | 10/2023 | Haaber |
| 2023/0364268 A1 | 11/2023 | Clube |
| 2024/0082289 A1 | 3/2024 | Clube et al. |
| 2024/0117323 A1 | 4/2024 | Clube |
| 2024/0141365 A1 | 5/2024 | Martinez et al. |
| 2024/0384279 A1 | 11/2024 | Munck et al. |
| 2025/0002942 A1 | 1/2025 | Semsey et al. |
| 2025/0043291 A1 | 2/2025 | Miere et al. |
| 2025/0049895 A1 | 2/2025 | Haaber et al. |
| 2025/0161345 A1 | 5/2025 | Clube et al. |
| 2025/0186479 A1 | 6/2025 | Clube et al. |
| 2025/0186625 A1 | 6/2025 | Clube |
| 2025/0205293 A1 | 6/2025 | Haaber et al. |
| 2025/0228884 A1 | 7/2025 | Clube et al. |

FOREIGN PATENT DOCUMENTS

| | | | |
|---|---|---|---|
| WO | 02/07742 A2 | 1/2002 | |
| WO | 2015/136541 A2 | 9/2015 | |
| WO | WO2018002940 A1 * | 1/2018 | ............ A61K 35/76 |
| WO | 2019/030257 A1 | 2/2019 | |
| WO | 2019/105821 A1 | 6/2019 | |
| WO | 2022/063986 A2 | 3/2022 | |

OTHER PUBLICATIONS

Bebeacua, C. et al. (Nov. 2013). "Structure, Adsorption to Host, and Infection Mechanism of Virulent Lactococcal Phage p2," J Virol 87(22):12302-12312.

Beveridge, T.J. et al. (Dec. 1991). "Surface Layers of Bacteria," Microbial Rev 55(4):684-705.

Black, P.N. (Jun. 1988). "The fadL Gene Product of *Escherichia coli* Is an Outer Membrane Protein Required for Uptake of Long-Chain Fatty Acids and Involved in Sensitivity to Bacteriophage T2," J Bacterial 170(6):2850-2854.

Bradbeer, C. et al. (1976), "Transport of Vitamin B12 in *Escherichia Coli*: Common Receptor System for Vitamin B12 and Bacteriophage BF23 on the Outer Membrane of the Cell Envelope," J Bacterial 125(3):1032-1039.

Braun, V. et al. (Aug. 1973). "Characterization of the Receptor Protein for Phage T5 and Colicin M in the Outer Membrane of *E. coli* B," FEBS Lett 34(1):77-80.

Braun, V. et al. (Sep. 27, 1973). "A Common Receptor Protein for Phage T5 and Colicin M in the Outer Membrane of *Escherichia coli* B," Biochim Biophys Acta 323(1):87-97.

Budzik, J.M. et al. (May 2004). "Isolation and Characterization of a Generalized Transducing Phage for Pseudomonas Aeruginosa Strains Pao1 and PA14," J Bacteriol 186(10):3270-3273.

Caro, L.G. et al. (May 12, 1966). "The Attachment ofthe Male-Specific Bacteriophage FI to Sensitive Strains of *Escherichia coli*," Proc. Natl Acad Sci USA 56:126-132.

Casjens, S.R. et al. (Feb. 2005). The Generalized Transducing *Salmonella bacteriophage* ES18: Complete Genome Sequence and DNA Packing Strategy, J. Bacteriology 187(3): 1091-1104.

Chapot-Chartier, M.-P. et al. (Apr. 2, 2010). "Cell Surface of Lactococcus lactis Is Covered by a Protective Polysaccharide Pellicle," J Biol Chem 285(14):10464-10471.

Chaturongakul, S. et al. (Aug. 20, 2014). "Phage-Host Interplay: Examples From Tailed Phages and Gram-Negative Bacterial Pathogens," Front Microbial 5(442):1-8.

Choi, Y. et al. (2013). "Identification and Characterization of a Novel Flagellum-Dependent *Salmonella*-Infecting Bacteriophage, iEPS5," Appl Environ Microb 79(16):4829-4837.

Click, E.M. et al. (Apr. 1998). "The TolQRA Proteins Are Required for Membrane Insertion of the Major Capsid Protein of the Filamentous Phage f1 During Infection," J Bacterial 180(7):1723-1728.

Clokie, M.R. et al. (Jan./Feb. 2011). "Phages in Nature," Bacteriophage 1(1):31-45.

Cronan, J.E. (Jan. 31, 2013). "Improved Plasmid-Based System for Fully Regulated Off-To-ON Gene Expression in *Escherichia coli*: Application to Production of Toxic Proteins," Plasmid 69(1):81-89, 17 pages.

Cvirkaite-Krupovic, V. (2010). "Entry of the Membrane-Containing Bacteriophages Into Their Hosts," Ph.D. Dissertation University of Helsinki., 52 pages.

(56) References Cited

OTHER PUBLICATIONS

Datsenko, K.A. et al. (Jun. 6, 2000). "One-Step Inactivation of Chromosomal Genes in *Escherichia coli* K-12 Using PCR Products," Proc. Natl. Acad. Sci. 97(12):6640-6645.

Datta, D.B. et al. (Sep. 1977). "Major Proteins of the *Escherichia coli* Outer Cell Envelope Membrane as Bacteriophage Receptors," J Bacterial 131(3):821-829.

Daugelavicius, R. et al. (Apr. 2005). "Penetration of Enveloped Double-Stranded RNA Bacteriophages <D13 and <D6 Into Pseudomonas syringae Cells," J Viral 79(8):5017-5026.

Daugelavicius, R. et al. (Aug. 1997). "The IncP Plasmid-Encoded Cell Envelope Associated DNA Transfer Complex Increases Cell Permeability," J Bacterial 179(16):5195-5202.

Davison, S. et al. (Oct. 2005). "Identification of the Bacillus anthracis γ Phage Receptor," J Bacterial 187(19):6742-6749.

Douglas, J.L. et al. (Apr. 1971). "Cell Wall Polymers and Phage Lysis of Lactobacillus plantarum," Biochemistry 10(9):1551-1555.

Dy, R.L. et al. (2014, e-pub. Jun. 27, 2014). "Remarkable Mechanisms in Microbes to Resist Phage Infections," Annu. Rev. Virol. 1(1):307-331.

Edwards, P. et al. (Sep. 1991). "A Transducing Bacteriophage for Caulobacter crescentus Uses the Paracrystalline Surface Layer Protein as a Receptor," J Bacterial 173(17):5568-5572.

Fehmel, F. et al. (1975). "*Escherichia coli* Capsule Bacteriophages VII. Bacteriophage 29-Host Capsular Polysaccharide Interactions," J Viral 16(3):591-601.

Feige, U. et al. (Jul. 1976). "On the Structure of the *Escherichia coli* C Cell Wall Lipopolysaccharide Core and on Its <DX174 Receptor Region," Biochem Bioph Res Co 71(2):566-573.

Filippov, A.A. et al. (Sep. 28, 2011). "Bacteriophage-Resistant Mutants in Yersinia pestis: Identification of Phage Receptors and Attenuation for Mice," PLoS One 6:e25486, 11 pages.

Frost, L.S. (1993). "Chapter 7: Conjugative Pili and Pilus-Specific Phages," Bacterial Conjugation pp. 189-221.

Gaidelyte, A. et al. (Apr. 2006). "The Entry Mechanism of Membranecontaining Phage Bam35 Infecting Bacillus thuringiensis," J Bacterial 188(16):5925-5934.

Garbe, J et al. (Dec. 2011). "Sequencing and Characterization of Pseudomonas Aeruginosa Phage JG004," BMC Microbial 11:102, 12 pages.

Garen, A et al. (1951). "First Two Steps of the Invasion of Host Cells by Bacterial Viruses," J Exp Med pp. 177-189.

GenBank: MF287367.1 "Red Recombinase Plasmid pKD46, Complete Sequence", Jul. 18, 2017, 5 pages.

German, G.J. et al. (May 11, 2001). "The ToIC Protein of *Escherichia coli* Serves as a Cell-Surface Receptor for the Newly Characterized TLS Bacteriophage," J Mol Biol 308(4):579-585.

Goldberg, E. et al. (1994). "Chapter 34: Recognition, Attachment and Injection," in Molecular Biology of Bacteriophage T4 Washington American Society for Microbiology pp. 347-356.

Guerrero-Ferreira, R.C. et al. (2011). "Alternative Mechanism for Bacteriophage Adsorption to the Motile Bacterium Caulobacter crescentus," P Natl Acad Sci USA pp. 1-7.

Hancock, R.E.W. et al. (1976). "Nature of the Energy Requirement for the Irreversible Adsorption of Bacteriophages T1 and F80 to *Escherichia coli*," J Bacteriol 125(2):409-415.

Hanlon, J.T. et al. (2001). "Suboptimal Prescribing in Older Inpatients and Outpatients," Drugs and Pharmacology pp. 10 page.

Hantke, K. (Jan. 1978). "Major Outer Membrane Proteins Of *E.coli* K12 Serve as Receptors for the Phages T2 (Protein la) and 434 (Protein lb)," Mol Gen Genet 164(2):131-135.

Hantke, K. et al. (Jan. 1975). "Membrane Receptor Dependent Iron Transport in *Escherichia coli*," FEES Lett. 49 (3):301-305.

Hantke, K. et al. (Jul. 1978). "Functional Interaction of the tonA/tonB Receptor System in *Escherichia coli*," J Bacterial 135(1):190-197.

Hashemolhosseini, S. et al. (Jul. 1994). "Alterations of Receptor Specificities of Coliphages of the T2 Family," J Mol Biol 240(2):105-110.

Heller, K. et al. (Jan. 1982). "Polymannose O-Antigens of *Escherichia coli*, the Binding Sites for the Reversible Adsorption of Bacteriophage T5+ Via the L-Shaped Tail Fibers," J Virol 41(1):222-227.

Heller, K.J. (Sep. 1992). "Molecular Interaction Between Bacteriophage and the Gram-Negative Cell Envelope," Arch Microbiol 158(4):235-248.

Henning, U. et al. (1994). "Chapter 23: Receptor Recognition by T-Even-Type Coliphages," Karam J.D. in Molecular Biology of Bacteriophage T4 Washington American Society for Microbiology pp. 291-298.

Heo, Y.-J et al. (2007). "Genome Sequence Comparison and Superinfection Between Two Related Pseudomonas aeruginosa Phages, D3112 and MP22," Microbiology 153:2885-2895.

Ho, T.D. et al. (Feb. 2001). "OmpC Is the Receptor for Gifsy-1 and Gifsy-2 Bacteriophages of *Salmonella*," J Bacteriol 183(4):1495-1498.

International Preliminary Report on Patentability, issued Jul. 27, 2021, for PCT Application No. PCT/EP2020/051937, filed Jan. 27, 2020, 9 pages.

International Search Report and Written Opinion, mailed Apr. 23, 2020, for PCT Application No. PCT/EP2020/051937, filed Jan. 27, 2020, 12 pages.

Iwashita, S. et al. (1973). "Smooth Specific Phage Adsorption: Endorhamnosidase Activity of Tail Parts of P22," Biochem Bioph Res Co 55(2):403-409.

Iwashita, S. et al. (Sep. 10, 1976). "Deacetylation Reaction Catalyzed by *Salmonella* Phage C341 and Its Baseplate Parts," J Biol Chem 251(17):5361-5365.

Jarrell, K.F. et al. (May 1981). "Isolation and Characterization of a Bacteriophage Specific for the Lipopolysaccharide of Rough Derivatives of Pseudomonas Aeruginosa Strain Pao," J Virol 38(2):529-538.

Kaneko, J.N. et al. (Jul. 2009). "Identification of ORF636 in Phage <DSLT Carrying Panton-Valentine Leukocidin Genes, Acting as an Adhesion Protein for a Poly(Glycerophosphate) Chain of Lipoteichoic Acid on the Cell Surface of *Staphylococcus aureus*," J. Bacteriol 191(14):4674-4680.

Killmann, H. et al. (Jun. 2001). "FhuA Barrel-Cork Hybrids Are Active Transporters and Receptors," J Bacteriol 183(11):3476-3487.

Kim, M. et al. (2012, e-pub. Aug. 29, 2012). "Spontaneous and Transient Defence Against Bacteriophage By Phase-Variable Glucosylation of O-Antigen in *Salmonella enterica* serovar Typhimurium," Mol Microbiol 86(2):411-425.

Kivela, H.M. et al. (Feb. 2008, e-pub. Dec. 14, 2007). "Genetics for Pseudoalteromonas Provides Tools to Manipulate Marine Bacterial Virus PM2," J Bacteriol 190(4):1298-1307.

Kuo, C.-J. et al. (Aug. 12, 2016). "Mutation of the Enterohemorrhagic *Escherichia coli* Core LPS Biosynthesis Enzyme RfaD Confers Hypersusceptibility to Host Intestinal Innate Immunity in vivo," Frontiers in Cellular and Infection Microbiology 6(82):1-14.

Le, S et al. (Jul. 9, 2013). "Mapping the Tail Fiber as the Receptor Binding Protein Responsible for Differential Host Specificity of Pseudomonas aeruginosa Bacteriophages PaP1 and JG004," Plos One 8(7): e68562, 8 pages.

León, M. et al. (Apr. 23, 2015). "Virulence Reduction in Bacteriophage Resistant Bacteria," Frontiers in Microbiology 6(343):1-7.

Letarov, A.V. et al. (2017). "Adsorption of Bacteriophages on Bacterial Cells," Biochemistry 82(13):1632-1658.

Lindberg, A.A (1973). "Bacteriophage Receptors," Annu Rev Micro Biol 27:205-241.

Lindberg, A.A et al. (Jul. 1978). "Interaction Between Bacteriophage Sf6 and Shigella flexneri," J Virol 27(1):38-44.

Lindberg, A.A. (1977). "Chapter 8: Bacterial Surface Carbohydrates and Bacteriophage Adsorption," in Sutherland I Surface Carbohydrates of the Prokaryotic Cell London Academic Press pp. 289-356.

Loeb, T. (Mar. 1960). "Isolation of a Bacteriophage Specific For The F+ and Hfr Mating Types of *Escherichia coli* K-12," Science 131(3404):932-933.

Manning, P.A. et al. (1978). "Outer Membrane Proteins of *Escherichia coli* K-12: Isolation of a Common Receptor Protein for Bacteriophage T6 and colicin K," Mol Gen Genet 158(3):279-286.

(56) References Cited

OTHER PUBLICATIONS

Manning, P.A. et al. (Sep. 1976). "Outer Membrane of *Escherichia coli* K-12: Differentiation of Proteins 3A and 3B on Acrylamide Gels and Further Characterization of con (tolG) Mutants," J Bacteriol 127(3):1070-1079.

Marti, R. et al. (2013, e-pub. Jan. 15, 2013). "Long Tail Fibres of the Novel Broad-Host-Range T-Even Bacteriophage S16 Specifically Recognize Salmonella OmpC," Mol Microbiol 87(4):818-834.

Meadow, P.M. et al. (1978). "Receptor Sites for R-Type Pyocins and Bacteriophage E79 in the Core Part of the Lipopolysaccharide of Pseudomonas Aeruginosa PACI," J Gen Microbiol 108:339-343.

Mindich, L. et al. (Aug. 1999). "Isolation of Additional Bacteriophages With Genomes of Segmented Double-Stranded RNA," J Bacteriol 181(15):4505-4508.

Molineux, I.J. (2001). "No Syringes Please, Ejection of Phage T7 DNA From the Virion Is Enzyme Driven," Mol. Microbiol 40(1):1-8.

Molineux, I.J. et al. (Mar. 2013, e-pub. Feb. 4, 2013). "Popping the Cork: Mechanism of Phage Genome Ejection," Nat Rev Microbiol 11:194-204.

Monteville, M.R. et al. (Sep. 1994). "Lactococcal bacteriophages Require a Host Cell Wall Carbohydrate and a Plasma Membrane Protein for Adsorption and Ejection of DNA," Appl Environ Microb 60(9):3204-3211.

Morona, R, et al. (Aug. 1984). "Host Range Mutants of Bacteriophage Ox2 Can Use Two Different Outer Membrane Proteins of *Escherichia coli* K-12 as Receptors," J Bacterial 159(2):579-582.

Morona, R. et al. (Nov. 1986). "New Locus (ttr) in *Escherichia coli* K-12 Affecting Sensitivity to Bacteriophage T2 and Growth on Oleate as the Sole Carbon Source," J Bacterial 168(2):534-540.

Munsch-Alatossava, P. et al. (Dec. 24, 2013). "The Extracellular Phage-Host Interactions Involved in the Bacteriophage LL-H Infection of *Lactobacillus delbrueckii* ssp. lactis ATCC 15808," Front Microbial 4(408):1-5.

Mutoh, N. et al. (Nov. 1978). "Role of Lipopolysaccharide and Outer Membrane Protein of *Escherichia coli* K-12 in the Receptor Activity for Bacteriophage T4," J Bacterial 136(2):693-699.

Pickard, D. et al. (Nov. 2010, e-pub. Sep. 3, 2010). "A Conserved Acetyl Esterase Domain Targets Diverse Bacteriophages to the Vi Capsular Receptor of *Salmonella enterica* Serovar Typhi," J Bacterial 192(21):5746-5754.

Picken, R.N. et al. (1977). "Bacteriophage-Resistant Mutants of *Escherichia coli* K12. Location of Receptors Within the Lipopolysaccharide," J Gen Microbiol 102:305-318.

Pires, D.P. et al. (Jun. 1, 2016). "Genetically Engineered Phages: A Review of Advances Over the Last Decade," Microbiology and Molecular Biology Reviews 80(3):523-543.

Prehm, P. et al. (1976). "On a Bacteriophage T3 and T4 Receptor Region Within the Cell Wall Lipopolysaccharide Of *Escherichia coli* B," J Mol Biol 101:277-281.

Quiles-Puchalt, N et al. (Apr. 22, 2014). "*Staphylococcal* Pathogenicity Island DNA Packaging System Involving Cos-Site Packaging and Phage-Encoded HNH Endonucleases," Proc. Natl. Acad. Sci. USA 111(16):6016-6021.

Rakhuba, D.V. et al. (2010). "Bacteriophage Receptors, Mechanisms of Phage Adsorption and Penetration Into Host Cell Pol," J Microbiol 59(3):145-155.

Randall-Hazelbauer, L. et al. (Dec. 1973). "Isolation of the Bacteriophage Lambda Receptor From *Escherichia coli*," J Bacterial 116(3):1436-1446.

Reske, K. et al. (1973). "Enzymatic Degradation of O-Antigenic Lipopolysaccharides by Coliphage 08," Eur J Biochem 36(1):167-171.

Ricci, V. et al. (Mar. 2010, e-pub. Jan. 15, 2010). "Exploiting the Role of TolC in Pathogenicity: Identification of a Bacteriophage for Eradication of *Salmonella serovars* from Poultry," Applied and Envir. Microbiology 76(5):1704-1706.

Roa, M. (Nov. 1979). "Interaction of Bacteriophage K10 With Its Receptor, The lamB Protein of *Escherichia coli*," J Bacterial 140(2):680-686.

Russel, M. et al. (Nov. 1988). "Low-Frequency Infection of F-Bacteria by Transducing Particles of Filamentous Bacteriophages," J Bacterial 170(11):5312-5316.

Sandulache, R. et al. (1985). "The Cell Wall Receptor for Bacteriophage Mu G(-) in Erwinia and *Escherichia coli* C," FEMS Microbiol Lett 28:307-310.

Sandulache. R. et al. (Oct. 1984). "Cell Wall Receptor for Bacteriophage Mu G(+)," J Bacterial 160(1):299-303.

São-José, C. et al. (Dec. 2004). "Bacillus subtilis Operon Encoding a Membrane Receptor for Bacteriophage SPP1," J Bacterial 186(24):8337-8346.

Schade, S.Z. et al. (Jun. 1967). "How Bacteriophage x Attacks Motile Bacteria," J Virol 1(3):599-609.

Schwartz, M. (1980). "Chapter 4: Interaction of Phages With Their Receptor Proteins," Virus Receptors pp. 59-94.

Shaw, D.R.D. et al. (Oct. 1971). "O-Acetyl Groups as a Component of the Bacteriophage Receptor On *Staphylococcus aureus* Cell Walls," J Bacterial 108(1):584-585.

Shin, H. et al. (Aug. 21, 2012). "Receptor Diversity and Host Interaction of Bacteriophages Infecting *Salmonella enterica* Serovar Typhimurium," PLoS One 7(8):e43392, 11 pages.

Skurray, R.A. et al. (Sep. 1974). "Con- Mutants: Class of Mutants in *Escherichia coli* K-12 Lacking a Major Cell Wall Protein and Defective in Conjugation and Adsorption of a Bacteriophage," J Bacterial 119(3):726-735.

Stirm, S. et al. (Sep. 1971). "Bacteriophage Particles With Endo-Glycosidase Activity," J Virol 8(3):343-346.

Sukupolvi, S. (1984). "Role of Lipopolysaccharide in the Receptor Function for Bacteriophage Ox2," FEMS Microbial Lett 21:83-87.

Takeda, K. et al. (1973). "Receptor Splitting Enzyme of *Salmonella* Phage e34," Annu Rep Inst Virus Res 16:25-26.

Temple, G.S. et al. (1986). "Isolation and Characterization of a Lipopolysaccharide-Specific Bacteriophage of Pseudomonas aeruginosa," Microbios. 45(183):81-91.

Thurow, H. et al. (May 1975). "Bacteriophage-Borne Enzymes in Carbohydrate Chemistry: Part I—On the Glycanase Activity Associated With Particles of Klebsiella Bacteriophage No. 11," Carbohyd Res 41(1):257-271.

Van Alphen, L. et al. (Mar. 1977). "Major Outer Membrane Protein d of *Escherichia coli* K12: Purification and In Vitro Activity of Bacteriophage k3 and f-pilus Mediated Conjugation," FEBS Lett 75(1):285-290.

Verhoef, C. et al. (1977). "Mapping of a Gene for a Major Outer Membrane Protein of *Escherichia coli* K12 With the Aid of a Newly Isolated Bacteriophage," Mol Gen Genet. 150:103-105.

Mdaver, AK. et al. (May 1973). "Bacteriophage <D6: a Lipid-Containing Virus of Pseudomonas phaseolicola," J Viral 11(5):799-805.

Vinga, I. et al. (2006). "Chapter 9: Bacteriophage Entry in the Host Cell," in Modern Bacteriophage Biology and Biotechnology 1:165-205.

Wayne, R. et al. (Feb. 1975). "Evidence for Common Binding Sites for Ferrichrome Compounds and Bacteriophage F80 in the Cell Envelope of *Escherichia coli*," J Bacteriol 121(2):497-503.

Wendlinger, G. et al. (1996). "Bacteriophage Receptors on Listeria monocytogenes Cells are the N-Acetylglucosamine and Rhamnose Substituents of Teichoic Acids or the Peptidoglycan Itself," Microbiology 142:985-992.

Wright, A. et al. (1980). "Chapter 3: Lipopolysaccharide as a Bacteriophage Receptor," in Virus Receptors London Chapman & Hall pp. 27-57.

Xia, G. et al. (Aug. 2011, e-pub. Jun. 3, 2011). "Wall Teichoic Acid-Dependent Adsorption of *Staphylococcal siphovirus* and myovirus," J Bacteriol 193(15):4006-4009.

Xiang, Y. et al. (May 15, 2009). "Crystallographic Insights Into the Autocatalytic Assembly Mechanism of a Bacteriophage Tail Spike," Mol Cell 34:375-386.

Yokota, S.-I. et al. (Sep. 1994). "Identification of the Lipopolysaccharide Core Region as the Receptor Site for a Cytotoxin-Converting Phage, FCTX, of Pseudomonas aeruginosa," J Bacteriol 176(17):5262-5269.

\* cited by examiner

METHOD OF PRODUCING TRANSDUCTION PARTICLES

CROSS REFERENCE TO RELATED APPLICATIONS

This application is a national stage application under 35 U.S.C. § 371 of International Application No. PCT/EP2020/051937, filed internationally on Jan. 27, 2020, which claims priority to Great Britain Patent Application No. 1901099.0, filed Jan. 27, 2019.

SUBMISSION OF SEQUENCE LISTING ON ASCII TEXT FILE

The content of the following submission on ASCII text file is incorporated herein by reference in its entirety: a computer readable form (CRF) of the Sequence Listing (file name: 786212001000SEQLIST.TXT, date recorded: Jul. 19, 2021, size: 5,848 bytes).

BACKGROUND

The use of helper phage to package phagemid DNA into phage virus particles is known. An example is the M13KO7 helper phage, a derivative of M13, used in *E coli* host cells. Other examples are R408 and CM13.

Bacteriophages (phages) are a phylum of viruses that infect bacteria and are distinct from the animal and plant viruses. Phages can have either a "lytic" life cycle, a "lysogenic" life cycle that can potentially become lytic, or a "non-lytic" life cycle. Phages replicating through the lytic cycle cause lysis of the host target bacterial cell as a normal part of their life cycles. Phages replicating through the lysogenic cycles are called temperate phages. These can either replicate by means of the lytic life cycle and cause lysis of the host bacterium, or they can incorporate their DNA into the host bacterial DNA and become noninfectious prophages. Bacteriophages are bacterial viruses that only infect and multiply within their specific bacterial hosts. Host specificity is generally found at strain level, species level, or, more rarely, at genus level. This specificity allows for directed targeting of dangerous bacteria using phages. The adsorption of bacteriophages onto host cells is, in all but a few rare cases, a sine qua non condition for the onset of the infection process.

The natural capability of phages to infect and kill bacteria, together with the specificity of the phage-bacterial interactions, is the basic phenomena on which the concept of phage therapy is built. Therefore, phages that possess lytic life cycle are suitable candidates for phage therapy. The use of phage in food production has recently become an option for the food industry as a novel method for biocontrol of unwanted pathogens, enhancing the safety of especially fresh and ready-to-eat food products.

PCT/EP2018/082053 and U.S. Ser. No. 15/985,658 disclose the production of non-replicative transduction particles. PCT/EP2018/071454 discloses methods of transduction particle propagation.

International Patent Application No. WO 00/69269 discloses the use of certain phage strain for treating infections caused by Vancomycin-sensitive as well as resistant strains of *Enterococcus faecium*, and International Patent Application No. WO 01/93904 discloses the use of bacteriophage, alone or in combination with other anti-microbial means, for preventing or treating gastrointestinal diseases associated with the species of the genus *Clostridium*.

US Patent Application No. 2001/0026795 describes methods for producing bacteriophage modified to delay inactivation by the host defense system, and thus increasing the time period in which the phage is active in killing the bacteria.

US Patent Application No. 2002/0001590 discloses the use of phage therapy against multi-drug resistant bacteria, specifically methicillin-resistant *Staphylococcus aureus*, and International Patent Application No. WO 02/07742 discloses the development of bacteriophage having multiple host range.

The use of phage therapy for the treatment of specific bacterial-infectious disease is disclosed, for example, in US Patent Application Nos. 2002/0044922; 2002/0058027 and International Patent Application No. WO 01/93904.

US20160333348 describes the use of CRISPR/Cas systems delivered to host target bacterial cells using phage as vectors.

The commercial scale production of bacteriophage compositions for therapeutic use is still limited. In current techniques, the titer of the phage composition is low, usually in the range of $10^9$-$10^{11}$ pfu/ml on a laboratory scale, and $10^7$-$10^9$ on a commercial scale, whereas the titer typically required for phage therapy is $10^{12}$ pfu/ml. Additionally, to reach the desirable titer, very large volumes of liquid are required.

As transduction particle (eg, bacteriophage) use in industrial and medical settings grows there is a need for commercial quantities of such particles. Therefore, there is a need for a method for production of transduction particles that provides good yield titer and/or reduces manufacturing volume.

TECHNICAL FIELD

The invention relates to the production of transduction particles, such as phage, as well as compositions comprising the particles and use of these. The particles are particularly useful for delivering toxic payloads into target bacteria for antibacterial action. The invention is also useful for the production of wild-type ("native") phage and phage cocktails comprising different types of phage. Embodiments enable production of compositions of such particles for use in medical, environmental or food production settings.

SUMMARY OF THE INVENTION

The invention provides:—
In a First Configuration
A method of producing transduction particles wherein the particles are capable of recognising a receptor on bacterial target cells for transduction of the cells, the method comprising producing the particles in bacterial producer cells, wherein the producer cells do not express the receptor on their surface.
In a Second Configuration
Use of the producer cells, for enhancing the production yield of transduction particles.
In a Third Configuration
A composition (optionally a pharmaceutical composition) comprising transduction particles obtained or obtainable by the method or use of the invention.
In a Fourth Configuration
A method of killing bacterial target cells, the method comprising contacting the cells with a composition according to the invention, wherein transduction particles infect the cells and introduce therein a nucleic acid or nucleotide sequence of interest (NSI), wherein the NSI comprises or encodes an antibacterial agent that kills the target cells, or wherein the NSI comprises or encodes a component of such an agent.

In a Fifth Configuration

A composition according to the invention for use in a method of treating or preventing a disease or condition in a human or animal subject, wherein the disease or condition is mediated by bacterial target cells, the method comprising administering the composition to the subject and contacting the target cells with a composition, whereby target cells are killed or the growth or proliferation of target cells is inhibited, thereby treating or preventing the disease or condition.

In a Sixth Configuration

A plurality of transduction particles obtainable by the method.

"Transduction particles" may be phage or smaller than phage and are particles that are capable of transducing nucleic acid (eg, encoding an antibiotic or component thereof) into target cells. Examples of transduction particles are phage or particles comprising a phage capsid. In an example, each particle is a replication-defective phage particle. In an example, each particle is a particle produced from a genomic island (eg, a pathogenicity island such as a SaPI) or a modified version thereof.

BRIEF DESCRIPTION OF THE DRAWINGS

FIG. 2: Transduction of *E. coli* C1a cells by the lysates prepared from wild type (WT) and from phage receptor mutant (ArfaD) cells.

DETAILED DESCRIPTION

Figure 1:
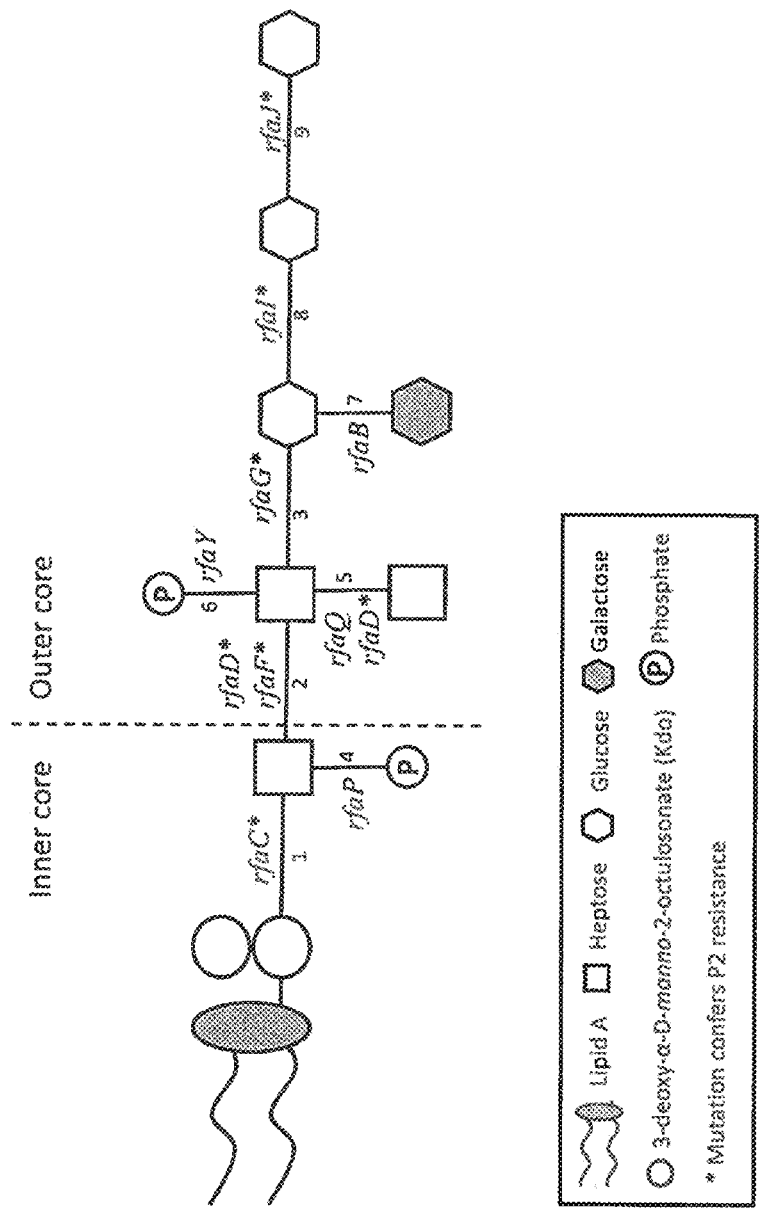
FIG. 1: The LPS core biosynthesis pathway of *E. coli* (ecocyc.org). Numbers indicate the sequence of synthesis. Genes involved in the pathway were individually knocked out and P2 phage propagation was tested on each mutant. Genes which are essential for P2 plaque formation are marked with a star.

The invention relates to the production of transduction particles, such as phage, as well as compositions comprising the particles and use of these. The particles are particularly useful for delivering toxic payloads into target bacteria for antibacterial action. The invention is also useful for the production of wild-type ("native") phage and phage cocktails comprising different types of phage. Embodiments enable production of compositions of such particles for use in medical, environmental or food production settings. Transduction particles, eg, phage, can be used in compositions, such as medicaments, herbicides and other agents where such particles may usefully be used. Thus, the invention provides the following Clauses and embodiments.

CLAUSES

1. A method of producing transduction particles wherein the particles are capable of recognising a receptor on bacterial target cells for transduction of the cells, the method comprising producing the particles in bacterial producer cells, wherein the producer cells do not express the receptor on their surface.

The particles can be capable of attaching to the receptor when surface expressed on target cells. In an example, the particles attach to the receptor on target cells and transduce DNA into the target cells. In an embodiment, the DNA comprises a NSI. In an example, the particles are phage-like or are phage. For example, the particles comprise a phage capsid in which the DNA is packaged.

In an example, the producer and target cells are bacterial cells. In another example, they are archaeal cells.

The producer cells are different from the target cells. At least, they differ in that the former do not (or substantially do not) surface express the receptor and the latter do.

2. The method of Clause 1, wherein the producer and target cells are cell of the same species.

Optionally the producer and target cells are cell of the same strain, with the exception that the target cells surface express the receptor.

3. The method of any preceding Clause, wherein the producer cells are *E. coli* cells.

In an example the cells are *E. coli* Nissle or K-12 (eg, K-12 MG1655) cells.

In an example, each producer cell comprises a nucleic acid comprising a nucleic acid sequence of interest (NSI), a phage packaging sequence (eg, pac or cos or a homologue thereof) and an origin of replication. In an embodiment, nucleic acid is a phagemid of plasmid. The nucleic acid is packaged in the producer cell to produce the particles of the invention. In an embodiment, the producer cell comprises the genome of a helper virus or phage which is used to provide essential functions required for packaging and/or replicating the nucleic acid in the producer cell. The skilled person will be familiar with helper viruses and helper phage.

In an example, each producer cell comprises (i) a helper phage genome; and (ii) a nucleic acid comprising a nucleic acid sequence of interest (NSI), a phage packaging sequence (eg, pac or cos), an origin of replication and optionally one or more nucleotide sequences each encoding a helper phage transactivation factor for activating the helper phage. In an embodiment, component (i) is comprised by the nucleic acid (ii). In an embodiment, nucleic acid (ii) is a phagemid of plasmid.

In an embodiment, the NSI encodes a protein of interest (POI), eg, an enzyme, a nuclease, an antibiotic, an antigen binding site, a marker (eg, an antibiotic marker or fluorescence marker) or a medicament or component thereof.

4. The method of any preceding Clause, wherein the transduction particles comprise a phage capsid, wherein the capsid comprises a packaged nucleic acid of interest (NSI) for transduction into target bacterial cells.

In an example, the NSI is comprised by a phagemid. In an example, the NSI is comprised by a plasmid.

5. The method of Clause 4, wherein the NSI comprises or encodes an antibacterial agent that kills target cells, or wherein the NSI comprises or encodes a component of such an agent.

6. The method of Clause 5, wherein the NSI comprises a nucleotide sequence encoding a guide RNA (optionally a single guide RNA) of a CRISPR/Cas system.

Optionally, the guide comprises a spacer sequence that is capable of hybridising to a protospacer sequence comprised by target cells. In one embodiment, the target cells comprise endogenously active Cas (eg, Cas 3 or Cas9) that is operable with the guide RNA in the target cells to guide the Cas to the cognate protospacer sequence for modification (eg, cutting)

of the sequence, and optionally killing of the target cell. In another embodiment, the Cas is instead or additionally encoded by DNA transduced into the target cell by the particle of the invention.

7. The method of any preceding Clause, wherein the transduction particles are phages.
8. The method of any preceding Clause, wherein the transduction particles are non-self-replicative.
9. The method of any preceding Clause, wherein the genome of each producer cell comprises a genetic modification that disrupts synthesis of the receptor and/or its expression as a cell surface receptor.

In an example, each producer cell is a rfa mutant, eg, wherein the producer cell is an *E coli* cell. In an embodiment, the rfa is rfaC. In an embodiment, the rfa is rfaD. In an embodiment, the rfa is rfaF. In an embodiment, the rfa is rfaG. In an embodiment, the rfa is rfaI. In an embodiment, the rfa is rfa J. See FIG. 1, for example.

Optionally there is a disruption of a rfa gene in the genome (eg, chromosome) of the producer cell, eg, rfaC, rfaD, rfaE, rfaF, rfaG, rfaP, rfaQ, rfaY, rfaB, rfaI or rfaJ. Optionally, the disruption is a disruption (eg, deletion) of rfaD and/or rfaE. Optionally, the producer cell here is an *E coli* cell. The disruption may be a knock-out of the gene, insertion of a heterologous nucleotide sequence in the gene, one or mutations (eg, deletions, substitutions or additions, or any combination in the gene) that renders the gene non-functional for production of the receptor, a component of the receptor, or a gene product that is essential for receptor production in the producer cell. Standard molecular biology techniques for effecting this will be apparent to the skilled person.

10. The method of Clause 9, wherein the modification is a modification of a lipopolysaccharide (LPS) synthesis pathway.
11. The method of any preceding Clause, wherein the receptor comprises a LPS.

In an example, the receptor is any receptor mentioned in Tables 1-3 or otherwise mentioned herein. In an example, the particles comprise P2 phage capsids and the receptor is a P2 receptor.

12. Use of producer cells as defined in any preceding Clause, for enhancing the production yield of transduction particles.
13. The use of Clause 12, wherein the transduction particles are as defined in any one of Clauses 1 to 11.
14. The use of Clause 12 or 13, for increasing the yield at least 10-fold compared to production in producer cells that surface express the receptor.
15. The use of Clause 14, wherein the increase is at least 100-fold.
16. The use of Clause 14, wherein the increase is 10-1000-fold.
17. The method or use of any preceding Clause, comprising isolating the transduction particles from cellular material.
18. A composition (optionally a pharmaceutical composition) comprising transduction particles obtained or obtainable by the method or use of Clause 17.

Optionally the composition comprises an antibiotic that kills or is toxic to the target cells.

19. The composition according to Clause 18, wherein the composition comprises no producer cell LPS.
20. A method of killing bacterial target cells, the method comprising contacting the cells with a composition according to Clause 18 or 19, wherein transduction particles infect the cells and introduce therein a NSI, wherein the NSI comprises or encodes an antibacterial agent that kills the target cells, or wherein the NSI comprises or encodes a component of such an agent.

Optionally, any method or use of the composition, population or particles of the invention is a method or use in vitro or ex vivo. Optionally, the method or use is not performed in or on a human or animal. Optionally, the method or use is performed in or on a human or animal tissue, cell or serum sample in vitro.

21. A composition according to Clause 18 or 19 for use in a method of treating or preventing a disease or condition in a human or animal subject, wherein the disease or condition is mediated by bacterial target cells, the method comprising administering the composition to the subject and contacting the target cells with a composition according to Clause 18 or 19, whereby target cells are killed or the growth or proliferation of target cells is inhibited, thereby treating or preventing the disease or condition.
22. The composition of Clause 21, wherein transduction particles comprised by the composition infect the target cells and introduce therein a NSI, wherein the NSI comprises or encodes an antibacterial agent that kills the target cells, or wherein the NSI comprises or encodes a component of such an agent
23. The composition of Clause 21 or 22, wherein the target cells are *Escherichia, Klebsiella, Clostridium* or *Pseudomonas* cells.
24. The composition of Clause 21 or 22, wherein the target cells are *E. coli, K. pneumoniae, C. difficile* or *P. aeruginosa* cells.

Examples of receptors for use in the present invention are discussed below.

Proteinaceous receptors are mainly outer membrane proteins; sugar moieties include those that compose the cell wall, pellicles, teichoic and LTA. The receptor of the invention is, for, example selected from any of these.

Bacteriophage adsorption initiates the infection process. Through a series of interactions between binding proteins of the bacteriophage (phage) and receptors on the bacterial cell surface, the virus recognizes a potentially sensitive host and then positions itself for DNA ejection. Phage adsorption is thus not only a crucial step in the infection process, but also represents the initial point of contact between virus and host and dictates host range specificity.

Bacteriophage adsorption generally consists of three steps: initial contact, reversible binding and irreversible attachment (Duckworth 1987). The first step involves random collisions between phage and host caused by Brownian motion, dispersion, diffusion or flow (Kokjohn and Miller 1992). In the reversible step, binding to bacterial surface components is not definitive and the phage can desorb from the host. This process, firstly identified by Garen and Puck (1951) through experimental observations of phage detachment after elution, may serve to keep the phage close to the cell surface as it searches for a specific receptor (Kokjohn and Miller 1992). The specific connection between bacterial receptor and phage-binding domains is sometimes mediated by an enzymatic cleavage. This step triggers conformational rearrangements in other phage molecules that allow the insertion of the genetic material into the host (for further details on the mechanism of phage genome ejection, see the review by Molineux and Panja (2013)).

Numerous review studies have highlighted the extensive range of host-associated receptors (proteins, sugars and cell surface structures) that bacteriophages target during adsorption (Lindberg 1977; Schwartz 1980; Wright, McConnell and Kanegasaki 1980; Heller 1992; Frost 1993; Henning and Hashemolhosseini 1994; Vinga et al. 2006; Rakhuba et al. 2010; Chaturongakul and Ounjai 2014). The nature and location of the host cell receptors recognised by bacteriophages varies greatly depending on the phage and host. They range from peptide sequences to polysaccharide moieties. In fact, bacteriophages have been shown to bind to receptors located in the walls of both Gram-positive (Xia et al. 2011) and Gram-negative bacteria (Marti et al. 2013), in bacterial capsules or slime layers (Fehmel et al. 1975), and in appendages [e.g. pili (Guerrero-Ferreira et al. 2011) and flagella (Shin et al. 2012)]. This diversity in receptors and structures involved is a testament to the multiplicity of mechanisms developed by phages and hosts to overcome the evolutionary strategies adopted by their counterparts. It is not unexpected to encounter so many possibilities considering the diversity and staggering amount of phages estimated to populate the different environments of the planet (Clokie et al. 2011). Nevertheless, in all cases, adsorption bas so far been shown to involve either constituents of the bacterial cell wall or protruding structures. In an embodiment, therefore, a receptor in the present invention can be any such receptor mentioned in this paragraph or elsewhere in this disclosure.

Optionally, the receptor comprises lipopolysaccharide (LPS), a heptose moiety, the host's glucosylated cell wall teichoic acid (WTA), YueB, or a receptor recognized by a tail fiber protein of the phage or gp21 of the phage.

Receptors in the Cell Wall of Gram-Positive Bacteria

Peptidoglycan, or murein, is an important component of the bacterial cell wall and is often involved in bacteriophage adsorption. It is a polymer composed of multiple units of amino acids and sugar derivatives-N-acetylglucosamine and N-acetylmuramic acid. These sugar constituents are connected through glycosidic bonds, forming glycan tetrapeptide sheets that are joined together through the cross-linking of amino acids. The cross-linking occurs through peptide bonds between diaminopimelic acid (an amino acid analog) and D-alanine, or through short peptide interbridges. These interbridges are more numerous in Gram-positive bacteria, leading to their characteristically thicker cell walls.

Another main component of the cell wall of Gram-positive bacteria that can be involved in phage adsorption is teichoic acid—polysaccharides composed of glycerol phosphate or ribitol phosphate and amino acids. They are bonded to the muramic acid of peptidoglycans. When teichoic acids are bonded to the lipids of the plasma membrane, they are called lipoteichoic acids (LTA). Further details of the composition of cell walls of bacteria can be found in Tortora, Funke and Case (2007), Willey, Sherwood and Woolverton (2008), Pommerville (2010) and Madigan et al. (2012).

The majority of the receptors so far identified are associated either with peptidoglycan or teichoic acid structures (Table 1). Out of 30 phages targeting Gram-positive bacteria reported in Table 1, only 10 utilize other structures for adsorption. Among these 10 phages, 9 display interactions with residues of either teichoic acid (phage SPP1) or peptidoglycan (phages 5, 13, c2, h, ml3, kh, L and p2) for reversible binding. This highlights the important role these structures may play in the adsorption of phage to Gram-positive bacteria.

Optionally, the receptor of the invention is peptidoglycan, murein, teichoic acid or lipoteichoic acid (LTA). Optionally, each transduction particle of the invention is a first phage or comprises a capsid of a first phage, wherein the first phage is a phage of a family listed in Table 1 (and optionally the producer and/or target cell is the host for the phage as listed in Table I and/or the receptor is the receptor for the phage as listed in Table 1). In an embodiment, the producer and target cells are gram-positive cells. Optionally the producer and/or target cells are of a species or strain listed in Table 1 (where the producer and target cell species are different or the same). Preferably when the producer cell is a gram-positive bacteria, the receptor is a peptidoglycan. Alternatively, when the producer cell is a gram-positive bacteria, the receptor is a teichoic acid.

Receptors in the Cell Wall of Gram-Negative Bacteria

In Gram-negative bacteria, the peptidoglycan layer is relatively thin and is located inward of the outer membrane, the major component of the cell wall. These two layers are connected by Braun's lipoproteins. The outer membrane is a sophisticated structure composed of a lipid bilayer ornamented with proteins, polysaccharides and lipids; the latter two molecules form the LPS layer. LPSs are complexes that consist of three parts: lipid A, the core polysaccharide and the O-polysaccharide. Lipid A is, in general, composed of fatty acids attached to glucosamine phosphate disaccharides. The core polysaccharide is connected to the lipid A through a ketodeoxyoctonate linker. The core polysaccharide and the O-polysaccharide (O-chain or O-antigen) contain several units of sugar residues extending outward to the outer membrane. Cells that contain all three components of the LPS are denominated as smooth(S) type and those that lack the O-polysaccharide portion are distinguished as rough (R) type. In general, the saccharides composing the O-antigen are highly variable and those of the core polysaccharide are more conserved among species. Because of this, phages specific to only S-type strains tend to target the O-polysaccharide and, thus. have generally a narrower host range when compared to those able to adsorb to R-type cells (Rakbuba et al. 2010).

Table 2 (a) compiles Gram-negative bacterial receptors located in the cell wall that interact with phage receptor-binding proteins (RBPs). Interestingly, in coliphages there is no preference for proteinaceous or polysaccharide receptors: some phages adsorb on cell wall proteins, some on sugar moieties and others require both structures for adsorption. In the case of *Salmonella* phages, the picture is not so different: some use proteins, some sugar moieties and some both types of receptors. On the other hand, *Pseudomonas* phages commonly adsorb onto polysaccharide receptors. Although definitive conclusions cannot be drawn from such a small sample size, it should be noted that *Pseudomonas* can have two LPS moieties, a short chain LPS named A band and a longer B-band LPS (Beveridge and Graham 1991).

Optionally, the receptor of the invention is a host cell wall protein. Optionally, the receptor is a saccharide. Optionally, the receptor comprises O-antigen, LPS lipid A or LPS core polysaccharide. In an example, the receptor is smooth LPS or rough LPS. Optionally, the host cells are S-type bacteria and the receptor comprises O-antigen of the host. Optionally, the host cells are R-type bacteria and the receptor comprises LPS lipid A of the host.

Optionally, the receptor is a host cell wall protein. Optionally, the receptor is a saccharide. Optionally, the receptor comprises O-antigen, LPS lipid A or LPS core polysaccharide. In an example, the receptor is smooth LPS or rough LPS. Optionally, the host cells are S-type bacteria and the receptor comprises O-antigen of the host. Optionally, the host cells are R-type bacteria and the receptor comprises LPS lipid A of the host.

In an example, the host is *E coli* and the transduction particles are coliphage (or comprise coliphage capsids), wherein the receptor is a polysaccharide receptor and/or a host cell wall protein receptor. In an example, the producer cells are engineered not to express *E coli* polysaccharide receptor and/or an *E coli* cell wall protein receptor.

In an example, the host is *Salmonella*, wherein the receptor is a polysaccharide receptor and/or a host cell wall protein receptor. In an example, the producer cells are engineered not to express *Salmonella* polysaccharide receptor and/or a *Salmonella* cell wall protein receptor.

In an example, the host is *Klebsiella*, wherein the receptor is a polysaccharide receptor and/or a host cell wall protein receptor. In an example, the producer cells are engineered not to express *Klebsiella* polysaccharide receptor and/or a *Klebsiella* cell wall protein receptor.

In an example, the host is *Pseudomonas*, wherein the receptor is a polysaccharide receptor. In an example, the second cells are engineered not to express *Pseudomonas* polysaccharide receptor.

Optionally, each transduction particle of the invention is a first phage or comprises a capsid of a first phage, wherein the first phage is a phage of a family listed in Table 2 (and optionally the producer cell is the host for the phage as listed in Table 2 and/or the receptor is the receptor for the phage as listed in Table 2).

In an embodiment, the producer and target cells are gram-negative cells. Preferably, the producer cells are *E coli* cells. Optionally the producer and/or target cells are of a species or strain listed in Table 2 (eg, where the cell species are different or the same).

Table 2 (b) reports cases where phages not only adsorb onto bacterial surfaces but also enzymatically degrade the sugar moieties in the O-chain structure. It should be noted that all these phages belong to the Podoviridae family.

Receptors in Other Structures of Gram-Negative Bacteria

In this section, bacterial structures, other than cell wall moieties, that also serve as receptors for particles or phages are discussed. These include structures such as flagella, pili and capsules. They can be found in species from both Gram stains. See Table 3 for examples.

Optionally, the receptor of the invention is a flagellum, pilus or capsule component (eg, a component listed in Table 3 in the listed species or as found in a host that is of a different species to that listed). Optionally, the phage is a phage of a family listed in Table 3 (and optionally the host is the host for the phage as listed in Table 3 and/or the receptor is the receptor for the phage as listed in Table 3). Optionally, the phage is a phage listed in Table 3 (and optionally the host is the host for the phage as listed in Table 3 and/or the receptor is the receptor for the phage as listed in Table 3).

Flagella are long thin helical structures that confer motility to cells. They are composed of a basal body, a flagellar hook and a flagellar filament composed of subunits of flagellin proteins (Willey, Sherwood and Woolverton 2008). Table 3 (a) reports phages attaching to flagellar proteins. The adhesion of phages to the filament structure is generally reversible and the flagellum's helical movement causes the phage to move along its surface until they reach the bacterial wall. Irreversible adsorption occurs, then, on receptors located on the surface of the bacterium, near the base of the flagellum (Schade, Adler and Ris 1967; Lindberg 1973; Guerrero-Ferreira et al. 2011). Interestingly, some phages (ϕCbK and ϕCb13) were observed to contain filaments protruding from their capsids that are responsible for reversible binding onto the host's flagellum; irreversible adsorption occurs only when the phage's tails interact with pili portals on the cell pole (Guerrero-Ferreira et al. 2011). Because for these phages irreversible adsorption occurs on the pilus, even if they interact with the flagellum, they were reported in Table 3 (b), which focuses on phages interacting with receptors in pili and mating pair formation structures.

Pili are rod-shaped filamentous appendages used for bacterial conjugation (Lindberg 1973). They extend from the donor cell and attach to receptors on the wall of the recipient cell. A depolymerization of the pilus causes its retraction, bringing both cells closer to each other. Further adhesion of the cells is achieved through binding proteins on their surfaces; genetic material is transferred through this conjugating junction (Madigan et al. 2012). Adsorption to the pilus structure has been so far associated with phages that belong to orders different from Caudovirales (Table 3b). In fact, according to Frost (1993), the families Cystoviridae and Inoviridae compose the majority of phages that adsorb onto pili structures. Interestingly, phages can be selective towards certain parts of the pili. That is the case for F-type phages, whose adsorption occur only on the tip of the pilus (Click and Webster 1998). In other phages, such as O6, the attachment happens at the sides (shaft) of the structure (Daugelavicius et al. 2005).

Capsules are flexible cementing substances that extend radially from the cell wall. They act as binding agents between bacteria and/or between cells and substrates (Beveridge and Graham 1991). Slime layers are similar to capsules, but are more easily deformed. Both are made of sticky substances released by bacteria, and their common components are polysaccharides or proteins (Madigan et al. 2012). Adsorption of phages to capsules or slime layers is mediated by enzymatic cleavage of the exopolysaccharides that compose the layers. The hydrolysis of the layer is a reversible step, whereas irreversible binding is achieved through bonding of the phage with receptors on the cell wall (Rakhuba et al. 2010). As can be seen in Table 3 (c), the few phages identified to have RBP recognizing exopolysaccharides are mostly of Podoviridae morphology.

In an example, the producer cell is a *Salmonella* (eg, *S enterica* Serovar *Typhimurium*) cell and the receptor is selected from flagella, vitamin $B_{12}$ uptake outer membrane protein, BtuB and lipopolysaccharide-related O-antigen. In an example the receptor is a flagellum or BtuB and the first phage are Siphoviridae phage. In an example the receptor is O-antigen of LPS and the first phage are Podoviridae phage. Optionally, the receptor is FliC host receptor or FljB receptor.

Optionally, the producer cell is a *S enterica* or *P aeruginosa* cell. Optionally, the receptor is the receptor of the host as listed in Table 4.

The O-antigen structure of *Salmonella* O66 has been established, which reportedly differs from the known O-antigen structure of *Escherichia coli* O166 only in one linkage (most likely the linkage between the O-units) and O-acetylation. The O-antigen gene clusters of *Salmonella* O66 and *E. coli* O166 were found to have similar organizations, the only exception being that in *Salmonella* O66, the wzy gene is replaced by a non-coding region. The function of the wzy gene in *E. coli* O166 was confirmed by the construction and analysis of deletion and trans-complementation mutants. It is proposed that a functional wzy gene located outside the O-antigen gene cluster is involved in *Salmonella* O66 O-antigen biosynthesis, as has been reported previously in Salmonellaserogroups A, B and D1. The sequence identity for the corresponding genes between the O-antigen gene clusters of *Salmonella*O66 and *E. coli* O166 ranges from 64 to 70%, indicating that they may originate from a common ancestor. It is likely that after the species divergence, *Salmonella* O66 got its specific O-antigen form by inactivation of the wzy gene located in the O-antigen gene cluster and acquisition of two new genes (a wzy gene and a prophage gene for O-acetyl modification) both residing outside the O-antigen gene cluster.

In an example, the producer cells are E coli cells and do not comprise an expressible E coli (eg, Escherichia coli O166) wzy gene.

Optionally, the receptor is selected from lipopolysaccharides, teichoic acids (optionally a ManNAc (β1→4) GlcNAc disaccharide with one to three glycerol phosphates attached to the C4 hydroxyl of the ManNAc residue followed by a long chain of glycerol- or ribitol phosphate repeats), proteins and flagella.

Optionally, the receptor comprises an O-antigen of the producer cell species.

Optionally, the phage or particles of the invention are operable to express an endolysin or holin in the producer cells, optionally when phage or particles replicate in producer cells. This is useful for releasing the particles for subsequent purification away from cellular material to produce a composition of the invention.

In an embodiment, each particle is capable of infecting a target bacterium, the particle comprising a nucleotide sequence of interest (NSI) that is capable of expressing a protein or RNA in the target bacterium, or wherein the NSI comprises a regulatory element that is operable in the target bacterium. In an example, the NSI is capable of recombination with the target cell chromosome or an episome comprised by the target cell to modify the chromosome or episome. Optionally, this is carried out in a method wherein the chromosome or episome is cut (eg, at a predetermined site using a guided nuclease, such as a Cas, TALEN, zinc finger or meganuclease; or a restriction endonuclease) and simultaneously or sequentially the cell is infected by a particle that comprises first DNA comprising the NSI, wherein the DNA is introduced into the cell and the NSI or a sequence thereof is introduced into the chromosome or episome at or adjacent the cut site. In an example the first DNA comprises one or more components of a CRISPR/Cas system operable to perform the cutting (eg, comprising at least a nucleotide sequence encoding a guide RNA or crRNA for targeting the site to be cut) and further comprising the NSI.

In an embodiment, the presence in the target bacterium of the NSI or its encoded protein or RNA mediates target cell killing, or downregulation of growth or propagation of target cells, or mediates switching off of expression of one or more RNA or proteins encoded by the target cell genome, or downregulation thereof.

In an embodiment, the presence in the target bacterium of the NSI or its encoded protein or RNA mediates upregulation of growth or propagation of the target cell, or mediates switching on of expression of one or more RNA or proteins encoded by the target cell genome, or upregulation thereof.

In an embodiment, the NSI encodes a component of a CRISPR/Cas system that is toxic to the target bacterium.

In an embodiment, the first NSI is comprised by a vector (eg, a plasmid or shuttle vector).

An embodiment provides a method of treating an environment ex vivo, the method comprising exposing the environment to a population of transduction particles obtainable by the production method of the invention, wherein the environment comprises target bacteria and the particles (eg, phage or particles comprising a phage capsid) infect and kill the target bacteria. In an example an agent is further administered to the environment simultaneously or sequentially with the phage administration. In an example, the agent is an herbicide, pesticide, insecticide, plant fertilizer or cleaning agent.

A method of treating an infection of target bacteria in a human or animal subject is provided, the method comprising exposing the bacteria to a population of transduction particles obtainable by the production method, wherein the particles infect and kill the target bacteria.

Optionally, target bacteria herein are comprised by a microbiome of the subject, eg, a gut microbiome. Alternatively, the microbiome is a skin, scalp, hair, eye, ear, oral, throat, lung, blood, rectal, anal, vaginal, scrotal, penile, nasal or tongue microbiome.

In an example the subject is further administered a medicament simultaneously or sequentially with the transduction particle administration. In an example, the medicament is an antibiotic, antibody, immune checkpoint inhibitor (eg, an anti-PD-1, anti-PD-LI or anti-CTLA4 antibody), adoptive cell therapy (eg, CAR-T therapy) or a vaccine.

In an example, the invention employs helper phage for packaging the NSI. In an example, the helper phage are capable of packaging DNA comprising the NSI to produce first transduction particles, wherein the particles are different from the helper phage and the helper phage are incapable themselves of producing helper phage particles.

A composition is provided comprising a population of transduction particles of the invention, wherein the particles require helper phage according to the immediately preceding paragraph for replication of the transduction particles; and optionally wherein less than 20, 15, 10, 5, 4, 3, 2, 1, 0.5, 0.4, 0.2 or 0.1% of total transduction particles comprised by the composition are particles of such helper phage. In an example the composition comprises helper phage and less than 1% of total transduction particles comprised by the composition are particles of such helper phage. In an example the composition comprises helper phage and less than 0.5% of total transduction particles comprised by the composition are particles of such helper phage. In an example the composition comprises helper phage and less than 0.1% of total transduction particles comprised by the composition are particles of such helper phage. In an example the composition comprises helper phage and less than 0.01% of total transduction particles comprised by the composition are particles of such helper phage. In an example the composition comprises helper phage and less than 0.001% of total transduction particles comprised by the composition are particles of such helper phage. In an example the composition comprises helper phage and less than 0.0001% of total transduction particles comprised by the composition are particles of such helper phage. In an example the composition comprises helper phage and less than 0.00001% of total transduction particles comprised by the composition are particles of such helper phage. In an example the composition comprises helper phage and less than 0.000001% of total transduction particles comprised by the composition are particles of such helper phage. In an example the composition comprises helper phage and less than 0.0000001% of total transduction particles comprised by the composition are particles of such helper phage. In an example the composition comprises helper phage and less than 0.00000001% of total transduction particles comprised by the composition are particles of such helper phage.

In an example, the composition or population comprises at least $10^3$, $10^4$, $10^5$ or $10^6$ transduction particles, as indicated a transduction assay, for example. In an example, the composition or population comprises at least $10^3$ transduction particles and eg, no more than $10^{14}$ particles. In an example, the composition or population comprises at least $10^4$ transduction particles and eg, no more than $10^{14}$ particles. In an example, the composition or population comprises at least $10^5$ transduction particles and eg, no more than $10^{14}$ particles. In an example, the population comprises at least $10^6$ transduction particles and eg, no more than $10^{14}$ particles. To have a measure of the particle concentration, for example, one can perform a standard transduction assay when the genome of the particles of the invention contains an antibiotic marker. Thus, in this case the particles of the invention are capable of infecting target bacteria and in a sample of 1 ml the composition of population comprises at least $10^3$, $10^4$, $10^5$ or $10^6$ transduction particles, which can be determined by infecting susceptible bacteria at a multiplicity of infection <0.1 and determining the number of infected cells by plating on a selective agar plate corresponding to the antibiotic marker in vitro at 20 to 37 degrees centigrade, eg, at 20 or 37 degrees centigrade.

Optionally at least 99.9, 99.8, 99.7, 99.6, 99.5, 99.4, 99.3, 99.2, 99.1, 90, 85, 80, 70, 60, 50 or 40% of total transduction particles comprised by the composition are particles of particles of the invention.

In an example, genome of the particles of the invention comprises an f1 origin of replication.

In an example, the helper phage are *E coli* phage. In an example, the particles of the invention are *E coli, C difficile, Streptococcus, Klebsiella, Pseudomonas, Acitenobacter, Enterobacteracea, Firmicutes* or *Bacteroidetes* phage or comprise a capsid of such a genus, wherein the capsid packages a NSI. In an example, the helper phage are engineered M13 phage.

In an example, the genome of the particles of the invention comprises a phagemid, wherein the phagemid comprises a packaging signal for packaging the particles in the presence of the helper phage.

The particles of the invention may contain DNA comprising a nucleotide sequence of interest (NSI), eg, as defined herein, such as a NSI that encodes a component of a CRISPR/Cas system operable in target bacteria that can be infected by the particles. Once inside the target bacteria, optionally the particle DNA is incapable of being packaged to form transduction particles in the absence of the helper phage. This usefully contains the activity of the genome of the particles of the invention and its encoded products (protieins and/or nucleic acid), as well as limits or controls dosing of the NSI and its encoded products in an environment comprising the target bacteria that have been exposed to the particles of the invention. This is useful, for example to control the medical treatment of an environment comprised by a human or animal subject, plant or other environment (eg, soil or a foodstiff or food ingredient).

In an embodiment, each particle of the invention comprises one or more phage structural proteins and/or comprises a phage capsid. Examples of phage structural proteins are phage coat proteins, collar proteins and phage tail fibre proteins. In an example, the particle comprises a capsid and tail fibre proteins of first type of phage. For example, the phage type is an *E coli, Klebsiella pneumoniae, Pseudomonas aeruginosa, Clostridium difficile, Helicobacter pylori, Staphylococcus aureus, Salmonelly* (eg, *typhimurium*) or *Campylobacter* phage.

Optionally, at least 95% (eg, 100%) of transduction particles comprised by the composition are particles of the invention.

In another embodiment, the composition comprises second transduction (eg, phage) particles, wherein the second particles are different from the first particles of the invention (ie, the particles recited in claim 1).

Optionally, the composition population comprises at least $10^3$, $10^4$, $10^5$ or $10^6$ phage particles, as indicated in a transduction assay.

Optionally, each particle of the invention comprises a vector for the NSA, wherein the vectors are plasmids or phagemids. For example, the vectors are shuttle vectors (eg, pUC vectors) that can be replicated in host bacteria.

Optimally, the genome of each particle of the invention comprises a packaging signal, such as a pac or cos sequence or homologue thereof.

Optionally, the transduction particles of the invention are temperate phage. Optionally, the transduction particles of the invention are lytic phage.

Optionally, the particles of the invention are capable of infecting target bacteria, the particles comprising a nucleotide sequence of interest (NSI) that is capable of expressing a protein or RNA (eg, gRNA or crRNA) in target bacteria, or wherein the NSI comprises a regulatory element that is operable in target bacteria.

Optionally, the presence in target bacteria of the NSI or its encoded protein or RNA mediates target cell killing, or downregulation of growth or propagation of target cells, or mediates switching off of expression of one or more RNA or proteins encoded by the target cell genomes, or downregulation thereof.

Optionally, the presence in target bacteria of the NSI or its encoded protein or RNA mediates upregulation of growth or propagation of target cells, or mediates switching on of expression of one or more RNA or proteins encoded by the target cell genomes, or upregulation thereof.

Optionally, the particles of the invention are capable of infecting target bacteria and each particle comprises engineered antibacterial means for killing target bacteria. By use of the term "engineered" it will be readily apparent to the skilled addressee that the relevant means has been introduced and is not naturally-occurring in the phage or particle. For example, the means is recombinant, artificial or synthetic.

In an example, each particle of the invention comprises a genomic island DNA or pathogenicity island (eg, saPI) DNA, wherein optionally the DNA comprises the NSI or engineered antibacterial means for killing target bacteria (eg, the DNA encodes a nuclease, such as Cas nuclease (eg, Cas9 or Cas3), and/or a guide RNA for expression in a target bacterium).

Optionally, the antibacterial means comprises one or more components of a CRISPR/Cas system. Optionally, the component(s) comprise (i) a DNA sequence encoding a guide RNA (eg, a single guide RNA) or comprising a CRISPR array for producing guide RNA, wherein the guide RNA is capable of targeting the genome of target bacteria; (ii) a Cas nuclease-encoding DNA sequence; and/or (iii) a DNA sequence encoding one or more components of Cascade. In an example, a Cas herein is a Cas9. In an example, a Cas herein is a Cas3. The Cas may be identical to a Cas encoded by the target bacteria.

Optionally, the antibacterial means comprises a nucleic acid encoding a guided nuclease, such as a Cas nuclease, TALEN, zinc finger nuclease or meganuclease.

Optionally, the composition, population or transduction particles is each for use in medicine practised on a human or animal subject, or the composition is a pharmaceutical composition for use in medicine practised on a human or animal subject. In an example, the animal is a livestock or companion pet animal (eg, a cow, pig, goat, sheep, horse, dog, cat or rabbit). In an example, the animal is an insect (an insect at any stage of its lifecycle, eg, egg, larva or pupa). In an example, the animal is a protozoan. In an example, the animal is a cephalopod.

Optionally, the composition is a herbicide, pesticide, food or beverage processing agent, food or beverage additive, petrochemical or fuel processing agent, water purifying agent, cosmetic additive, detergent additive or environmental (eg, soil) additive or cleaning agent.

The inability in some embodiments of the particles of the invention to self-replicate and to require helper phage to do this usefully provides containment in the location (eg, gut) of action of the composition and/or in the environment of the subject, eg, when exposed to secretions such as urine and faeces of the subject that otherwise may contain replicated first phage. Inability of the helper phage in some embodiments to self-package limits availability of factors required by the particles to form packaged particles, hence providing containment by limiting propagation of the particles of the invention. This may be useful, for example, to contain an antibacterial activity provided by the particles, such as a CRISPR/Cas killing principle.

In an example, when the subject is a human, the subject is not an embryo.

Optionally, the environment is a microbiome of soil; a plant, part of a part (e.g., a leaf, fruit, vegetable or flower) or plant product (e.g., pulp); water; a waterway; a fluid; a foodstuff or ingredient thereof; a beverage or ingredient thereof; a medical device; a cosmetic; a detergent; blood; a bodily fluid; a medical apparatus; an industrial apparatus; an oil rig; a petrochemical processing, storage or transport apparatus; a vehicle or a container. In an example, the environment is an ex vivo bodily fluid (e.g., urine, blood, blood product, sweat, tears, sputum or spit), bodily solid (e.g., faeces) or tissue of a human or animal subject that has been administered the composition.

Optionally, the antibacterial means comprises one or more components of a CRISPR/Cas system. For example, the component(s) comprise (i) a DNA sequence encoding a guide RNA (eg, a single guide RNA) or comprising a CRISPR array for producing guide RNA, wherein the guide RNA is capable of targeting the genome of target bacteria; (ii) a Cas (eg, Cas9, Cas3, Cpf1, CasX or CasY) nuclease-encoding DNA sequence; and/or (iii) a DNA sequence encoding one or more components of Cascade (eg, CasA).

Optionally, the antibacterial means comprises a nucleic acid encoding a guided nuclease, such as a Cas nuclease, TALEN, zinc finger nuclease or meganuclease.

In an example, the particles, population or composition of the invention is comprised by a medical container, eg, a syringe, vial, IV bag, inhaler, eye dropper or nebulizer. In an example, the particles, population or composition of the invention is comprised by a sterile container. In an example, the particles, population or composition of the invention is comprised by a medically-compatible container. In an example, the particles, population or composition of the invention is comprised by a fermentation vessel, eg. a metal, glass or plastic vessel.

In an example, the particles, population or composition of the invention is comprised by a medicament, e.g in combination with instructions or a packaging label with directions to administer the medicament by oral, IV, subcutaneous, intranasal, intraocular, vaginal, topical, rectal or inhaled administration to a human or animal subject. In an example, the particles, population or composition of the invention is comprised by an oral medicament formulation. In an example, the particles, population or composition of the invention is comprised by an intranasal or ocular medicament formulation. In an example, the particles, population or composition of the invention is comprised by a personal hygiene composition (eg, shampoo, soap or deodorant) or cosmetic formulation. In an example, the particles, population or composition of the invention is comprised by a detergent formulation. In an example, the particles, population or composition of the invention is comprised by a cleaning formulation, eg, for cleaning a medical or industrial device or apparatus. In an example, the particles, population or composition of the invention is comprised by foodstuff, foodstuff ingredient or foodstuff processing agent. In an example, the particles, population or composition of the invention is comprised by beverage, beverage ingredient or beverage processing agent. In an example, the particles, population or composition of the invention is comprised by a medical bandage, fabric, plaster or swab. In an example, the particles, population or composition of the invention is comprised by an herbicide or pesticide. In an example, the particles, population or composition of the invention is comprised by an insecticide.

In an example, each particle is a first phage particle or comprises a capsid of a first phage (and optionally also tail fibres of the first phage), wherein the first phage is a is a Corticoviridae, Cystoviridae, Inoviridae, Leviviridae, Microviridae, Myoviridae, Podoviridae, Siphoviridae, or Tectiviridae virus. In an example, the helper phage is a is a Corticoviridae, Cystoviridae, Inoviridae, Leviviridae, Microviridae, Myoviridae, Podoviridae, Siphoviridae, or Tectiviridae virus. In an example, the helper phage is a filamentous M13, a Noviridae, a tailed phage (eg, a Myoviridae, Siphoviridae or Podoviridae), or a non-tailed phage (eg, a Tectiviridae).

In an example, both the first phage are Corticoviridae. In an example, the first phage are Cystoviridae. In an example, the first phage are Inoviridae. In an example, the first phage are Leviviridae. In an example, the first phage are Microviridae. In an example, the first phage are Podoviridae. In an example, the first phage are Siphoviridae. In an example, the first phage are Tectiviridae.

In an example, the CRISPR/Cas component(s) are component(s) of a Type I CRISPR/Cas system. In an example, the CRISPR/Cas component(s) are component(s) of a Type II CRISPR/Cas system. In an example, the CRISPR/Cas component(s) are component(s) of a Type III CRISPR/Cas system. In an example, the CRISPR/Cas component(s) are component(s) of a Type IV CRISPR/Cas system. In an example, the CRISPR/Cas component(s) are component(s) of a Type V CRISPR/Cas system. In an example, the CRISPR/Cas component(s) comprise a Cas9-encoding nucleotide sequence (eg, *S pyogenes* Cas9, *S aureus* Cas9 or *S thermophilus* Cas9). In an example, the CRISPR/Cas component(s) comprise a Cas3-encoding nucleotide sequence (eg, *E coli* Cas3, *C difficile* Cas3 or *Salmonella* Cas3). In an example, the CRISPR/Cas component(s) comprise a Cpf-encoding nucleotide sequence. In an example, the CRISPR/Cas component(s) comprise a CasX-encoding nucleotide sequence. In an example, the CRISPR/Cas component(s) comprise a CasY-encoding nucleotide sequence.

In an example, the genomes of the particles encode a CRISPR/Cas component or protein of interest from a nucleotide sequence comprising a promoter that is operable in the target bacteria.

In an example, the host bacteria and/or target bacteria are *E coli*. In an example, the host bacteria and/or target bacteria are *C difficile* (eg, the vector is a shuttle vector operable in *E coli* and the host bacteria are *C difficile*). In an example, the host bacteria and/or target bacteria are *Streptococcus*, such as *S thermophilus* (eg, the vector is a shuttle vector operable in *E coli* and the host bacteria are *Streptococcus*). In an example, the host bacteria and/or target bacteria are *Pseudomonas*, such as *P aeruginosa* (eg, the vector is a shuttle vector operable in *E coli* and the host bacteria are *P aeruginosa*). In an example, the host bacteria and/or target bacteria are *Klebsiella*, such as *K pneumoniae* (eg, the vector is a shuttle vector operable in *E coli* and the host bacteria are *Klebsiella*). In an example, the host bacteria and/or target bacteria are *Salmonella*, eg, *S typhimurium* (eg, the vector is a shuttle vector operable in *E coli* and the host bacteria are *Salmonella*).

Optionally, each producer and/or target bacterium is a gram negative bacterium (eg, a spirilla or *vibrio*). Optionally, each producer and/or target bacterium is a gram positive bacterium. Optionally, each producer and/or target bacterium is a *mycoplasma*, chlamydiae, spirochete or *mycobacterium*. Optionally, each producer and/or target bacterium is a *Streptococcus* (eg, *pyogenes* or *thermophilus*). Optionally, each producer and/or target bacterium is a *Staphylococcus* (eg, *aureus*, eg, MRSA). Optionally, each producer and/or target bacterium is an *E. coli* (eg, O157: H7) host, eg, wherein the Cas is encoded by the vecor or an endogenous host Cas nuclease activity is de-repressed. Optionally, each producer and/or target bacterium is a *Pseudomonas* (eg, *aeruginosa*). Optionally, each producer and/or target bacterium is a Vibro (eg, *cholerae* (eg, O139) or *vulnificus*). Optionally, each producer and/or target bacterium is a *Neisseria* (eg, gonnorrhoeae or *meningitidis*). Optionally, each producer and/or target bacterium is a *Bordetella* (eg, pertussis). Optionally, each producer and/or target bacterium is a *Haemophilus* (eg, *influenzae*). Optionally, each producer and/or target bacterium is a *Shigella* (eg, *dysenteriae*), Optionally, each producer and/or target bacterium is a *Brucella* (eg, *abortus*). Optionally, each producer and/or target bacterium is a *Francisella* host. Optionally, each producer and/or target bacterium is a *Xanthomonas* host. Optionally, each producer and/or target bacterium is an *Agrobacterium* host. Optionally, each producer and/or target bacterium is an *Erwinia* host. Optionally, each producer and/or target bacterium is a *Legionella* (eg, *pneumophila*). Optionally, each producer and/or target bacterium is a *Listeria* (eg, *monocytogenes*).

Optionally, each producer and/or target bacterium is a *Campylobacter* (eg, *jejuni*). Optionally, each producer and/or target bacterium is a *Yersinia* (eg, *pestis*). Optionally, each producer and/or target bacterium is a *Borelia* (eg, *burgdorferi*). Optionally, each producer and/or target bacterium is a *Helicobacter* (eg, *pylori*). Optionally, each producer and/or target bacterium is a *Clostridium* (eg, *difficile* or botulinum). Optionally, each producer and/or target bacterium is a *Erlichia* (eg, *chaffeensis*). Optionally, each producer and/or target bacterium is a *Salmonella* (eg, *typhi* or *enterica*, eg, serotype *typhimurium*, eg, DT 104). Optionally, each producer and/or target bacterium is a *Chlamydia* (eg, *pneumoniae*). Optionally, each producer and/or target bacterium is a Parachlamydia host. Optionally, each producer and/or target bacterium is a *Corynebacterium* (eg, *amycolatum*). Optionally, each producer and/or target bacterium is a *Klebsiella* (eg, *pneumoniae*). Optionally, each producer and/or target bacterium is an *Enterococcus* (eg, *faecalis* or *faecim*, eg, linezolid-resistant). Optionally, each producer and/or target bacterium is an *Acinetobacter* (eg, *baumannii*, eg, multiple drug resistant).

Further examples of target cells and targeting of antibiotic resistance in such cells using the present invention are as follows:—

1. Optionally the target bacteria are *Staphylococcus aureus* cells, eg, resistant to an antibiotic selected from methicillin, vancomycin, linezolid, daptomycin, quinupristin, dalfopristin and teicoplanin.
2. Optionally the target bacteria are *Pseudomonas* aeruginosa cells, eg, resistant to an antibiotic selected from cephalosporins (eg, ceftazidime), carbapenems (eg, imipenem or meropenem), fluoroquinolones, aminoglycosides (eg, gentamicin or tobramycin) and colistin.
3. Optionally the target bacteria are *Klebsiella* (eg, *pneumoniae*) cells, eg, resistant to carbapenem.
4. Optionally the target bacteria are *Streptoccocus* (eg, *thermophilus, pneumoniae* or *pyogenes*) cells, eg, resistant to an antibiotic selected from erythromycin, clindamycin, beta-lactam, macrolide, amoxicillin, azithromycin and penicillin.
5. Optionally the target bacteria are *Salmonella* (eg, serotype *Typhi*) cells, eg, resistant to an antibiotic selected from ceftriaxone, azithromycin and ciprofloxacin.
6. Optionally the target bacteria are *Shigella* cells, eg, resistant to an antibiotic selected from ciprofloxacin and azithromycin.
7. Optionally the target bacteria are *Mycobacterium tuberculosis* cells, eg, resistant to an antibiotic selected from Resistance to isoniazid (INH), rifampicin (RMP), fluoroquinolone, amikacin, kanamycin and capreomycin and azithromycin.
8. Optionally the target bacteria are *Enterococcus* cells, eg, resistant to vancomycin.
9. Optionally the target bacteria are Enterobacteriaceae cells, eg, resistant to an antibiotic selected from a cephalosporin and carbapenem.
10. Optionally the target bacteria are *E. coli* cells, eg, resistant to an antibiotic selected from trimethoprim, itrofurantoin, cefalexin and amoxicillin.
11. Optionally the target bacteria are *Clostridium* (eg, *difficile*) cells, eg, resistant to an antibiotic selected from fluoroquinolone antibiotic and carbapenem.
12. Optionally the target bacteria are *Neisseria gonnorrhoea* cells, eg, resistant to an antibiotic selected from cefixime (eg, an oral cephalosporin), ceftriaxone (an injectable cephalosporin), azithromycin and tetracycline.
13. Optionally the target bacteria are *Acinetoebacter baumannii* cells, eg, resistant to an antibiotic selected from beta-lactam, meropenem and a carbapenem.
14. Optionally the target bacteria are *Campylobacter* cells, eg, resistant to an antibiotic selected from ciprofloxacin and azithromycin.
15. Optionally, the target cell(s) produce Beta (β)-lactamase.
16. Optionally, the target cell(s) are bacterial cells that are resistant to an antibiotic recited in any one of examples 1 to 14.

Mobile Genetic Elements, Genomic Islands, Pathogenicity Islands Etc.

Genetic variation of bacteria and archaea can be achieved through mutations, rearrangements and horizontal gene transfers and recombinations. Increasing genome sequence data have demonstrated that, besides the core genes encoding house-keeping functions such as essential metabolic activities, information processing, and bacterial structural and regulatory components, a vast number of accessory genes encoding antimicrobial resistance, toxins, and enzymes that contribute to adaptation and survival under certain environmental conditions are acquired by horizontal gene transfer of mobile genetic elements (MGEs). Mobile genetic elements are a heterogeneous group of molecules that include plasmids, bacteriophages, genomic islands, chromosomal cassettes, pathogenicity islands, and integrative and conjugative elements. Genomic islands are relatively large segments of DNA ranging from 10 to 200 kb often integrated into IRNA gene clusters flanked by 16-20 bp direct repeats. They are recognized as discrete DNA segments acquired by horizontal gene transfer since they can differ from the rest of the chromosome in terms of GC content (% G+C) and codon usage.

Pathogenicity islands (PTIs) are a subset of horizontally transferred genetic elements known as genomic islands. There exists a particular family of highly mobile PTIs in *Staphylococcus aureus* that are induced to excise and replicate by certain resident prophages. These PTIs are packaged into small headed phage-like particles and are transferred at frequencies commensurate with the plaque-forming titer of the phage. This process is referred to as the SaPI excision replication-packaging (ERP) cycle, and the high-frequency SaPI transfer is referred to as SaPI-specific transfer (SPST) to distinguish it from classical generalized transduction (CGT). The SaPIs have a highly conserved genetic organization that parallels that of bacteriophages and clearly distinguishes them from all other horizontally acquired genomic islands. The SaPI1-encoded and SaPIbov2-encoded integrases are used for both excision and integration of the corresponding elements, and it is assumed that the same is true for the other SaPIs. Phage 80α can induce several different SaPIs, including SaPI1, SaPI2, and SaPIbov1, whereas o11 can induce SaPIbov1 but neither of the other two SaPIs.

Reference is made to "Staphylococcal pathogenicity island DNA packaging system involving cos-site packaging and phage-encoded HNH endonucleases", Quiles-Puchalt et al, PNAS Apr. 22, 2014. 111 (16) 6016-6021. Staphylococcal pathogenicity islands (SaPIs) are highly mobile and carry and disseminate superantigen and other virulence genes. It was reported that SaPIs hijack the packaging machinery of the phages they victimise, using two unrelated and complementary mechanisms. Phage packaging starts with the recognition in the phage DNA of a specific sequence, termed "pac" or "cos" depending on the phage type. The SaPI strategies involve carriage of the helper phage pac- or cos-like sequences in the SaPI genome, which ensures SaPI packaging in full-sized phage particles, depending on the helper phage machinery. These strategies interfere with phage reproduction, which ultimately is a critical advantage for the bacterial population by reducing the number of phage particles.

Staphylococcal pathogenicity islands (SaPIs) are the prototypical members of a widespread family of chromosomally located mobile genetic elements that contribute substantially to intra- and interspecies gene transfer, host adaptation, and virulence. The key feature of their mobility is the induction of SaPI excision and replication by certain helper phages and their efficient encapsidation into phage-like infectious particles. Most SaPIs use the headful packaging mechanism and encode small terminase subunit (TerS) homologs that recognize the SaPI-specific pac site and determine SaPI packaging specificity. Several of the known SaPIs do not encode a recognizable TerS homolog but are nevertheless packaged efficiently by helper phages and transferred at high frequencies. Quiles-Puchalt et al report that one of the non-terS-coding SaPIs, SaPIbov5, and found that it uses two different, undescribed packaging strategies. SaPIbov5 is packaged in full-sized phage-like particles either by typical pac-type helper phages, or by cos-type phages—i.e., it has both pac and cossites and uses the two different phage-coded TerSs. This is an example of SaPI packaging by a cos phage, and in this, it resembles the P4 plasmid of *Escherichia coli*. Cos-site packaging in *Staphylococcus aureus* is additionally unique in that it requires the HNH nuclease, carried only by cos phages, in addition to the large terminase subunit, for cos-site cleavage and melting.

Characterization of several of the phage-inducible SaPIs and their helper phages has established that the pac (or headful) mechanism is used for encapsidation. In keeping with this concept, some SaPIs encode a homolog of TerS, which complexes with the phage-coded large terminase subunit TerL to enable packaging of the SaPI DNA in infectious particles composed of phage proteins. These also contain a morphogenesis (cpm) module that causes the formation of small capsids commensurate with the small SaPI genomes. Among the SaPI sequences first characterized, there were several that did not include either a TerS homolog or a cpm homolog, and the same is true of several subsequently identified SaPIs from bovine sources and for many phage-inducible chromosomal islands from other species. It was assumed, for these several islands, either that they were defective derivatives of elements that originally possessed these genes, or that terS and cpm genes were present but not recognized by homology.

Quiles-Puchalt et al observed that an important feature of φSLT/SaPIbov5 packaging is the requirement for an HNH nuclease, which is encoded next to the φSLT terminase module. Proteins carrying HNH domains are widespread in nature, being present in organisms of all kingdoms. The HNH motif is a degenerate small nucleic acid-binding and cleavage module of about 30-40 aa residues and is bound by a single divalent metal ion. The HNH motif has been found in a variety of enzymes playing important roles in many different cellular processes, including bacterial killing; DNA repair, replication, and recombination; and processes related to RNA. HNH endonucleases are present in a number of cos-site bacteriophages of Gram-positive and -negative bacteria, always adjacent to the genes encoding the terminases and other morphogenetic proteins. Quiles-Puchalt et al have demonstrated that the HNH nucleases encoded by φ12 and the closely related φSLT have nonspecific nuclease activity and are required for the packaging of these phages and of SaPIbov5. Quiles-Puchalt et al have shown that HNH and TerL are jointly required for cos-site cleavage. Quiles-Puchalt et al have also observed that only cos phages of Gram-negative as well as of Gram-positive bacteria encode HNH nucleases, consistent with a special requirement for cos-site cleavage as opposed to pac-site cleavage, which generates flush-ended products. The demonstration that HNH nuclease activity is required for some but not other cos phages suggests that there is a difference between the TerL proteins of the two types of phages—one able to cut both strands and the other needing a second protein to enable the generation of a double-stranded cut.

In the alternative, instead of a bacterium, each producer and/or target cell is an archaeal cell and instead of a phage there is a virus that is capable of infecting the archaeal cell (or each particle comprises a capsid (and optionally tail fibres) of such a virus).

Optionally, the transduction particles are non-self replicative particles. A "non-self replicative transduction particle" refers to a particle, (eg, a phage or phage-like particle; or a particle produced from a genomic island (eg, a SaPI) or a modified version thereof) capable of delivering a nucleic acid molecule encoding an antibacterial agent or component into a bacterial cell, but does not package its own replicated genome into the transduction particle. In an alternative herein, instead of a phage, there is used or packaged a virus that infects an animal, human, plant or yeast target cell. For example, an adenovirus when the target cell is a human cell.

Optionally, the genome of each particle is devoid of genes encoding phage structural proteins. These can be supplied instead by a helper phage during production. Optionally, the genome of each particle is devoid of one or more phage genes rinA, terS and terL.

Optionally, the genomic island is an island that is naturally found in target and/or producer bacterial cells (and optionally in particles of the invention, the genomic island DNA comprises the NSI). In an example, the genomic island is selected from the group consisting of a SaPI, a SaPI1, a SaPI2, a SaPIbov1 and a SaPibov2 genomic island. For example, the island is a modified pathogenicity island. Optionally, the pathogenicity island is an island that is naturally found in target and/or producer bacterial cells, eg, a *Staphylococcus* SaPI or a Vibro PLE or a *P. aeruginosa* pathogenicity island (eg, a PAPI or a PAGI, eg, PAPI-1, PAGI-5, PAGI-6, PAGI-7, PAGI-8, PAGI-9, PAGI-10, or PAGI-11. Optionally, the pathogenicity island is a SaPI (*S aureus* pathogenicity island); optionally, a helper phage is used during production in this case, wherein the helper phage is φ11, 80α, φ12 or φSLT. *Staphylococcus* phage 80α appears to mobilise all known SaPIs. Thus, in an example, the genome of each particle comprises modified SaPI and the helper phage is a 80α. Optionally, the pathogenicity island is a *V. cholerae* PLE (phage-inducible chromosomal island-like element) and optionally the first phage is ICP1. Optionally, the pathogenicity island is an *E coli* PLE.

Optionally, each particle genome comprises P4 DNA, eg, at least P4 packaging signal sequence. The particle may comprise DNA comprising a P4 packaging signal and the NSI or antibacterial means. In an embodiment, a helper phage is used to produce the particle, wherein the helper phage is a P2 phage or a modified P2 phage that is self-replicative defective; optionally present as a prophage in the producer cell genome.

Optionally, the transcription of particle nucleic acid is under the control of a constitutive promoter, for transcription of copies of the antibacterial agent or component or NSI in a target cell.

Optionally, Constitutive transcription and production in target cells may be used where the target cells should be killed, eg, in medical settings.

Optionally, the transcription of particle nucleic acid is under the control of an inducible promoter, for transcription of copies of the antibacterial agent or component or NSI in a target cell.

This may be useful, for example, to control switching on of the antibacterial activity against target bacterial cells, such as in an environment (eg, soil or water) or in an industrial culture or fermentation container containing the target cells. For example, the target cells may be useful in an industrial process (eg, for fermentation, eg, in the brewing or dairy industry) and the induction enables the process to be controlled (eg, stopped or reduced) by using the antibacterial agent against the target bacteria.

When the agent comprises a plurality of components, eg, wherein the agent is a CRISPR/Cas system, or is a CRISPR array encoding crRNA or a nucleic acid encoding a guide RNA (eg, single guide RNA) operable with a Cas in target cells, wherein the crRNA or gRNA guides the Cas to a target sequence in the cell to modify the target (eg, cut it or repress transcription from it). Optionally, the genes are comprised by the target cell chromosome and/or one or more cell episome(s).

Optionally, the agent is a guided nuclease system or a component thereof, wherein the agent is capable of recognising and cutting target cell DNA (eg, chromosomal DNA).

In examples, such cutting causes one or more of the following:—

(i) The target cell is killed by the antibacterial agent;
(ii) growth or proliferation of the target cell is reduced; and/or
(iii) The target cell is sensitised to an antibiotic, whereby the antibiotic is toxic to the cell.

Optionally, the guided nuclease system is selected from a CRISPR/Cas system, TALEN system, meganuclease system or zinc finger system. Optionally, the system is a CRISPR/Cas system and each particle genome encodes a (a) CRISPR array encoding crRNA or (b) a nucleic acid encoding a guide RNA (gRNA, eg, single guide RNA), wherein the crRNA or gRNA is operable with a Cas in target cells, wherein the crRNA or gRNA guides the Cas to a target nucleic acid sequence in the target cell to modify the target sequence (eg, cut it or repress transcription from it). Optionally, the Cas is a Cas encoded by a functional endogenous nucleic acid of a target cell. For example, the target is comprised by a DNA or RNA of the target cell. Optionally, the system is a CRISPR/Cas system and each particle genome encodes a Cas (eg, a Cas nuclease) that is operable in a target bacterial cell to modify a target nucleic acid sequence comprised by the target cell.

Any Cas herein may be a Cas3, Cas9, Cas13, CasX, CasY or Cpf1.

Optionally, the system is a CRISPR/Cas system and each particle genome encodes one or more Cascade Cas (eg, Cas, A, B, C, D and E).

Optionally, each particle genome further encodes a Cas3 that is operable in a target bacterial cell with the Cascade Cas.

Optionally, the producer and/or target cell is a cell of a first species or strain, wherein the first species or strain is a gram positive species or strain.

Optionally, the producer and/or target cell is a cell of a first species or strain, wherein the first species or strain is a gram negative species or strain.

Optionally, the first species or strain is selected from Table 6 For example, the first species or strain is selected from *Shigella, E coli, Salmonella, Serratia, Klebsiella, Yersinia, Pseudomonas* and *Enterobacter*. These are species that P2 phage can infect. Thus, in an embodiment, the particle genome comprises one or more P4 sequences (eg, a P4 packaging sequence) and the genome is packaged by a P2 phage capsid. Thus, the genome is packaged by P2 structural proteins and the resultant transduction particles can usefully infect a broad spectrum of species, ie, two or more of *Shigella, E coli, Salmonella, Serratia, Klebsiella, Yersinia, Pseudomonas* and *Enterobacter*. This provides a broadly-applicable delivery platform, where target cell antibacterial specificity can be achieved by encoding on the particle genome guide RNA(s) that specifically target one or more predetermined species within the group of *Shigella, E coli, Salmonella, Serratia, Klebsiella, Yersinia, Pseudomonas* and *Enterobacter*.

By "non-replicative" or "replicative-defective" it is meant that the particle is not capable by itself of self-replicating.

For example, the particle genome is devoid of one or more nucleotide sequences encoding a protein (eg, a structural protein) that is necessary to produce a transduction particle.

In an example, the reduction in growth or proliferation of target cells is at least 50, 60, 70, 80, 90 or 95%.

In an example each producser cell and/or target cell is selected from a Staphylococcal, *Vibrio, Pseudomonas, Clostridium, E coli, Helicobacter, Klebsiella* and *Salmonella* cell.

Optionally, each particle comprises a plasmid comprising
  a. A nucleotide sequence encoding an antibacterial agent or component thereof for expression in target bacterial cells;
  b. A constitutive promoter for controlling the expression of the agent or component;
  c. An optional terS nucleotide sequence;
  d. An origin of replication (ori); and
  e. A phage packaging sequence (optionally pac, cos or a homologue thereof); and
  f. the plasmid being devoid of
  g. All nucleotide sequences encoding phage structural proteins necessary for the production of a transduction particle (optionally a phage), or the plasmid being devoid of at least one of such sequences; and
  h. Optionally terL.

Optionally, the antibacterial agent is a CRISPR/Cas system and the plasmid encodes a crRNA or guide RNA (eg, single gRNA) that is operable with a Cas in the target cells to guide the Cas to a target nucleotide sequence to modify (eg, cut) the sequence, whereby
  (a) target cells are killed by the antibacterial agent;
  (b) growth or proliferation of target cells is reduced; or
  (c) target cells are sensitised to an antibiotic, whereby the antibiotic is toxic to the cells.

Optionally, the antibacterial agent is a CRISPR/Cas system and the plasmid encodes a Cas that is operable with a crRNA or guide RNA (eg, single gRNA) in the target cells to guide the Cas to a target nucleotide sequence to modify (eg, cut) the sequence, whereby
  (a) target cells are killed by the antibacterial agent;
  (b) growth or proliferation of target cells is reduced; or
  (c) target cells are sensitised to an antibiotic, whereby the antibiotic is toxic to the cells.

Optionally, the plasmid further encodes said crRNA or gRNA.

A plurality of transduction particles obtainable by the method of the invention is provided for use in medicine, eg, for treating or preventing an infection of a human or animal subject by target bacterial cells, wherein transducing particles are administered to the subject for infecting target cells and killing the cells using the antibacterial agent.

Optionally, the particles are for administration to a human or animal for medical use.

Further Concepts of the invention are as follows:—

The present invention is optionally for an industrial or domestic use, or is used in a method for such use. For example, it is for or used in agriculture, oil or petroleum industry, food or drink industry, clothing industry, packaging industry, electronics industry, computer industry, environmental industry, chemical industry, aerospace industry, automotive industry, biotechnology industry, medical industry, healthcare industry, dentistry industry, energy industry, consumer products industry, pharmaceutical industry, mining industry, cleaning industry, forestry industry, fishing industry, leisure industry, recycling industry, cosmetics industry, plastics industry, pulp or paper industry, textile industry, clothing industry, leather or suede or animal hide industry, tobacco industry or steel industry.

The present invention is optionally for use in an industry or the environment is an industrial environment, wherein the industry is an industry of a field selected from the group consisting of the medical and healthcare; pharmaceutical; human food; animal food; plant fertilizers; beverage; dairy; meat processing; agriculture; livestock farming; poultry farming; fish and shellfish farming; veterinary; oil; gas; petrochemical; water treatment; sewage treatment; packaging; electronics and computer; personal healthcare and toiletries; cosmetics; dental; non-medical dental; ophthalmic; non-medical ophthalmic; mineral mining and processing; metals mining and processing; quarrying; aviation; automotive; rail; shipping; space; environmental; soil treatment; pulp and paper; clothing manufacture; dyes; printing; adhesives; air treatment; solvents; biodefence; vitamin supplements; cold storage; fibre retting and production; biotechnology; chemical; industrial cleaning products; domestic cleaning products; soaps and detergents; consumer products; forestry; fishing; leisure; recycling; plastics; hide, leather and suede; waste management; funeral and undertaking; fuel; building; energy; steel; and tobacco industry fields.

In an example, each particle genome comprises a CRISPR array that encodes a respective guide RNA that targets target bacteria, wherein the array comprises one, or two or more spacers (eg, 2, 3, 4, 5, 6, 7, 8, 9, 10, 20, 30, 40, 50 or more spacers) for targeting the genome of target bacteria.

In an example, the target bacteria are comprised by an environment as follows. In an example, the environment is a microbiome of a human, eg, the oral cavity microbiome or gut microbiome or the bloodstream. In an example, the environment is not an environment in or on a human. In an example, the environment is not an environment in or on a non-human animal. In an embodiment, the environment is an air environment. In an embodiment, the environment is an agricultural environment. In an embodiment, the environment is an oil or petroleum recovery environment, eg, an oil or petroleum field or well. In an example, the environment is an environment in or on a foodstuff or beverage for human or non-human animal consumption.

In an example, the environment is a a human or animal microbiome (eg, gut, vaginal, scalp, armpit, skin or oral cavity microbiome). In an example, the target bacteria are comprised by a human or animal microbiome (eg, gut, vaginal, scalp, armpit, skin or oral cavity microbiome).

In an example, the particles, population or composition of the invention are administered intranasally, topically or orally to a human or non-human animal, or is for such administration. The skilled person aiming to treat a microbiome of the human or animal will be able to determine the best route of administration, depending upon the microbiome of interest. For example, when the microbiome is a gut microbiome, administration can be intranasally or orally. When the microbiome is a scalp or armpit microbiome, administration can be topically. When the microbiome is in the mouth or throat, the administration can be orally.

In any use or method herein, in an embodiment particles of the invention are contacted with the target bacteria at a multiplicity of infection (MOI) of at least 0.5, 1, 2, 3, 4, 5, 6, 7, 8, 9, 10, 15, 20, 25, 30, 35, 40, 45, 50, 55, 60, 65, 70, 75, 80, 85, 90, 95, 100, 110, 120, 130, 140, 150, 160, 170, 180, 190, 200, 300, 400, 500, 600 or 700. For example, the MOI is from 20 to 200, from 20 to 100, from 50 to 200, from 50 to 100, from 75 to 150, 100 or about 100, or 200 or about 200. In an example, this may be determined by obtaining a sample of the microbiome containing the target bacteria (eg, a sample of a waterway or gut microbiome of a subject) and determining the number of CFU/ml or mg in the sample and using this to titrate the phage dose at the desired MOI to be exposed to the microbiome or administered to the environment or subject to be treated.

In an example, the environment is harboured by a beverage or water (eg, a waterway or drinking water for human consumption) or soil. The water is optionally in a heating, cooling or industrial system, or in a drinking water storage container.

In an example, the producer and/or target bacteria are Firmicutes selected from *Anaerotruncus, Acetanaerobacterium, Acetitomaculum, Acetivibrio, Anaerococcus, Anaerofilum, Anaerosinus, Anaerostipes, Anaerovorax, Butyrivibrio, Clostridium, Capracoccus, Dehalobacter, Dialister, Dorea, Enterococcus, Ethanoligenens, Faecalibacterium, Fusobacterium, Gracilibacter, Guggenheimella, Hespellia, Lachnobacterium, Lachnospira, Lactobacillus, Leuconostoc, Megamonas, Moryella, Mitsuokella, Oribacterium, Oxobacter, Papillibacter, Proprionispira, Pseudobutyrivibrio, Pseudoramibacter, Roseburia, Ruminococcus, Sarcina, Seinonella, Shuttleworthia, Sporobacter, Sporobacterium, Streptococcus, Subdoligranulum, Syntrophococcus, Thermobacillus, Turibacter* and *Weisella.*

In an example, the particles, population, composition, use or method is for reducing pathogenic infections or for re-balancing gut or oral microbiota eg, for treating or preventing obesity or disease in a human or animal. For example, the particles, population, composition, use or method is for knocking-down *Clostridium difficile* or *E coli* bacteria in a gut microbiota of a human or animal.

In an example, the disease or condition is a cancer, inflammatory or autoimmune disease or condition, eg, obesity, diabetes, IBD (eg, wherein the target cell is an *E coli* or *Klebsiella* cell), a GI tract condition or an oral cavity condition.

Optionally, the environment is comprised by, or the target bacteria are comprised by, a gut microbiota, skin microbiota, oral cavity microbiota, throat microbiota, hair microbiota, armpit microbiota, vaginal microbiota, rectal microbiota, anal microbiota, ocular microbiota, nasal microbiota, tongue microbiota, lung microbiota, liver microbiota, kidney microbiota, genital microbiota, penile microbiota, scrotal microbiota, mammary gland microbiota, ear microbiota, urethra microbiota, labial microbiota, organ microbiota or dental microbiota. Optionally, the environment is comprised by, or the target bacteria are comprised by, a plant (eg, a tobacco, crop plant, fruit plant, vegetable plant or tobacco, eg on the surface of a plant or contained in a plant) or by an environment (eg, soil or water or a waterway or aqueous liquid).

Optionally, the disease or condition of a human or animal subject is selected from
- (a) A neurodegenerative disease or condition;
- (b) A brain disease or condition;
- (c) A CNS disease or condition;
- (d) Memory loss or impairment;
- (e) A heart or cardiovascular disease or condition, eg, heart attack, stroke or atrial fibrillation;
- (f) A liver disease or condition;
- (g) A kidney disease or condition, eg, chronic kidney disease (CKD);
- (h) A pancreas disease or condition;
- (i) A lung disease or condition, eg, cystic fibrosis or COPD;
- (j) A gastrointestinal disease or condition;
- (k) A throat or oral cavity disease or condition;
- (l) An ocular disease or condition;
- (m) A genital disease or condition, eg, a vaginal, labial, penile or scrotal disease or condition;
- (n) A sexually-transmissible disease or condition, eg, gonorrhea, HIV infection, syphilis or *Chlamydia* infection;
- (o) An ear disease or condition;
- (p) A skin disease or condition;
- (q) A heart disease or condition;
- (r) A nasal disease or condition
- (s) A haematological disease or condition, eg, anaemia, eg, anaemia of chronic disease or cancer;
- (t) A viral infection;
- (u) A pathogenic bacterial infection;
- (v) A cancer;
- (w) An autoimmune disease or condition, eg, SLE;
- (x) An inflammatory disease or condition, eg, rheumatoid arthritis, psoriasis, eczema, asthma, ulcerative colitis, colitis, Crohn's disease or IBD;
- (y) Autism;
- (z) ADHD;
- (aa) Bipolar disorder;
- (bb) ALS [Amyotrophic Lateral Sclerosis];
- (cc) Osteoarthritis;
- (dd) A congenital or development defect or condition;
- (ee) Miscarriage;
- (ff) A blood clotting condition;
- (gg) Bronchitis;
- (hh) Dry or wet AMD;
- (ii) Neovascularisation (eg, of a tumour or in the eye);
- (jj) Common cold;
- (kk) Epilepsy;
- (ll) Fibrosis, eg, liver or lung fibrosis;
- (mm) A fungal disease or condition, eg, thrush;
- (nn) A metabolic disease or condition, eg, obesity, anorexia, diabetes, Type I or Type II diabetes.
- (oo) Ulcer(s), eg, gastric ulceration or skin ulceration;
- (pp) Dry skin;
- (qq) Sjogren's syndrome;
- (rr) Cytokine storm;
- (ss) Deafness, hearing loss or impairment;
- (tt) Slow or fast metabolism (ie, slower or faster than average for the weight, sex and age of the subject):
- (uu) Conception disorder, eg, infertility or low fertility;
- (vv) Jaundice;
- (ww) Skin rash;
- (xx) Kawasaki Disease;
- (yy) Lyme Disease;
- (zz) An allergy, eg, a nut, grass, pollen, dust mite, cat or dog fur or dander allergy;
- (aaa) Malaria, typhoid fever, tuberculosis or cholera;
- (bbb) Depression;
- (ccc) Mental retardation;
- (ddd) Microcephaly;
- (cee) Malnutrition;
- (fff) Conjunctivitis;
- (ggg) Pneumonia;
- (hhh) Pulmonary embolism;
- (iii) Pulmonary hypertension;
- (ii) A bone disorder;
- (kkk) Sepsis or septic shock;
- (lll) Sinusitus;
- (mmm) Stress (eg, occupational stress);
- (nnn) Thalassaemia, anaemia, von Willebrand Disease, or haemophilia;
- (ooo) Shingles or cold sore;
- (ppp) Menstruation;
- (qqq) Low sperm count.

Neurodegenerative or Cns Diseases or Conditions for Treatment or Prevention by the Invention In an example, the neurodegenerative or CNS disease or condition is selected from the group consisting of Alzheimer disease, geriopsychosis, Down syndrome, Parkinson's disease, Creutzfeldt-jakob disease, diabetic neuropathy, Parkinson syndrome, Huntington's disease, Machado-Joseph disease, amyotrophic lateral sclerosis, diabetic neuropathy, and Creutzfeldt Creutzfeldt-Jakob disease. For example, the disease is Alzheimer disease. For example, the disease is Parkinson syndrome.

In an example, wherein the method of the invention is practised on a human or animal subject for treating a CNS or neurodegenerative disease or condition, the method causes downregulation of Treg cells in the subject, thereby promoting entry of systemic monocyte-derived macrophages and/or Treg cells across the choroid plexus into the brain of the subject, whereby the disease or condition (eg, Alzheimer's disease) is treated, prevented or progression thereof is reduced. In an embodiment the method causes an increase of IFN-gamma in the CNS system (eg, in the brain and/or CSF) of the subject. In an example, the method restores nerve fibre and/or reduces the progression of nerve fibre damage. In an example, the method restores nerve myelin and/or reduces the progression of nerve myelin damage. In an example, the method of the invention treats or prevents a disease or condition disclosed in WO2015136541 and/or the method can be used with any method disclosed in WO2015136541 (the disclosure of this document is incorporated by reference herein in its entirety, eg, for providing disclosure of such methods, diseases, conditions and potential therapeutic agents that can be administered to the subject for effecting treatment and/or prevention of CNS and neurodegenerative diseases and conditions, eg, agents such as immune checkpoint inhibitors, eg, anti-PD-1, anti-PD-L1, anti-TIM3 or other antibodies disclosed therein).

Cancers for Treatment or Prevention by the Method

Cancers that may be treated include tumours that are not vascularized, or not substantially vascularized, as well as vascularized tumours. The cancers may comprise non-solid tumours (such as haematological tumours, for example, leukaemias and lymphomas) or may comprise solid tumours. Types of cancers to be treated with the invention include, but are not limited to, carcinoma, blastoma, and sarcoma, and certain leukaemia or lymphoid malignancies, benign and malignant tumours, and malignancies e.g., sarcomas, carcinomas, and melanomas. Adult tumours/cancers and paediatric tumours/cancers are also included.

Haematologic cancers are cancers of the blood or bone marrow. Examples of haematological (or haematogenous) cancers include leukaemias, including acute leukaemias (such as acute lymphocytic leukaemia, acute myelocytic leukaemia, acute myelogenous leukaemia and myeloblasts, promyeiocytic, myelomonocytic, monocytic and erythroleukaemia), chronic leukaemias (such as chronic myelocytic (granulocytic) leukaemia, chronic myelogenous leukaemia, and chronic lymphocytic leukaemia), polycythemia vera, lymphoma, Hodgkin's disease, non-Hodgkin's lymphoma (indolent and high grade forms), multiple myeloma, Waldenstrom's macroglobulinemia, heavy chain disease, myeiodysplastic syndrome, hairy cell leukaemia and myelodysplasia.

Solid tumours are abnormal masses of tissue that usually do not contain cysts or liquid areas. Solid tumours can be benign or malignant. Different types of solid tumours are named for the type of cells that form them (such as sarcomas, carcinomas, and lymphomas). Examples of solid tumours, such as sarcomas and carcinomas, include fibrosarcoma, myxosarcoma, liposarcoma, chondrosarcoma, osteosarcoma, and other sarcomas, synovioma, mesothelioma, Ewing's tumour, leiomyosarcoma, rhabdomyosarcoma, colon carcinoma, lymphoid malignancy, pancreatic cancer, breast cancer, lung cancers, ovarian cancer, prostate cancer, hepatocellular carcinoma, squamous eel! carcinoma, basal cell carcinoma, adenocarcinoma, sweat gland carcinoma, medullary thyroid carcinoma, papillary thyroid carcinoma, pheochromocytomas sebaceous gland carcinoma, papillary carcinoma, papillary adenocarcinomas, medullary carcinoma, bronchogenic carcinoma, renal cell carcinoma, hepatoma, bile duct carcinoma, choriocarcinoma, Wilms' tumour, cervical cancer, testicular tumour, seminoma, bladder carcinoma, melanoma, and CNS tumours (such as a glioma (such as brainstem glioma and mixed gliomas), glioblastoma (also known as glioblastoma multiforme) astrocytoma, CNS lymphoma, germinoma, medulloblastoma, Schwannoma craniopharyngioma, ependymoma, pinealoma, hemangioblastoma, acoustic neuroma, oligodendroglioma, meningioma, neuroblastoma, retinoblastoma and brain metastases).

Autoimmune Diseases for Treatment or Prevention by the Method

1. Acute Disseminated Encephalomyelitis (ADEM)
2. Acute necrotizing hemorrhagic leukoencephalitis
3. Addison's disease
4. Agammaglobulinemia
5. Alopecia areata
6. Amyloidosis
7. Ankylosing spondylitis
8. Anti-GBM/Anti-TBM nephritis
9. Antiphospholipid syndrome (APS)
10. Autoimmune angioedema
11. Autoimmune aplastic anemia
12. Autoimmune dysautonomia
13. Autoimmune hepatitis
14. Autoimmune hyperlipidemia
15. Autoimmune immunodeficiency
16. Autoimmune inner ear disease (AIED)
17. Autoimmune myocarditis
18. Autoimmune oophori is
19. Autoimmune pancreatiti
20. Autoimmune retinopathy
21. Autoimmune thrombocytopeniarpura (ATP)
22. Autoimmune thyroid disease
23. Autoimmune urticaria
24. Axonal & neuronal neuropathies
25. Balo disease
26. Behcet's disease
27. Bollous pemphigoid
28. Cardiomyopathy
29. Castleman disease
30. Celiac disease
31. Chagas disease
32. Chronic fatigue syndrome
33. Chronic inflammatory demyelinating polyneuropathy (CIDP)
34. Chronic recurrent multifocal ostomyelitis (CRMO)
35. Churg-Strauss syndrome
36. Cicatricial pemphigoid/benign mucosal pemphigoid
37. Crohn's disease
38. Cogans syndrome
39. Cold agglutinin disease
40. Congenital heart block
41. Coxsackie myocarditis
42. CREST disease 43. Essential mixed cryoglobulinemia
44. Demyelinating neuropathies
45. Dermatitis herpetiformis
46. Dermatomyositis
47. Devic's disease (neuromyelitis optica)
48. Discoid lupus
49. Dressler's syndrome
50. Endometriosis
51. Eosinophilic esophagitis
52. Eosinophilic fasciitis
53. Erythema nodosum
54. Experimental allergic encephalomyelitis
55. Evans syndrome
56. Fibromyalgia
57. Fibrosing alveolitis
58. Giant cell arteritis (temporal arteritis)
59. Giant cell myocarditis
60. Glomerulonephritis
61. Goodpasture's syndrome
62. Granulomatosis with Polyangiitis (GPA) (formerly called Wegener's Granulomatosis)
63. Graves' disease
64. Guillain-Barre syndrome
65. Hashimoto's encephalitis
66. Hashimoto's thyroiditis
67. Hemolytic anemia
68. Henoch-Schonlein purpura
69. Herpes gestationis
70. Hypogammaglobulinemia
71. Idiopathic thrombocytopenic purpura (ITP)
72. IgA nephropathy
73. IgG4-related sclerosing disease
74. Immunoregulatory lipoproteins
75. Inclusion body myositis
76. Interstitial cystitis
77. Juvenile arthritis
78. Juvenile diabetes (Type 1 diabetes)
79. Juvenile myositis
80. Kawasaki syndrome
81. Lambert-Eaton syndrome
82. Leukocytoclastic vasculitis
83. Lichen planus
84. Lichen sclerosus
85. Ligneous conjunctivitis
86. Linear IgA disease (LAD)
87. Lupus (SLE)
88. Lyme disease, chronic
89. Meniere's disease
90. Microscopic polyangiitis
91. Mixed connective tissue disease (MCTD)
92. Mooren's ulcer
93. Mucha-Habermann disease
94. Multiple sclerosis
95. Myasthenia gravis
96. Myositis
97. Narcolepsy
98. Neuromyelitis optica (Devic's)
99. Neutropenia
100. Ocular cicatricial pemphigoid
101. Optic neuritis
102. Palindromic rheumatism
103. PANDAS (Pediatric Autoimmune Neuropsychiatric Disorders Associated with *Streptococcus*)
104. Paraneoplastic cerebellar degeneration
105. Paroxysmal nocturnal hemoglobinuria (PNH)
106. Parry Romberg syndrome
107. Parsonnage-Turner syndrome
108. Pars planitis (peripheral uveitis)
109. Pemphigus
110. Peripheral neuropathy
111. Perivenous encephalomyelitis
112. Pernicious anemia
113. POEMS syndrome
114. Polyarteritis nodosa
115. Type I, II & III autoimmune polyglandular syndromes
116. Polymyalgia rheumatica
117. Polymyositis
118. Postmyocardial infarction syndrome
119. Postpericardiotomy syndrome
120 Progesterone dermatitis
121. Primary biliary cirrhosis
122 Primary sclerosing cholangitis
123. Psoriasis
124 Psoriatic arthritis
125. Idiopathic pulmonary fibrosis
126. Pyoderma gangrenosum
127. Pure red cell aplasia
128. Raynauds phenomenon
129 Reactive Arthritis
130. Reflex sympathetic dystrophy
131. Reiter's syndrome
132. Relapsing polychondritis
133. Restless legs syndrome
134. Retroperitoneal fibrosis
135. Rheumatic fever
136. Rheumatoid arthritis
137. Sarcoidosis
138. Schmidt syndrome
139. Scleritis
140. Scleroderma
141. Sjogren's syndrome
142. Sperm & testicular autoimmunity
143. Stiff person syndrome
144. Subacute bacterial endocarditis (SBE)
145. Susac's syndrome
146. Sympathetic ophthalmia
147. Takayasu's arteritis
148. Temporal arteritis/Giant cell arteritis
149. Thrombocytopenia purpura (TTP)
150. Tolosa-Hunt syndrome
151. Transverse myelitis
152. Type 1 diabetes
153. Ulcerative colitis
154. Undifferentiated connective tissue disease (UCTD)
155. Uveitis
156. Vasculitis
157. Vesiculobullous dermatosis
158. Vitiligo
159 Wegener's granulomatosis (now termed Granulomatosis with Polyangiitis (GPA).

Inflammatory Diseases for Treatment or Prevention by the Method
1. Alzheimer
2. ankylosing spondylitis
3. arthritis (osteoarthritis, rheumatoid arthritis (RA), psoriatic arthritis)
4. asthma
5. atherosclerosis
6. Crohn's disease
7. colitis
8. dermatitis
9. diverticulitis 10. fibromyalgia
11. hepatitis
12. irritable bowel syndrome (IBS)
13. systemic lupus erythematous (SLE)
14. nephritis
15. Parkinson's disease
16. ulcerative colitis.

In an example, any composition of the invention comprises at least $1\times10^3$ transduction particles of the invention per ml or mg, such as when the composition is comprised by a fluid (eg, a liquid) or solid. In an example, any composition of the invention comprises at least $1\times10^4$ transduction particles of the invention per ml or mg. In an example, any composition of the invention comprises at least $1\times10^5$ transduction particles of the invention per ml or mg. In an example, any composition of the invention comprises at least $1\times10^6$ transduction particles of the invention per ml or mg. In an example, any composition of the invention comprises at least $1\times10^7$ transduction particles of the invention per ml or mg. In an example, any composition of the invention comprises at least $1\times10^8$ transduction particles of the invention per ml or mg. In an example, any composition of the invention comprises at least $1\times10^9$ transduction particles of the invention per ml or mg. In an example, any composition of the invention comprises at least $1\times10^{10}$ transduction particles of the invention per ml or mg. In an example, any composition of the invention comprises at least $1\times10^{11}$ transduction particles of the invention per ml or mg. In an example, any composition of the invention comprises at least $1\times10^{12}$ transduction particles of the invention per ml or mg. In an example, any composition of the invention comprises at least $1\times10^{13}$ transduction particles of the invention per ml or mg. In an example, any composition of the invention comprises at least $1\times10^{14}$ transduction particles of the invention per ml or mg.

In an example, any composition of the invention comprises up to $1\times10^{14}$ transduction particles of the invention per ml or mg, such as when the composition is comprised by a fluid (eg, a liquid) or solid. In an example, any composition of the invention comprises up to $1\times10^{13}$ transduction particles of the invention per ml or mg. In an example, any composition of the invention comprises up to $1\times10^{12}$ transduction particles of the invention per ml or mg. In an example, any composition of the invention comprises up to $1\times10^{11}$ transduction particles of the invention per ml or mg. In an example, any composition of the invention comprises up to $1\times10^{10}$ transduction particles of the invention per ml or mg. In an example, any composition of the invention comprises up to $1\times10^9$ transduction particles of the invention per ml or mg.

In an example, any composition of the invention comprises at least $1\times10^3$ to $1\times10^{10}$, $1\times10^{11}$, $1\times10^{12}$, $1\times10^{13}$ or $1\times10^{14}$ transduction particles of the invention per ml or mg, such as when the composition is comprised by a fluid (eg, a liquid) or solid. In an example, any composition of the invention comprises at least $1\times10^4$ to $1\times10^{10}$, $1\times10^{11}$, $1\times10^{12}$, $1\times10^{13}$ or $1\times10^{14}$ transduction particles of the invention per ml or mg. In an example, any composition of the invention comprises at least $1\times10^5$ to $1\times10^{10}$, $1\times10^{11}$, $1\times10^{12}$, $1\times10^{13}$ or $1\times10^{14}$ transduction particles of the invention per ml or mg. In an example, any composition of the invention comprises at least $1\times10^6$ to $1\times10^{10}$, $1\times10^{11}$, $1\times10^{12}$, $1\times10^{13}$ or $1\times10^{14}$ transduction particles of the invention per ml or mg. In an example, any composition of the invention comprises at least $1\times10^7$ to $1\times10^{10}$, $1\times10^{11}$, $1\times10^{12}$, $1\times10^{13}$ or $1\times10^{14}$ transduction particles of the invention per ml or mg. In an example, any composition of the invention comprises at least $1\times10^8$ to $1\times10^{10}$, $1\times10^{11}$, $1\times10^{12}$, $1\times10^{13}$ or $1\times10^{14}$ transduction particles of the invention per ml or mg. In an example, any composition of the invention comprises at least $1\times10^9$ to $1\times10^{10}$, $1\times10^{11}$, $1\times10^{12}$, $1\times10^{13}$ or $1\times10^{14}$ transduction particles of the invention per ml or mg. In an example, any composition of the invention comprises at least $1\times10^{10}$ to $1\times10^{10}$, $1\times10^{11}$, $1\times10^{12}$, $1\times10^{13}$ or $1\times10^{14}$ transduction particles of the invention per ml or mg. In an example, any composition of the invention comprises at least $1\times10^{11}$ to $1\times10^{10}$, $1\times10^{11}$, $1\times10^{12}$, $1\times10^{13}$ or $1\times10^{14}$ transduction particles of the invention per ml or mg. In an example, any composition of the invention comprises at least $1\times10^{12}$ to $1\times10^{10}$, $1\times10^{11}$, $1\times10^{12}$, $1\times10^{13}$ or $1\times10^{14}$ transduction particles of the invention per ml or mg. In an example, any composition of the invention comprises at least $1\times10^{13}$ to $1\times10^{10}$, $1\times10^{11}$, $1\times10^{12}$, $1\times10^{13}$ or $1\times10^{14}$ transduction particles of the invention per ml or mg. In an example, any composition of the invention comprises at least $1\times10^{14}$ to $1\times10^{10}$, $1\times10^{11}$, $1\times10^{12}$, $1\times10^{13}$ or $1\times10^{14}$ transduction particles of the invention per ml or mg.

In an example, the composition comprises one or more doses of the transduction particles of the invention for administration to a subject for medical use, eg, to treat or prevent a disease or condition in the subject. In an example, the composition comprises a single dose. In an example, the composition comprises (or comprises at least) 2, 3, 4, 5, 6, 7, 8, 9, 10, 11, 12, 13, 14, 15, 16, 17, 18, 19, 20, 21, 22, 23, 24, 25, 26, 27, 28, 29 or 30 doses. In an example, each dose is (or is at least) a 0.5, 1, 2, 3, 4, 5, 10, 20, 25, 30, 40, 50, 75, 100, 125, 200 or 250 mg or ml dose comprising said phage (ie, the dose is said amount and comprises phage and an excipient, diluent or carrier for example).

In an example, the composition comprises one or more doses of the transduction particles of the invention for administration to a subject for non-medical use, eg, for agricultural use. In an example, the composition comprises a single dose. In an example, the composition comprises (or comprises at least) 2, 3, 4, 5, 6, 7, 8, 9, 10, 11, 12, 13, 14, 15, 16, 17, 18, 19, 20, 21, 22, 23, 24, 25, 26, 27, 28, 29 or 30 doses. In an example, each dose is (or is at least) a 0.5, 1, 2, 3, 4, 5, 10, 20, 25, 30, 40, 50, 75, 100, 125, 200, 250, 500, 750, 1000, 2000, 3000, 4000, 5000, 10000, 50000, 100000 mg or ml dose comprising said phage (ie, the dose is said amount and comprises phage and an excipient, diluent or carrier for example). The dose may be dissolved or diluted in a solvent (eg, an aqueous solvent or water) before use for contacting with target bacteria. In an example 1 imperial gallon comprises one dose of the transduction particles of the invention, eg. for agricultural use, such as crop spraying, or for animal or livestock use, such as use as a beverage.

Optionally, the NSI is comprised by a high copy number plasmid. Optionally, the NSI is comprised by a medium copy number plasmid. The meaning of low, medium and high copy number ori and plasmids is known to the skilled addressee and these are terms of art. As is known by the skilled person, copy number denotes the average number of plasmid copies per cell. For example, a low copy number plasmid is a plasmid that exists in from 1 to 10 copies per bacterial cell in which the plasmid is harboured; a medium copy number plasmid exists in from 11 to 50 (eg, 11 to 40 or 20 to 30 or 40) copies per cell; and a high copy number is >50 (eg, up to 100, 200, 250, 300, 400, 500, 600 or 700) copies per cell. In an example, the plasmid or vector comprising first DNA is a medium copy number plasmid or vector. In an example, the plasmid or vector comprising first DNA is a high copy number plasmid or vector. An example of common ori and plasmids is shown in Table 8.

EXAMPLES

Example 1: Increased Production of Transduction Particles by Inhibition of Phage Re-Absorption

BACKGROUND

This study relates to the production of transduction particles which contain a DNA sequence of interest, where the particles can usefully be used to infect target bacteria in to introduce the DNA for expression in the target bacteria. These particles can inject their DNA into the same set of bacterial strains as the original phage on which the particle design is based. Binding of the phage particles to the host cell requires the presence of one or more specific molecules on the surface of the cell, providing a phage receptor. We surprisingly see a very large increase in yield of particle production. Whilst not wishing to be bound by any theory, elimination of the phage receptor from the surface of the producer cells may prevent re-absorption of the produced particles thus increasing production yield significantly.

Methods & Results

We used the well-studied P2 phage/*Escherichia coli* system as a model. To identify P2 receptor mutants, we tested a set of single knockout mutants from the KEIO collection ("Construction of *Escherichia coli* K-12 in-frame, single-gene knockout mutants: the Keio collection", Tomoya Baba et al, DOI 10.1038/msb4100050, Molecular Systems Biology (2006) 2, 2006.0008) for P2 plaque formation in a standard soft agar overlay spot test. LB agar was prepared in petri dishes and covered by 3 ml soft agar overlay (LB+0.6% agar) containing 100 ul overnight cell culture. P2 vir phage lysate was spotted on the plates and after overnight incubation at 37° C. the plates were checked for plaque formation. We found that P2 does not plaque on a set of rfa mutants involved in LPS core biosynthesis (FIG. 1).

To construct a rceptor deletion mutant for further studies, we replaced the rfaD gene with a zeocin resistance marker in the *E. coli* C1a P2 lysogen using the Lambda Red system ("One-step inactivation of chromosomal genes in *Escherichia coli* K-12 using PCR products", Kirill A. Datsenko and Barry L. Wanner, PNAS Jone 6, 2000 97 (12) 6640-6645; doi.org/10.1073/pnas. 120163297). The zeocin marker of plasmid pEM7/zeo (Invitrogen) was PCR amplified using the primers rfaDupR (SEQ) ID NO: 1) and rfaDdnR (SEQ) ID NO: 2). *E. coli* C1a P2 lysogen cells were transformed with the plasmid pKD46 (GenBank: MP287367.1), carrying the Lambda Red system. The transformants were grown at 30° C. to mid log phase in LB containing 100 ug/ml ampicillin and induced with 0.4% for 2 h. Cells were washed with 20% glycerol and electroporated with the POR fragment containing the zeo marker. Recombinants were selected on LB zeo plates at 37° C., also eliminating the pKD46 plasmid, which has a temperature sensitive replication. Proper replacement of the rfaD gen with a zeo marker was sequence verified.

Both parental strain (C1a P2 lysogen) and the receptor mutant (C1a P2 lysogen ΔrfaD) were transformed with a plasmid, containing (i) the arabinose inducible P4 phage transactivation region (to induce the P2 helper functions), (ii) the P4 packaging site, (iii) a spectinomycin resistance marker, and (iv) the CloDF13 replication origin.

To compare the yield of the transduction particles obtained in the two strains, overnight cell cultures were diluted 1:25 in LB medium containing 50 μg/ml Spectinomycin, 10 mM $MgSO_4$, and 5 mM $CaCl_2$). After 90 minutes shaking at 37° C., 0.8% arabinose was added to the cultures. Due to the induction of the chromosomal P2 phage, cells lysed after 3 hours. Cell debris was removed by centrifugation and the lysate was extracted with chloroform to remove any remaining cells.

Figure 2A:
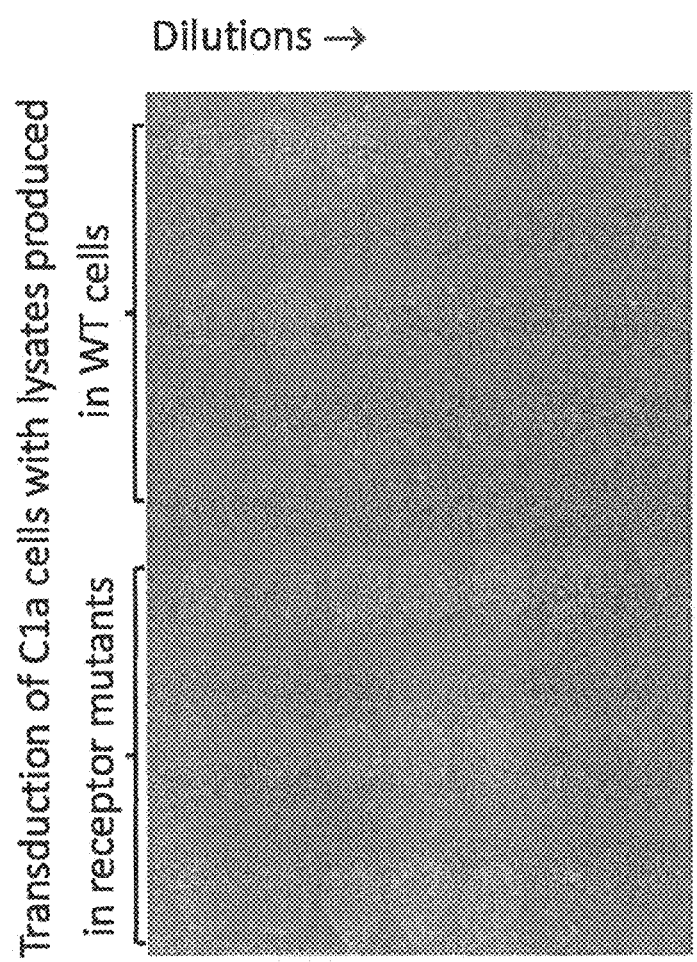
FIG. 2A: The yield of production was assayed by transduction of the spectinomycin marker to C1a cells. Lysates were serially diluted and mixed with a constant number of recipient cells.
Figure 2B:
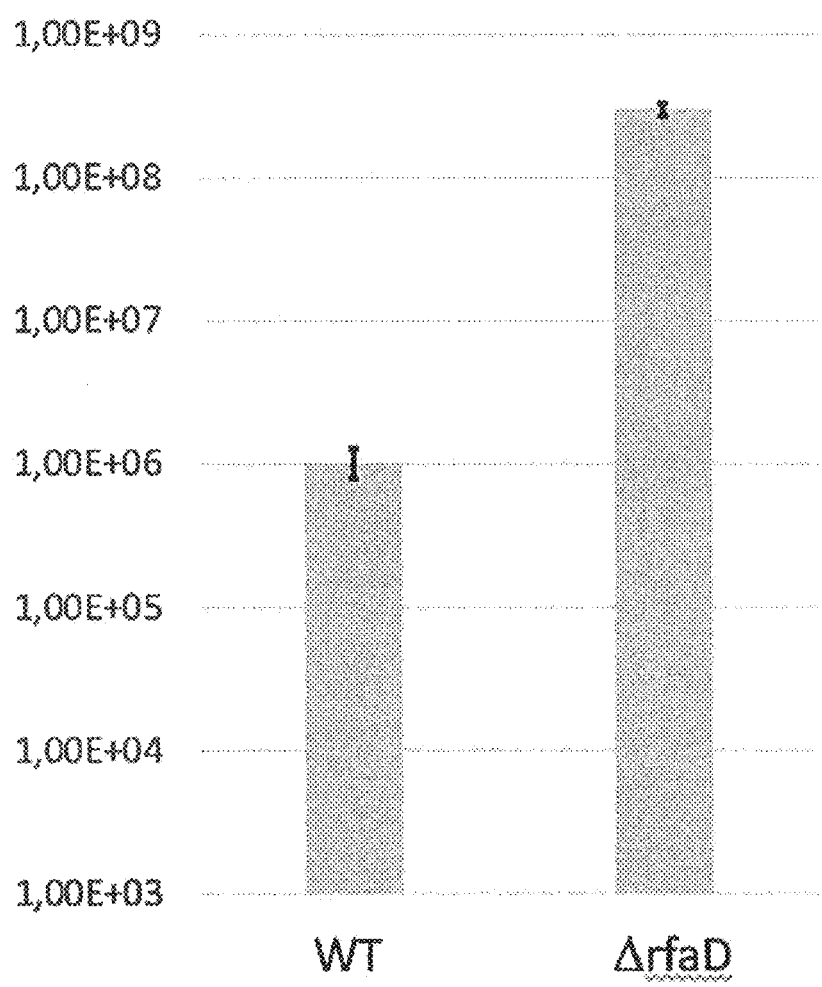
FIG. 2B: Transduction efficiencies, defined as the number of Spectinomycin resistant colonies obtained per 1 ml of lysate, were calculated from 6 independent lysates for both strains. Error bars show standard deviations from the means.

The yield of production was quantified by measuring transduction of the spectinomycin marker. The lysates were serially diluted in LB medium containing 10 mM $MgSO_4$, and 5 mM $CaCl_2$) (10-fold steps) in 100 μl volume and the dilutions were mixed with 100 μl overnight *E. coli* C1a cell cultures. After 30 minutes at 37° C., 10 μl of each sample was spotted on LB spectinomycin plates. Colonies were counted after overnight incubation. Results are shown in FIGS. 2A-2B.

CONCLUSION

Removal of the phage receptor surprisingly increased the yield of transduction particles by more than 100 times. Therefore, this invention can greatly reduce the production cost of transduction particles or phages.

TABLE 1

| Phages | Family | Main host | Recetpor(s) | References |
|---|---|---|---|---|
| γ | Siphoviridae | Bacillus anthracis | Membrane surface-anchored protein gamma phage receptor (GamR) | Davison et al. (2005) |
| SPP1 | Siphoviridae | Bacillus subtilis | Glucosyl residues of poly(glycerophosphate) on WTA for reversible binding and membrane protein YueB for irreversible binding | São-José, Baptista and Santos (2004), Baptista, Santos and São-José (2008) |
| φ29 | Podoviridae | Bacillus subtilis | Cell WTA (primary receptor) | Xiang et al. (2009) |
| Bam35 | Tectiviridae | Bacillus thuringiensis | N-acetyl-muramic acid (MurNAc) of peptidoglycan in the cell wall | Gaidelyte et al. (2006) |
| LL-H | Siphoviridae | Lactobacillus delbrueckii | Glucose moiety of LTA for reversible adsorption and negatively charged glycerol phosphate group of the LTA for irreversible binding | Munsch-Alatossava and Alatossava (2013) |
| B1 | Siphoviridae | Lactobacillus plantarum | Galactose component of the wall polysaccharide | Douglas and Wolin (1971) |
| B2 | Siphoviridae | Lactobacillus plantarum | Glucose substituents in teichoic acid | Douglas and Wolin (1971) |
| 513c2hml3khL | Siphoviridae | Lactococcus lactis | Rhamnose[a] moieties in the cell wall peptidoglycan for reversible binding and membrane phage infection protein (PIP) for irreversible binding | Monteville, Ardestani and Geller (1994) |

TABLE 1-continued

| Phages | Family | Main host | Recetpor(s) | References |
|---|---|---|---|---|
| φLC3TP901ermTP901-1 | Siphoviridae | Lactococcus lactis | Cell wall polysaccharides | Ainsworth, Sadovskaya and Vinogradov (2014) |
| p2 | Siphoviridae | Lactococcus lactis | Cell wall saccharides for reversible attachment and pellicle[b]phosphohexasaccharide motifs for irreversible adsorption | Bebeacua et al. (2013) |
| A511 | Myoviridae | Listeria monocytogenes | Peptidoglycan (murein) | Wendlinger, Loessner and Scherer (1996) |
| A118 | Siphoviridae | Listeria monocytogenes | Glucosaminyl and rhamnosyl components of ribitol teichoic acid | Wendlinger, Loessner and Scherer (1996) |
| A500 | Siphoviridae | Listeria monocytogenes | Glucosaminyl residues in teichoic acid | Wendlinger, Loessner and Scherer (1996) |
| φ812φK | Myoviridae | Staphylococcus aureus | Anionic backbone of WTA | Xia et al. (2011) |
| 52A | Siphoviridae | Staphylococcus aureus | O-acetyl group from the 6-position of muramic acid residues in murein | Shaw and Chatterjee (1971) |
| Wφ13φ47φ77φSa2m | Siphoviridae | Staphylococcus aureus | N-acetylglucosamine (GlcNAc) glycoepitope on WTA | Xia et al. (2011) |
| φSLT | Siphoviridae | Staphylococcus aureus | Poly(glycerophosphate) moiety of LTA | Kaneko et al. (2009) |

[a]Monteville, Ardestani and Geller (1994) noted that since phages can also bind to glucose and galactose moieties in the cell wall, these might, to a lesser extent, be involved in the adsorption mechanism;
[b]Pellicle is a protective polysaccharide layer that covers the cell surface of *Lactococcus lactis*(Chapot-Chartier et al. 2010).

TABLE 2

Receptors in the cell wall of Gram-negative bacteria. Host names are ordered alphabetically.

| Phages | Family | Main host | Receptor(s) | References |
|---|---|---|---|---|
| (a) Receptors that bind to RBP of phages | | | | |
| φCr30 | Myoviridae | Caulobacter crescentus | Paracrystalline surface (S) layer protein | Edwards and Smit (1991) |
| 434 | Siphoviridae | Escherichia coli | Protein Ib (OmpC) | Hantke (1978) |
| BF23 | Siphoviridae | Escherichia coli | Protein BtuB (vitamin $B_{12}$ receptor) | Bradbeer, Woodrow and Khalifah (1976) |
| K3 | Myoviridae | Escherichia coli | Protein d or 3A (OmpA) with LPS | Skurray, Hancock and Reeves (1974); Manning and Reeves (1976); Van Alphen, Havekes and Lugtenberg (1977) |
| K10 | Siphoviridae | Escherichia coli | Outer membrane protein LamB (maltodextran selective channel) | Roa (1979) |
| Me1 | Myoviridae | Escherichia coli | Protein c (OmpC) | Verhoef, de Graaff and Lugtenberg (1977) |
| Mu G(+) | Myoviridae | Escherichia coli | Terminal Glcα-2Glcα1- or GlcNAcα1-2Glcα1- of the LPS | Sandulache, Prehm and Kamp (1984) |
| Mu G(−) | Myoviridae | Escherichia coli Erwinia | Terminal glucose with a β1,3 glycosidic linkage Terminal glucose linked in β1,6 configuration | Sandulache et al. (1985) |
| M1 | Myoviridae | Escherichia coli | Protein OmpA | Hashemolhosseini et al. (1994) |
| Ox2 | Myoviridae | Escherichia coli | Protein OmpA[a] | Morona and Henning (1984) |
| ST-1 | Microviridae | Escherichia coli | Terminal Glcα-2Glcα1- or GlcNAcα1-2Glcα1- of the LPS | Sandulache, Prehm and Kamp (1984) |
| TLS | Siphoviridae | Escherichia coli | Antibiotic efflux protein TolC and the inner core of LPS | German and Misra (2001) |
| TuIa | Myoviridae | Escherichia coli | Protein Ia (OmpF) with LPS | Datta, Arden and Henning (1977) |
| TuIb | Myoviridae | Escherichia coli | Protein Ib (OmpC) with LPS | |
| TuII* | Myoviridae | Escherichia coli | Protein II* (OmpA) with LPS | |
| T1 | Siphoviridae | Escherichia coli | Proteins TonA (FhuA, involved in ferrichrome uptake) and TonB[b] | Hantke and Braun (1975, 1978); Hancock and Braun (1976) |
| T2 | Myoviridae | Escherichia coli | Protein Ia (OmpF) with LPS and the outer membrane protein FadL (involved in the uptake of long-chain fatty acids) | Hantke (1978); Morona and Henning (1986); Black (1988) |
| T3 | Podoviridae | Escherichia coli | Glucosyl-α-1,3-glucose terminus of rough LPS | Prehm et al. (1976) |

TABLE 2-continued

Receptors in the cell wall of Gram-negative bacteria. Host names are ordered alphabetically.

| Phages | Family | Main host | Receptor(s) | References |
|---|---|---|---|---|
| T4 | Myoviridae | Escherichia coli K-12 | Protein O-8 (OmpC) with LPS | Prehm et al. (1976); Mutoh, Furukawa and Mizushima (1978); Goldberg, Grinius and Letellier (1994) |
| | | Escherichia coli B | Glucosyl-α-1,3-glucose terminus of rough LPS | |
| T5 | Siphoviridae | Escherichia coli | Polymannose sequence in the O-antigen and protein FhuA | Braun and Wolff (1973); Braun, Schaller and Wolff (1973); Heller and Braun (1982) |
| T6 | Myoviridae | Escherichia coli | Outer membrane protein Tsx (involved in nucleoside uptake) | Manning and Reeves (1976, 1978) |
| T7 | Podoviridae | Escherichia coli | LPS[c] | Lindberg (1973) |
| U3 | Microviridae | Escherichia coli | Terminal galactose residue in LPS | Picken and Beacham (1977) |
| λ | Siphoviridae | Escherichia coli | Protein LamB | Randall-Hazelbauer and Schwartz (1973) |
| φX174 | Microviridae | Escherichia coli | Terminal galactose in the core oligosaccharide of rough LPS | Feige and Stirm (1976) |
| φ80 | Siphoviridae | Escherichia coli | Proteins FhuA and TonB[b] | Hantke and Braun (1975, 1978); Wayne and Neilands (1975); Hancock and Braun (1976) |
| PM2 | Corticoviridae | Pseudoalteromonas | Sugar moieties on the cell surface[d] | Kivela et al. (2008) |
| E79 | Myoviridae | Pseudomonas aeruginosa | Core polysaccharide of LPS | Meadow and Wells (1978) |
| JG004 | Myoviridae | Pseudomonas aeruginosa | LPS | Garbe et al. (2011) |
| φCTX | Myoviridae | Pseudomonas aeruginosa | Core polysaccharide of LPS, with emphasis on L-rhamnose and D-glucose residues in the outer core | Yokota, Hayashi and Matsumoto (1994) |
| φPLS27 | Podoviridae | Pseudomonas aeruginosa | Galactosamine-alanine region of the LPS core | Jarrell and Kropinski (1981) |
| φ13 | Cystoviridae | Pseudomonas syringae | Truncated O-chain of LPS | Mindich et al. (1999); Daugelavicius et al. (2005) |
| ES18 | Siphoviridae | Salmonella | Protein FhuA | Killmann et al. (2001) |
| Gifsy-1 Gifsy-2 | Siphoviridae | Salmonella | Protein OmpC | Ho and Slauch (2001) |
| SPC35 | Siphoviridae | Salmonella | BtuB as the main receptor and O12-antigen as adsorption-assisting apparatus | Kim and Ryu (2012) |
| SPN1S SPN2TCW SPN4B SPN6TCW SPN8TCW SPN9TCW SPN13U | Podoviridae | Salmonella | O-antigen of LPS | Shin et al. (2012) |
| SPN7C SPN9C SPN10H SPN12C SPN14 SPN17T SPN18 | Siphoviridae | Salmonella | Protein BtuB | |
| vB_SenM-S16 (S16) | Myoviridae | Salmonella | Protein OmpC | Marti et al. (2013) |
| L-413CP2 virl | Myoviridae | Yersinia pestis | Terminal GlcNAc residue of the LPS outer core. HepII/HepIII and HepI/Glc residues are also involved in receptor activity[e] | Filippov et al. (2011) |
| φJA1 | Myoviridae | Yersinia pestis | Kdo/Ko pairs of inner core residues. LPS outer and inner core sugars are also involved in receptor activity[e] | |
| T7$_{Yp}$Y (YpP-Y) | Podoviridae | Yersinia pestis | HepI/Glc pairs of inner core residues. HepII/HepIII and Kdo/Ko pairs are also involved in receptor activity[e] | |
| Pokrovskaya YepE2 YpP-G | Podoviridae | Yersinia pestis | HepII/HepIII pairs of inner core residues. HepI/Glc residues are also involved in receptor activity[e] | |
| φA1122 | Podoviridae | Yersinia pestis | Kdo/Ko pairs of inner core residues. HepI/Glc residues are also involved in receptor activity[e] | |
| PST | Myoviridae | Yersinia pseudotuberculosis | HepII/HepIII pairs of inner core residues[e] | |

TABLE 2-continued

Receptors in the cell wall of Gram-negative bacteria. Host names are ordered alphabetically.

| Phages | Family | Main host | Receptor(s) | References |
|---|---|---|---|---|
| (b) Receptors in the O-chain structure that are enzymatically cleaved by phages | | | | |
| Ω8 | Podoviridae | Escherichia coli | The α-1,3-mannosyl linkages between the trisaccharide repeating unit α-mannosyl-1,2-α-mannosyl-1,2-mannose | Reske, Wallenfels and Jann (1973) |
| c341 | Podoviridae | Salmonella | The O-acetyl group in the mannosyl-rhamnosyl-O-acetylgalactose repeating sequence | Iwashita and Kanegasaki (1976) |
| P22 | Podoviridae | Salmonella | α-Rhmanosyl 1-3 galactose linkage of the O-chain | Iwashita and Kanegasaki (1973) |
| ε$^{34}$ | Podoviridae | Salmonella | [-β-Gal-Man-Rha-] polysaccharide units of the O-antigen | Takeda and Uetake (1973) |
| Sf6 | Podoviridae | Shigella | Rha II 1-α-3 Rha III linkage of the O-polysaccharide. | Lindberg et al. (1978) |

$^a$Sukupolvi (1984) suggested that LPS is also required for adsorption of phage Ox2 on E. coli and S. typhimurium, although the study verified that isolated OmpA is enough to inactivate the phage and that the binding is not increased with the addition of LPS to the protein.
$^b$According to Rakhuba et al. (2010), TonB is not a receptor itself, but acts as a mediator of electrochemical potential transmission; Vinga et al. (2006) stated that TonB is a membrane protein required for genome entry; Letellier et al. (2004) explained that TonB is part of a protein complex involved in the energy transduction from the electron transfer chain in the cytoplasmic membrane to the outer membrane receptors and speculated that it possibly might be critical for the genome injection through its interaction with FhuA.
$^c$Rhakuba et al. (2010) mentioned proteins FhuA and TonB as the receptors for T7; Molineux (2001) reported that 'Bayer patches', described as adhesion sites between the cytoplasmic membrane and the outer envelope of Gram-negative bacteria, are the proposed receptors for T7.
$^d$In 2010 the same group suggested that the adsorption of the phage on the sugar moieties of the host is an initial interaction, and that the true receptor is a protein molecule or protein complex (Cvirkaite-Krupovic 2010).
$^e$Kdo, 2-keto-3-deoxy-octulosonic acid; Ko, D-glycero-D-talo-oct-2-ulosonic acid; Hep, heptulose (ketoheptose); Glc, glucose; Gal, galactose; GlcNAc, N-acetylglucosamine (from Filippov et al. 2011).

TABLE 3

Receptors in bacterial complexes other than cell wall structures. Host names are ordered alphabetically.

| Phages | Family | Main host | Receptor(s) | References |
|---|---|---|---|---|
| (a) Receptors in flagella | | | | |
| SPN2T SPN3C SPN8T SPN9T SPN11T SPN13B SPN16C | Siphoviridae | Salmonella | Flagellin protein FliC | Shin et al. (2012) |
| SPN4SSPN5T SPN6T SPN19 | Siphoviridae | Salmonella | Flagellin proteins FliC or FliB | |
| iEPS5 | Siphoviridae | Salmonella | Flagellal molecular ruler protein FliK | Choi et al. (2013); Chaturongakul and Ounjai (2014) |
| (b) Receptors in pili and mating pair formation structures | | | | |
| φCbK φCb13 | Siphoviridae | Caulobacter crescentus | Initial contact between phage head filament and host's flagellum followed by pili portals on the cell pole | Guerrero-Ferreira et al. (2011) |
| FdFff1M13 | Inoviridae | Escherichia coli | Tip of the F pilus followed by TolQRA complex in membrane after pilus retraction | Loeb (1960); Caro and Schnos (1966); Russel et al. (1988); Click and Webster (1998) |
| PRD1 | Tectiviridae | Escherichia coli | Mating pair formation (Mpf) complex in the membrane | Daugelavicius et al. (1997) |
| φ6 | Cystoviridae | Pseudomonas | Sides of the type IV pilus | Vidaver, Koski and Van Etten (1973); Daugelavicius et al. (2005) |
| MPK7 | Podoviridae | Pseudomonas aeruginosa | Type IV pili (TFP) | Bae and Cho (2013) |
| MP22 | Siphoviridae | Pseudomonas aeruginosa | Type IV pili (TFP) | Heo et al. (2007) |
| DMS3 | Siphoviridae | Pseudomonas aeruginosa | Type IV pili (TFP) | Budzik et al. (2004) |
| (c) Receptors in bacterial capsules | | | | |
| 29 | Podoviridae | Escherichia coli | Endoglycosidase hydrolysis in β-D-glucosido-(1-3)-D-glucuronic acid bonds in the capsule composed of hexasaccharides repeating units | Stirm et al. (1971); Fehmel et al. (1975) |
| K11 | Podoviridae | Klebsiella | Hydrolysis of β-D-glucosyl-(1-3)-β-D-glucuronic acid linkages. The phage is also able to cleave α-D-galactosyl-(1-3)-β-D-glucose bonds | Thurow, Niemann and Stirm (1975) |

TABLE 3-continued

Receptors in bacterial complexes other than cell wall structures. Host names are ordered alphabetically.

| Phages | Family | Main host | Receptor(s) | References |
|---|---|---|---|---|
| Vi I | Myoviridae | *Salmonella* | Acetyl groups of the Vi exopolysaccharide capsule (a polymer of α-1,4-linked N-acetyl galactosaminuronate) | Pickard et al. (2010) |
| Vi II | Siphoviridae | *Salmonella* | Acetyl groups of the Vi exopolysaccharide capsule (a polymer of α-1,4-linked N-acetyl galactosaminuronate) | |
| Vi IIIVi IVVi VVi VIVi VII | Podoviridae | *Salmonella* | Acetyl groups of the Vi exopolysaccharide capsule (a polymer of α-1,4-linked N-acetyl galactosaminuronate) | |

TABLE 4

Specific host receptors for *Salmonella* and *P. aeruginosa* phages.

| | Specific host receptors | Reference |
|---|---|---|
| | Flagellar proteins | |
| *S. enterica* | FliC and FljB | Shin et al. (2012) |
| | FliK | Choi et al. (2013) |
| | Outermembrane proteins | |
| | OmpC | Ho and Slauch (2001), Marti et al. (2013) |
| | BtuB | Kim and Ryu (2011) |
| | TolC | Ricci and Piddock (2010) |
| | FhuA | Casjens et al. (2005) |
| | Surface antigens | |
| | O-antigen | Shin et al. (2012) |
| | Vi-antigen | Pickard et al. (2010) |
| | Surface antigens | |
| *P. aeruginosa* | O-antigen | Le et al. (2013) |
| | Vi-antigen | Temple et al. (1986), Hanlon et al. (2001) |
| | Type IV pili | |
| | PilA | Bae and Cho (2013), Heo et al. (2007) |

TABLE 5

Sequences
Sequences are written in 5' to 3' direction.

| SEQ ID NO: | DESCRIPTION | SEQUENCE |
|---|---|---|
| 1 | Primer rfaDupR | ATTCGTGTCTGAGATTGTCTCTGACTCCATAATTCGAAGGTTACAGTTATGATC ATCGTTGATATCGCTAGCTCGAGCACGTGTTGAC |
| 2 | Primer rfaDdnR | CCAAGACGGGCCGATCACCAGTATTTTCATGCAGAGCTCTTATGCGTCGCGATT CAGCCACGTTGTAAAACGACGGCCAGTGCCAAGC |
| 3 | RfaD coding sequence in C1a (NCBI REF: NZ_CP010116.1) | atgatcatc gttaccggcg gcgcgggctt tatcggcagc aacatcgtta aagccctgaa tgataaaggc atcaccgata ttctggtggt ggacaacctg aaagacggca ccaagttttgt gaacctggtg gatctggata tcgcggacta tatggataag gaagacttcc tgatccagat tatggctggc gaagagttcg gcgatgtcga agcgattttc cacgaaggtg cgtgctcttc caccaccgag tgggacggca agtatatgat ggataacaac tatcaatact ccaaagagct gctgcactac tgtctggagc gcgaaatccc gttcctgtat gcctcttccg cagccaccta cggcggacgc acctccgact ttattgaatc ccgcgagtac gaaaaaccgt tgaatgtcta cggttactca aaattcctgt tgatgaata tgttcgtcaa atcctgccag aagcgaactc gcagattgtt ggcttccgct atttcaacgt ttatggaccg cgtgaaggcc ataaaggcag catggcgagc gtcgctttcc atctcaacac tcagcttaac aacggtgaat cgccgaagct gttcgaaggt agcgagaact tcaaacgcga cttcgtttac gtaggcgacg tggcagatgt aaacctgtgg ttcctggaaa atggcgtttc cggcatcttc aacctcggta ctggtcgtgc ggaatccttc caggcggtag cagatgctac gcttgcttat cacaagaaag gccaaatcga atacattccg ttcccggata aactgaaagg ccgctaccag gcgttcacgc aggcagatct gacaaatctg cgcgcggcgg gttacgacaa accgttcaaa accgttgccg aaggtgtaac ggaatacatg gcttggctga atcgcgacgc ataa |
| 4 | Zeo marker | GATATCGCTAGCTCGAGCACGTGTTGACAATTAATCATCGGCATAGTATATCGG CATAGTATAATACGACAAGGTGAGGAACTAAACCATGGCCAAGTTGACCAGTGC CGTTCCGGTGCTCACCGCGCGCGACGTCGCCGGAGCGGTCGAGTTCTGGACCGA CCGGCTCGGGTTCTCCCGGGACTTCGTGGAGGACGACTTCGCCGGTGTGGTCCG GGACGACGTGACCCTGTTCATCAGCGCGGTCCAGGACCAGGTGGTGCCGGACAA |

TABLE 5-continued

Sequences
Sequences are written in 5' to 3' direction.

| SEQ ID NO: | DESCRIPTION | SEQUENCE |
|---|---|---|
| | | CACCCTGGCCTGGGTGTGGGTGCGCGGCCTGGACGAGCTGTACGCCGAGTGGTC GGAGGTCGTGTCCACGAACTTCCGGGACGCCTCCGGGCCGGCCATGACCGAGAT CGGCGAGCAGCCGTGGGGGCGGGAGTTCGCCCTGCGCGACCCGGCCGGCAACTG CGTGCACTTCGTGGCCGAGGAGCAGGACTGAGAATTCCCGGGGATCCTCTAGAG TCGACCTGCAGGCATGCAAGCTTGGCACTGGCCGTCGTTTTACAACGT |

TABLE 6

Example Bacteria

Optionally, the producer cells are selected from this Table and/or the target cells are selected from this Table (eg, wherein the producer and target cells are of a different species; or of the same species but are a different strain or the host cells are engineered but the target cells are wild-type or vice versa). For example the producer cells are *E coli* and the target cells are *C difficile*, *E coli*, *Akkermansia*, *Enterobacteriacea*, *Ruminococcus*, *Faecalibacterium*, Firmicutes, Bacteroidetes, Salmonella, Klebsiella, Pseudomonas, Acinetobacter or Streptococcus cells.

| | | | |
|---|---|---|---|
| Abiotrophia | Acidocella | Actinomyces | Alkalilimnicola | Aquaspirillum |
| Abiotrophia defectiva | Acidocella aminolytica | Actinomyces bovis | Alkalilimnicola ehrlichii | Aquaspirillum polymorphum |
| Acaricomes | Acidocella facilis | Actinomyces denticolens | Alkaliphilus | Aquaspirillum putridiconchylium |
| Acaricomes phytoseiuli | Acidomonas | Actinomyces europaeus | Alkaliphilus oremlandii | Aquaspirillum serpens |
| Acetitomaculum | Acidomonas methanolica | Actinomyces georgiae | Alkaliphilus transvaalensis | Aquimarina |
| Acetitomaculum ruminis | Acidothermus | Actinomyces gerencseriae | Allochromatium | Aquimarina latercula |
| Acetivibrio | Acidothermus cellulolyticus | Actinomyces hordeovulneris | Allochromatium vinosum | Arcanobacterium |
| Acetivibrio cellulolyticus | Acidovorax | Actinomyces howellii | Alloiococcus | Arcanobacterium haemolyticum |
| Acetivibrio ethanolgignens | Acidovorax anthurii | Actinomyces hyovaginalis | Alloiococcus otitis | Arcanobacterium pyogenes |
| Acetivibrio multivorans | Acidovorax caeni | Actinomyces israelii | Allokutzneria | Archangium |
| Acetoanaerobium | Acidovorax cattleyae | Actinomyces johnsonii | Allokutzneria albata | Archangium gephyra |
| Acetoanaerobium noterae | Acidovorax citrulli | Actinomyces meyeri | Altererythrobacter | Arcobacter |
| Acetobacter | Acidovorax defluvii | Actinomyces naeslundii | Altererythrobacter ishigakiensis | Arcobacter butzleri |
| Acetobacter aceti | Acidovorax delafieldii | Actinomyces odontolyticus | Alteromonas | Arcobacter cryaerophilus |
| Acetobacter cerevisiae | Acidovorax facilis | Actinomyces oris | Alteromonas haloplanktis | Arcobacter halophilus |
| Acetobacter cibinongensis | Acidovorax konjaci | Actinomyces radingae | Alteromonas macleodii | Arcobacter nitrofigilis |
| Acetobacter estunensis | Acidovorax temperans | Actinomyces slackii | Alysiella | Arcobacter skirrowii |
| Acetobacter fabarum | Acidovorax valerianellae | Actinomyces turicensis | Alysiella crassa | Arhodomonas |
| Acetobacter ghanensis | Acinetobacter | Actinomyces viscosus | Alysiella filiformis | Arhodomonas aquaeolei |
| Acetobacter indonesiensis | Acinetobacter baumannii | Actinoplanes | Aminobacter | Arsenophonus |
| Acetobacter lovaniensis | Acinetobacter baylyi | Actinoplanes auranticolor | Aminobacter aganoensis | Arsenophonus nasoniae |
| Acetobacter malorum | Acinetobacter bouvetii | Actinoplanes brasiliensis | Aminobacter aminovorans | Arthrobacter |
| Acetobacter nitrogenifigens | Acinetobacter calcoaceticus | Actinoplanes consettensis | Aminobacter niigataensis | Arthrobacter agilis |
| Acetobacter oeni | Acinetobacter gerneri | Actinoplanes deccanensis | Aminobacter mobile | Arthrobacter albus |
| Acetobacter orientalis | Acinetobacter haemolyticus | Actinoplanes derwentensis | Aminomonas | Arthrobacter aurescens |
| Acetobacter orleanensis | Acinetobacter johnsonii | Actinoplanes digitatis | Aminomonas paucivorans | Arthrobacter chlorophenolicus |
| Acetobacter pasteurianus | Acinetobacter junii | Actinoplanes durhamensis | Ammoniphilus | Arthrobacter citreus |
| Acetobacter pomorum | Acinetobacter lwoffii | Actinoplanes ferrugineus | Ammoniphilus oxalaticus | Arthrobacter crystallopoietes |
| Acetobacter senegalensis | Acinetobacter parvus | Actinoplanes globisporus | Ammoniphilus oxalivorans | Arthrobacter cumminsii |
| Acetobacter xylinus | Acinetobacter radioresistens | Actinoplanes humidus | Amphibacillus | Arthrobacter globiformis |
| Acetobacterium | Acinetobacter schindleri | Actinoplanes italicus | Amphibacillus xylanus | Arthrobacter histidinolovorans |
| Acetobacterium bakii | Acinetobacter soli | Actinoplanes liguriensis | Amphritea | Arthrobacter ilicis |
| Acetobacterium carbinolicum | Acinetobacter tandoii | Actinoplanes lobatus | Amphritea balenae | Arthrobacter luteus |
| Acetobacterium dehalogenans | Acinetobacter tjernbergiae | Actinoplanes missouriensis | Amphritea japonica | Arthrobacter methylotrophus |
| Acetobacterium fimetarium | Acinetobacter towneri | Actinoplanes palleronii | Amycolatopsis | Arthrobacter mysorens |
| Acetobacterium malicum | Acinetobacter ursingii | Actinoplanes philippinensis | Amycolatopsis alba | Arthrobacter nicotianae |
| Acetobacterium paludosum | Acinetobacter venetianus | Actinoplanes rectilineatus | Amycolatopsis albidoflavus | Arthrobacter nicotinovorans |
| Acetobacterium tundrae | Acrocarpospora | Actinoplanes regularis | Amycolatopsis azurea | Arthrobacter oxydans |
| Acetobacterium wieringae | Acrocarpospora corrugata | Actinoplanes | Amycolatopsis coloradensis | Arthrobacter pascens |
| Acetobacterium woodii | Acrocarpospora macrocephala | teichomyceticus | Amycolatopsis lurida | Arthrobacter phenanthrenivorans |
| Acetofilamentum rigidum | Acrocarpospora pleiomorpha | Actinopolyspora | Amycolatopsis mediterranei | |
| Acetohalobium | Actibacter | Actinopolyspora halophila | Amycolatopsis rifamycinica | |
| Acetohalobium arabaticum | Actibacter sediminis | | Amycolatopsis rubida | |
| Acetomicrobium | Actinoalloteichus | | Amycolatopsis sulphurea | |

TABLE 6-continued

Example Bacteria

Optionally, the producer cells are selected from this Table and/or the target cells are selected from this Table (eg, wherein the producer and target cells are of a different species; or of the same species but are a different strain or the host cells are engineered but the target cells are wild-type or vice versa). For example the producer cells are *E coli* and the target cells are *C dificile*, *E coli*, *Akkermansia*, *Enterobacteriacea*, *Ruminococcus*, *Faecalibacterium*, *Firmicutes*, *Bacteroidetes*, *Salmonella*, *Klebsiella*, *Pseudomonas*, *Acitnenobacter* or *Streptococcus* cells.

| | | | |
|---|---|---|---|
| *Acetomicrobium faecale* | *Actinoalloteichus cyanogriseus* | *Actinopolyspora mortivallis* | *Amycolatopsis tolypomycina* | *Arthrobacter polychromogenes* |
| *Acetomicrobium flavidum* | *Actinoalloteichus hymeniacidonis* | *Actinosynnema* | *Anabaena* | *Atrhrobacter protophormiae* |
| *Acetonema longum* | *Actinoalloteichus spitiensis* | *Actinosynnema mirum* | *Anabaena cylindrica* | *Arthrobacter psychrolactophilus* |
| *Acetothermus* | *Actinobacillus* | *Actinotalea* | *Anabaena flos-aquae* | *Arthrobacter ramosus* |
| *Acetothermus paucivorans* | *Actinobacillus capsulatus* | *Actinotalea fermentans* | *Anabaena variabilis* | *Arthrobacter sulfonivorans* |
| *Acholeplasma* | *Actinobacillus delphinicola* | *Aerococcus* | *Anaerarcus* | *Arthrobacter sulfureus* |
| *Acholeplasma axanthum* | *Actinobacillus hominis* | *Aerococcus sanguinicola* | *Anaerarcus burkinensis* | *Arthrobacter uratoxydans* |
| *Acholeplasma brassicae* | *Actinobacillus indolicus* | *Aerococcus urinae* | *Anaerobaculum* | *Arthrobacter ureafaciens* |
| *Acholeplasma cavigenitalium* | *Actinobacillus lignieresii* | *Aerococcus urinaeequi* | *Anaerobaculum mobile* | *Arthrobacter viscosus* |
| *Acholeplasma equifetale* | *Actinobacillus minor* | *Aerococcus urinaehominis* | *Anaerobiospirillum* | *Arthrobacter woluwensis* |
| *Acholeplasma granularum* | *Actinobacillus muris* | *Aerococcus viridans* | *Anaerobiospirillum succiniciproducens* | *Asaia* |
| *Acholeplasma hippikon* | *Actinobacillus* | *Aeromicrobium* | *Anaerobiospirillum thomasii* | *Asaia bogorensis* |
| *Acholeplasma laidlawii* | *pleuropneumoniae* | *Aeromicrobium erythreum* | *Anaerococcus* | *Asanoa* |
| *Acholeplasma modicum* | *Actinobacillus porcinus* | *Aeromonas* | *Anaerococcus hydrogenalis* | *Asanoa ferruginea* |
| *Acholeplasma morum* | *Actinobacillus rossii* | *Aeromonas allosaccharophila* | *Anaerococcus lactolyticus* | *Asticcacaulis* |
| *Acholeplasma multilocale* | *Actinobacillus scotiae* | *Aeromonas bestiarum* | *Anaerococcus prevotii* | *Asticcacaulis biprosthecium* |
| *Acholeplasma oculi* | *Actinobacillus seminis* | *Aeromonas caviae* | *Anaerococcus tetradius* | *Asticcacaulis excentricus* |
| *Acholeplasma palmae* | *Actinobacillus succinogenes* | *Aeromonas encheleia* | *Anaerococcus vaginalis* | *Atopobacter* |
| *Acholeplasma parvum* | *Actinobacillus suis* | *Aeromonas enteropelogenes* | *Anaerofustis* | *Atopobacter phocae* |
| *Acholeplasma pleciae* | *Actinobacillus ureae* | *Aeromonas eucrenophila* | *Anaerofustis stercorihominis* | *Atopobium* |
| *Acholeplasma vituli* | *Actinobaculum* | *Aeromonas ichthiosmia* | *Anaeromusa* | *Atopobium fossor* |
| *Achromobacter* | *Actinobaculum massiliense* | *Aeromonas jandaei* | *Anaeromusa acidaminophila* | *Atopobium minutum* |
| *Achromobacter denitrificans* | *Actinobaculum schaalii* | *Aeromonas media* | *Anaeromyxobacter* | *Atopobium parvulum* |
| *Achromobacter insolitus* | *Actinobaculum suis* | *Aeromonas popoffii* | *Anaeromyxobacter dehalogenans* | *Atopobium rimae* |
| *Achromobacter piechaudii* | *Actinomyces urinale* | *Aeromonas sobria* | *Anaerorhabdus* | *Atopobium vaginae* |
| *Achromobacter ruhlandii* | *Actinocatenispora* | *Aeromonas veronii* | *Anaerorhabdus furcosa* | *Aureobacterium* |
| *Achromobacter spanius* | *Actinocatenispora rupis* | *Agrobacterium* | *Anaerosinus* | *Aureobacterium barkeri* |
| *Acidaminobacter* | *Actinocatenispora thailandica* | *Agrobacterium gelatinovorum* | *Anaerostipes glycerini* | *Aurobacterium* |
| *Acidaminobacter hydrogenoformans* | *Actinocatenispora sera* | *Agrococcus* | *Anaerovirgula* | *Aurobacterium liquefaciens* |
| *Acidaminococcus* | *Actinocorallia* | *Agrococcus citreus* | *Anaerovirgula multivorans* | *Avibacterium* |
| *Acidaminococcus fermentans* | *Actinocorallia auramiaca* | *Agrococcus jenensis* | *Ancalomicrobium* | *Avibacterium avium* |
| *Acidaminococcus intestini* | *Actinocorallia aurea* | *Agromonas* | *Ancalomicrobium adetum* | *Avibacterium gallinarum* |
| *Acidicaldus* | *Actinocorallia cavernae* | *Agromonas oligotrophica* | *Ancylobacter* | *Avibacterium paragallinarum* |
| *Acidicaldus organivorans* | *Actinocorallia glomerata* | *Agromyces* | *Ancylobacter aquaticus* | *Avibacterium volantium* |
| *Acidimicrobium* | *Actinocorallia herbida* | *Agromyces fucosus* | *Aneurinibacillus* | *Azoarcus* |
| *Acidimicrobium ferrooxidans* | *Actinocorallia libanotica* | *Agromyces hippuratus* | *Aneurinibacillus aneurinilyticus* | *Azoarcus indigens* |
| *Acidiphilium* | *Actinocorallia longicatena* | *Agromyces luteolus* | *Aneurinibacillus migulanus* | *Azoarcus tolulyticus* |
| *Acidiphilium acidophilum* | *Actinomadura* | *Agromyces mediolanus* | *Aneurinibacillus thermoaerophilus* | *Azoarcus tolavorans* |
| *Acidiphilium angustum* | *Actinomadura alba* | *Agromyces ramosus* | *Angiococcus* | *Azohydromonas* |
| *Acidiphilium cryptum* | *Actinomadura atramentaria* | *Agromyces rhizospherae* | *Angiococcus disciformis* | *Azohydromonas australica* |
| *Acidiphilium multivorum* | *Actinomadura bangladeshensis* | *Akkermansia* | *Angulomicrobium* | *Azohydromonas lata* |
| *Acidiphilium organovorum* | *Actinomadura catellatispora* | *Akkermansia muciniphila* | *Angulomicrobium tetraedrale* | *Azomonas* |
| *Acidiphilium rubrum* | *Actinomadura chibensis* | *Albidiferax* | *Anoxybacillus* | *Azomonas agilis* |
| *Acidisoma* | | *Albidiferax ferrireducens* | *Anoxybacillus pushchinoensis* | *Azomonas insignis* |
| *Acidisoma sibiricum* | | | | *Azomonas macrocytogenes* |

TABLE 6-continued

Example Bacteria

Optionally, the producer cells are selected from this Table and/or the target cells are selected from this Table (eg, wherein the producer and target cells are of a different species; or of the same species but are a different strain or the host cells are engineered but the target cells are wild-type or vice versa). For example the producer cells are *E coli* and the target cells are *C dificile, E coli, Akkermansia, Enterobacteriacea, Ruminococcus, Faecalibacterium, Firmicutes, Bacteroidetes, Salmonella, Klebsiella, Pseudomonas, Acinetobacter or Streptococcus* cells.

| | | | | |
|---|---|---|---|---|
| *Acidisoma tundrae* | *Actinomadura chokoriensis* | *Albidovulum* | *Aquabacterium* | *Azorhizobium* |
| *Acidisphaera* | *Actinomadura citrea* | *Albidovulum inexpectatum* | *Aquabacterium commune* | *Azorhizobium caulinodans* |
| *Acidisphaera rubrifaciens* | *Actinomadura coerulea* | *Alcaligenes* | *Aquabacterium parvum* | *Azorhizophilus* |
| *Acidithiobacillus* | *Actinomadura echinospora* | *Alcaligenes denitrificans* | | *Azorhizophilus paspali* |
| *Acidithiobacillus albertensis* | *Actinomadura fibrosa* | *Alcaligenes faecalis* | | *Azospirillum* |
| *Acidithiobacillus caldus* | *Actinomadura formosensis* | *Alcanivorax* | | *Azospirillum brasilense* |
| *Acidithiobacillus ferrooxidans* | *Actinomadura hibisca* | *Alcanivorax borkumensis* | | *Azospirillum halopraeferens* |
| *Acidithiobacillus thiooxidans* | *Actinomadura kijaniata* | *Alcanivorax jadensis* | | *Azospirillum irakense* |
| *Acidobacterium* | *Actinomadura latina* | *Algicola* | | *Azotobacter* |
| *Acidobacterium capsulatum* | *Actinomadura livida* | *Algicola bacteriolytica* | | *Azotobacter beijerinckii* |
| | *Actinomadura luteofluorescens* | *Alicyclobacillus* | | *Azotobacter chroococcum* |
| | *Actinomadura macra* | *Alicyclobacillus disulfidooxidans* | | *Azotobacter nigricans* |
| | *Actinomadura madurae* | *Alicyclobacillus sendaiensis* | | *Azotobacter salinestris* |
| | *Actinomadura oligospora* | *Alicyclobacillus vulcanalis* | | *Azotobacter vinelandii* |
| | *Actinomadura pelletieri* | *Alishewanella* | | |
| | *Actinomadura rubrobrunea* | *Alishewanella fetalis* | | |
| | *Actinomadura rugatobispora* | *Alkalibacillus* | | |
| | *Actinomadura umbrina* | *Alkalibacillus haloalkaliphilus* | | |
| | *Actinomadura verrucosospora* | | | |
| | *Actinomadura vinacea* | | | |
| | *Actinomadura viridilutea* | | | |
| | *Actinomadura viridis* | | | |
| | *Actinomadura yumaensis* | | | |
| *Bacillus* [see below] | *Bacteroides* | *Bibersteinia* | *Borrelia* | *Brevinema* |
| *Bacteriovorax* | *Bacteroides caccae* | *Bibersteinia trehalosi* | *Borrelia afzelii* | *Brevinema andersonii* |
| *Bacteriovorax stolpii* | *Bacteroides coagulans* | *Bifidobacterium* | *Borrelia americana* | *Brevundimonas* |
| | *Bacteroides eggerthii* | *Bifidobacterium adolescentis* | *Borrelia burgdorferi* | *Brevundimonas alba* |
| | *Bacteroides fragilis* | *Bifidobacterium angulatum* | *Borrelia carolinensis* | *Brevundimonas aurantiaca* |
| | *Bacteroides galacturonicus* | *Bifidobacterium animalis* | *Borrelia coriaceae* | *Brevundimonas diminuta* |
| | *Bacteroides helcogenes* | *Bifidobacterium asteroides* | *Borrelia garinii* | *Brevundimonas intermedia* |
| | *Bacteroides ovatus* | *Bifidobacterium bifidum* | *Borrelia japonica* | *Brevundimonas subvibrioides* |
| | *Bacteroides pectinophilus* | *Bifidobacterium boum* | *Bosea* | *Brevundimonas vancanneytii* |
| | *Bacteroides pyogenes* | *Bifidobacterium breve* | *Bosea minatitlanensis* | *Brevundimonas variabilis* |
| | *Bacteroides salyersiae* | *Bifidobacterium catenulatum* | *Bosea thiooxidans* | *Brevundimonas vesicularis* |
| | *Bacteroides stercoris* | *Bifidobacterium choerinum* | *Brachybacterium* | *Brochothrix* |
| | *Bacteroides suis* | *Bifidobacterium coryneforme* | *Brachybacterium alimentarium* | *Brochothrix campestris* |
| | *Bacteroides tectus* | *Bifidobacterium cuniculi* | *Brachybacterium faecium* | *Brochothrix thermosphacta* |
| | *Bacteroides thetaiotaomicron* | *Bifidobacterium dentium* | *Brachybacterium paraconglomeratum* | *Brucella* |
| | *Bacteroides uniformis* | *Bifidobacterium gallicum* | *Brachybacterium rhamnosum* | *Brucella canis* |
| | *Bacteroides ureolyticus* | *Bifidobacterium gallinarum* | *Brachybacterium tyrofermentans* | *Brucella neotomae* |
| | *Bacteroides vulgatus* | *Bifidobacterium indicum* | *Brachyspira* | *Bryobacter* |
| | *Balnearium* | *Bifidobacterium longum* | *Brachyspira alvinipulli* | *Bryobacter aggregatus* |
| | *Balnearium lithotrophicum* | *magnumBifidobacterium merycicum* | | *Burkholderia* |
| | *Balneatrix* | | | *Burkholderia ambifaria* |
| | *Balneatrix alpica* | | | *Burkholderia andropogonis* |

TABLE 6-continued

Example Bacteria

Optionally, the producer cells are selected from this Table and/or the target cells are selected from this Table (eg, wherein the producer and target cells are of a different species; or of the same species but are a different strain or the host cells are engineered but the target cells are wild-type or vice versa). For example the producer cells are *E coli* and the target cells are *C dificile*, *E coli*, *Akkermansia*, *Enterobacteriacea*, *Ruminococcus*, *Faecalibacterium*, *Firmicutes*, *Bacteroidetes*, *Salmonella*, *Klebsiella*, *Pseudomonas*, *Acinetobacter* or *Streptococcus* cells.

| | | | |
|---|---|---|---|
| Balneola | Bifidobacterium minimum | Brachyspira hyodysenteriae | Burkholderia anthina |
| Balneola vulgaris | Bifidobacterium pseudocatenulatum | Brachyspira innocens | Burkholderia caledonica |
| Barnesiella | Bifidobacterium pseudolongum | Brachyspira murdochii | Burkholderia caryophylli |
| Barnesiella viscericola | Bifidobacterium pullorum | Brachyspira pilosicoli | Burkholderia cenocepacia |
| Bartonella | Bifidobacterium ruminantium | Bradyrhizobium | Burkholderia cepacia |
| Bartonella alsatica | Bifidobacterium saeculare | Bradyrhizobium canariense | Burkholderia cocovenenans |
| Bartonella bacilliformis | Bifidobacterium subtile | Bradyrhizobium elkanii | Burkholderia dolosa |
| Bartonella clarridgeiae | Bifidobacterium thermophilum | Bradyrhizobium japonicum | Burkholderia fungorum |
| Bartonella doshiae | Bilophila | Bradyrhizobium liaoningense | Burkholderia glathei |
| Bartonella elizabethae | Bilophila wadsworthia | Brenneria | Burkholderia glumae |
| Bartonella grahamii | Biostraticola | Brenneria alni | Burkholderia graminis |
| Bartonella henselae | Biostraticola tofi | Brenneria nigrifluens | Burkholderia kururiensis |
| Bartonella rochalimae | Bizionia | Brenneria quercina | Burkholderia multivorans |
| Bartonella vinsonii | Bizionia argentinensis | Brenneria quercina | Burkholderia phenazinium |
| Bavariicoccus | Blastobacter | Brenneria salicis | Burkholderia plantarii |
| Bavariicoccus seileri | Blastobacter capsulatus | Brevibacillus | Burkholderia pyrrocinia |
| Bdellovibrio | Blastobacter denitrificans | Brevibacillus agri | Burkholderia silvatlantica |
| Bdellovibrio bacteriovorus | Blastococcus | Brevibacillus borstelensis | Burkholderia stabilis |
| Bdellovibrio exovorus | Blastococcus aggregatus | Brevibacillus brevis | Burkholderia thailandensis |
| Beggiatoa | Blastococcus saxobsidens | Brevibacillus centrosporus | Burkholderia tropica |
| Beggiatoa alba | Blastochloris | Brevibacillus choshinensis | Burkholderia unamae |
| Beijerinckia | Blastochloris viridis | Brevibacillus invocatus | Burkholderia vietnamiensis |
| Beijerinckia derxii | Blastomonas | Brevibacillus laterosporus | Buttiauxella |
| Beijerinckia fluminensis | Blastomonas natatoria | Brevibacillus parabrevis | Buttiauxella agrestis |
| Beijerinckia indica | Blastopirellula | Brevibacillus reuszeri | Buttiauxella brennerae |
| Beijerinckia mobilis | Blastopirellula marina | Brevibacterium | Buttiauxella ferragutiae |
| Bellilla | Blautia | Brevibacterium abidum | Buttiauxella gaviniae |
| Bellilla baltica | Blautia coccoides | Brevibacterium album | Buttiauxella izardii |
| Bellilnea | Blautia hansenii | Brevibacterium aurantiacum | Buttiauxella noackiae |
| Bellilnea caldifistulae | Blautia producta | Brevibacterium celere | Buttiauxella warmboldiae |
| Belnapia | Blautia wexlerae | Brevibacterium epidermidis | Butyrivibrio |
| Belnapia moabensis | Bogoriella | Brevibacterium frigoritolerans | Butyrivibrio fibrisolvens |
| Bergeriella | Bogoriella caseilytica | Brevibacterium halotolerans | Butyrivibrio hungatei |
| Bergeriella denitrificans | Bordetella | Brevibacterium iodinum | Butyrivibrio proteoclasticus |
| Beutenbergia | Bordetella avium | Brevibacterium linens | |
| Beutenbergia cavernae | Bordetella bronchiseptica | Brevibacterium lyticum | |
| | Bordetella hinzii | Brevibacterium mcbrellneri | |
| | Bordetella holmesii | Brevibacterium otitidis | |
| | Bordetella parapertussis | Brevibacterium oxydans | |
| | Bordetella pertussis | Brevibacterium paucivorans | |
| | Bordetella petrii | Brevibacterium stationis | |
| | Bordetella trematum | | |

| Bacillus | | | |
|---|---|---|---|
| B. acidiceler | B. aminovorans | B. glucanolyticus | B. taeanensis | B. lautus |

TABLE 6-continued

Example Bacteria

Optionally, the producer cells are selected from this Table and/or the target cells are selected from this Table (eg, wherein the producer and target cells are of a different species; or of the same species but are a different strain or the host cells are engineered but the target cells are wild-type or vice versa). For example the producer cells are *E coli* and the target cells are *C dificile*, *E coli*, *Akkermansia*, *Enterobacteriacea*, *Ruminococcus*, *Faecalibacterium*, *Firmicutes*, *Bacteroidetes*, *Salmonella*, *Klebsiella*, *Pseudomonas*, *Acinetobacter* or *Streptococcus* cells.

| | | | |
|---|---|---|---|
| B. acidicola | B. amylolyticus | B. gordonae | B. tequilensis | B. lehensis |
| B. acidiproducens | B. andreesenii | B. gottheilii | B. thermantarcticus | B. lentimorbus |
| B. acidocaldarius | B. aneurinilyticus | B. graminis | B. thermoaerophilus | B. lentus |
| B. acidoterrestris | B. anthracis | B. halmapalus | B. thermoamylovorans | B. licheniformis |
| B. aeolius | B. aquimaris | B. haloalkaliphilus | B. thermocatenulatus | B. ligniniphilus |
| B. aerius | B. arenosi | B. halochares | B. thermocloacae | B. litoralis |
| B. aerophilus | B. arsenicislenatis | B. halodenitrificans | B. thermocoprie | B. loctisalis |
| B. agaradhaerens | B. arsenicus | B. halodurans | B. thermodenitrificans | B. luciferensis |
| B. agri | B. aurantiacus | B. halophilus | B. thermoglucosidasius | B. luteolus |
| B. aidingensis | B. arvi | B. halosaccharovorans | B. thermolactis | B. luteus |
| B. akibai | B. aryabhattai | B. hemicellulosilyticus | B. thermoleovorans | B. macauensis |
| B. alcalophilus | B. asahii | B. hemicentroti | B. thermophilus | B. macerans |
| B. algicola | B. atrophaeus | B. herbersteinensis | B. thermoruber | B. macquariensis |
| B. alginolyticus | B. axarquiensis | B. horikoshii | B. thermosphaericus | B. macyae |
| B. alkalidiazotrophicus | B. azotofixans | B. horneckiae | B. thiaminolyticus | B. malacitensis |
| B. alkalinitrilicus | B. azotoformans | B. horti | B. thioparans | B. mannanilyticus |
| B. alkalisediminis | B. badius | B. huizhouensis | B. thuringiensis | B. marisflavi |
| B. alkalitelluris | B. barbaricus | B. humi | B. tianshenii | B. marismortui |
| B. altitudinis | B. bataviensis | B. hwajinpoensis | B. trypoxylicola | B. marmarensis |
| B. alveayuensis | B. beijingensis | B. idriensis | B. tusciae | B. massiliensis |
| B. alvei | B. benzoevorans | B. indicus | B. validus | B. megaterium |
| B. amyloliquefaciens | B. beringensis | B. infantis | B. vallismortis | B. mesonae |
| B. | B. berkeleyi | B. infernus | B. vedderi | B. methanolicus |
| a. subsp. amyloliquefaciens | B. beveridgei | B. insolitus | B. velezensis | B. methylotrophicus |
| B. a. subsp. plantarum | B. bogoriensis | B. invictae | B. vietnamensis | B. migulanus |
| | B. boroniphilus | B. iranensis | B. vireti | B. mojavensis |
| B. dipsosauri | B. borstelensis | B. isabeliae | B. vulcani | B. mucilaginosus |
| B. drentensis | B. brevis Migula | B. isronensis | B. wakoensis | B. muralis |
| B. edaphicus | B. butanolivorans | B. jeotgali | B. weihenstephanensis | B. murimartini |
| B. ehimensis | B. canaveralius | B. kaustophilus | B. xiamenensis | B. mycoides |
| B. eiseniae | B. carboniphilus | B. kobensis | B. xiaoxiensis | B. naganoensis |
| B. enclensis | B. cecembensis | B. kochii | B. zhanjiangensis | B. nanhaiensis |
| B. endophyticus | B. cellulosilyticus | B. kokeshiiformis | B. peoriae | B. nanhaiisediminis |
| B. endoradicis | B. centrosporus | B. koreensis | B. persepolensis | B. nealsonii |
| B. farraginis | B. cereus | B. korlensis | B. persicus | B. neidei |
| B. fastidiosus | B. chagannorensis | B. kribbensis | B. pervagus | B. neizhouensis |
| B. fengqiuensis | B. chitinolyticus | B. krulwichiae | B. plakortidis | B. niabensis |
| B. firmus | B. chondroitinus | B. laevolacticus | B. pocheonensis | B. niacini |
| B. flexus | B. choshinensis | B. larvae | B. polygoni | B. novalis |
| B. foraminis | B. changangensis | B. laterosporus | B. polymyxa | B. oceanisediminis |
| B. fordii | B. cibi | B. salexigens | B. popilliae | B. odysseyi |
| B. formosus | B. circulans | B. saliphilus | B. pseudalcalophilus | B. okhensis |
| B. fortis | B. clarkii | B. schlegelii | B. pseudofirmus | B. okuhidensis |
| B. fumarioli | B. clausii | B. sediminis | B. pseudomycoides | B. oleronius |
| B. funiculus | B. coagulans | B. selenatarsenatis | B. psychrodurans | B. oryzaecorticis |
| B. fusiformis | B. coahuilensis | B. selenitireducens | B. psychrophilus | B. oshimensis |
| B. galactophilus | B. cohnii | B. seohaeanensis | B. psychrosaccharolyticus | B. pabuli |

TABLE 6-continued

Example Bacteria

Optionally, the producer cells are selected from this Table and/or the target cells are selected from this Table (eg, wherein the producer and target cells are of a different species; or of the same species but are a different strain or the host cells are engineered but the target cells are wild-type or vice versa). For example the producer cells are *E coli* and the target cells are *C dificile, E coli, Akkermansia, Enterobacteriacea, Ruminococcus, Faecalibacterium, Firmicutes, Bacteroidetes, Salmonella, Klebsiella, Pseudomonas, Acinetobacter* or *Streptococcus* cells.

| | | |
|---|---|---|
| *B. galactosidilyticus* | *B. composti* | *B. shacheensis* | *B. psychrotolerans* | *B. pakistanensis* |
| *B. galliciensis* | *B. curdanolyticus* | *B. shackletonii* | *B. pulvifaciens* | *B. pallidus* |
| *B. gelatini* | *B. cycloheptanicus* | *B. siamensis* | *B. pumilus* | *B. pallidus* |
| *B. gibsonii* | *B. cytotoxicus* | *B. silvestris* | *B. purgationiresistens* | *B. panacisoli* |
| *B. ginsengi* | *B. daliensis* | *B. simplex* | *B. pycnus* | *B. panaciterrae* |
| *B. ginsengihumi* | *B. decisifrondis* | *B. siralis* | *B. qingdaonensis* | *B. pantothenticus* |
| *B. ginsengisoli* | *B. decolorationis* | *B. smithii* | *B. qingshengii* | *B. parabrevis* |
| *B. globisporus* (eg, B. | *B. deserti* | *B. soli* | *B. reuszeri* | *B. paraflexus* |
| g. subsp. *Globisporus*; or B. | | *B. solimangrovi* | *B. rhizosphaerae* | *B. pasteurii* |
| g. subsp. *Marinus*) | | *B. solisalsi* | *B. rigui* | *B. patagoniensis* |
| | | *B. songklensis* | *B. ruris* | |
| | | *B. sonorensis* | *B. safensis* | |
| | | *B. sphaericus* | *B. salarius* | |
| | | *B. sporothermodurans* | | |
| | | *B. stearothermophilus* | | |
| | | *B. stratosphericus* | | |
| | | *B. subterraneus* | | |
| | | *B. subtilis* (eg, B. | | |
| | | s. subsp. *Inaquosorum*, or B. | | |
| | | s. subsp. *Spizizenn*, or B. | | |
| | | s. subsp. *Subtilis*) | | |
| *Caenimonas* | | *Cardiobacterium* | | *Curtobacterium* |
| *Caenimonas koreensis* | | *Cardiobacterium hominis* | | *Curtobacterium albidum* |
| *Caldalkalibacillus* | | *Carnimonas* | | *Curtobacterium citreus* |
| *Caldalkalibacillus uzonensis* | | *Carnimonas nigrificans* | | |
| *Caldanaerobacter* | | *Carnobacterium* | | |
| *Caldanaerobacter subterraneus* | | *Carnobacterium alterfunditum* | | |
| *Caldanaerobius* | | *Carnobacterium divergens* | | |
| *Caldanaerobius fijiensis* | | *Carnobacterium funditum* | | |
| *Caldanaerobius hominis* | | *Carnobacterium gallinarum* | | |
| *Caldanaerobius* | | *Carnobacterium* | | |
| *polysaccharolyticus* | | *maltaromaticum* | | |
| *Caldanaerobius zeae* | | *Carnobacterium mobile* | | |
| *Caldanaerovirga* | | *Carnobacterium viridans* | | |
| *Caldanaerovirga acetigignens* | | *Caryophanon* | | |
| *Caldicellulosiruptor* | | *Caryophanon latum* | | |
| *Caldicellulosiruptor bescii* | | *Caryophanon tenue* | | |
| *Caldicellulosiruptor kristjanssonii* | | *Catellatospora* | | |
| *Caldicellulosiruptor owensensis* | | *Catellatospora citrea* | | |
| *Capnocytophaga* | | *Catellatospora* | | |
| *Capnocytophaga canimorsus* | | *methionotrophica* | | |
| *Capnocytophaga cynodegmi* | | *Catenococcus* | | |
| *Capnocytophaga gingivalis* | | *Catenococcus thiocycli* | | |
| *Capnocytophaga granulosa* | | *Catenuloplanes* | | |
| *Capnocytophaga haemolytica* | | *Catenuloplanes atrovinosus* | | |
| *Capnocytophaga ochracea* | | *Catenuloplanes castaneus* | | |
| *Capnocytophaga sputigena* | | *Catenuloplanes crispus* | | |
| *Campylobacter* | | *Catenuloplanes indicus* | | |
| *Campylobacter coli* | | *Catenuloplanes japonicus* | | |
| *Campylobacter concisus* | | *Catenuloplanes nepalensis* | | |
| *Campylobacter curvus* | | *Catenuloplanes niger* | | |
| *Campylobacter fetus* | | *Chryseobacterium* | | |
| *Campylobacter gracilis* | | *Chryseobacterium* | | |
| *Campylobacter helveticus* | | *balustinum* | | |
| *Campylobacter hominis* | | *Citrobacter* | | |
| *Campylobacter hyointestinalis* | | *C. amalonaticus* | | |
| *Campylobacter jejuni* | | *C. braakii* | | |
| *Campylobacter lari* | | *C. diversus* | | |
| *Campylobacter mucosalis* | | *C. farmeri* | | |
| *Campylobacter rectus* | | *C. freundii* | | |
| *Campylobacter showae* | | *C. gillenii* | | |
| *Campylobacter sputorum* | | *C. koseri* | | |
| *Campylobacter upsaliensis* | | *C. murliniae* | | |
| | | *C. pasteurii*[1] | | |
| | | *C. rodentium* | | |
| | | *C. sedlakii* | | |
| | | *C. werkmanii* | | |
| | | *C. youngae* | | |
| | | *Clostridium* | | |

TABLE 6-continued

Example Bacteria

Optionally, the producer cells are selected from this Table and/or the target cells are selected from this Table (eg, wherein the producer and target cells are of a different species; or of the same species but are a different strain or the host cells are engineered but the target cells are wild-type or vice versa). For example the producer cells are *E coli* and the target cells are *C difficile*, *E coli*, *Akkermansia*, *Enterobacteriacea*, *Ruminococcus*, *Faecalibacterium*, *Firmicutes*, *Bacteroidetes*, *Salmonella*, *Klebsiella*, *Pseudomonas*, *Acintenobacter* or *Streptococcus* cells.

*Clostridium*
*Clostridium absonum*, *Clostridium aceticum*, *Clostridium acetireducens*, *Clostridium acetobutylicum*, *Clostridium acidisoli*, *Clostridium aciditolerans*, *Clostridium acidurici*, *Clostridium aerotolerans*, *Clostridium aestuarii*, *Clostridium akagii*, *Clostridium aldenense*, *Clostridium aldrichii*, *Clostridium algidicarni*, *Clostridium algidixylanolyticum*, *Clostridium algifaecis*, *Clostridium algoriphilum*, *Clostridium alkalicellulosi*, *Clostridium aminophilum*, *Clostridium aminovalericum*, *Clostridium amygdalinum*, *Clostridium amylolyticum*, *Clostridium arbusti*, *Clostridium arcticum*, *Clostridium argentinense*, *Clostridium asparagiforme*, *Clostridium aurantibutyricum*, *Clostridium autoethanogenum*, *Clostridium baratii*, *Clostridium barkeri*, *Clostridium bartlettii*, *Clostridium beijerinckii*, *Clostridium bifermentans*, *Clostridium boltea*e, *Clostridium bornimense*, *Clostridium botulinum*, *Clostridium bowmanii*, *Clostridium bryantii*, *Clostridium butyricum*, *Clostridium cadaveris*, *Clostridium caenicola*, *Clostridium caminithermale*, *Clostridium carboxidivorans*, *Clostridium carnis*, *Clostridium cavendishii*, *Clostridium celatum*, *Clostridium celerecrescens*, *Clostridium cellobioparum*, *Clostridium cellulolyticum*, *Clostridium cellulosi*, *Clostridium cellulovorans*, *Clostridium chartatabidum*, *Clostridium chauvoei*, *Clostridium chromiireducens*, *Clostridium citroniae*, *Clostridium clariflavum*, *Clostridium clostridioforme*, *Clostridium coccoides*, *Clostridium cochlearium*, *Clostridium colletant*, *Clostridium colicanis*, *Clostridium colinum*, *Clostridium collagenovorans*, *Clostridium cylindrosporum*, *Clostridium difficile*, *Clostridium diolis*, *Clostridium disporicum*, *Clostridium drakei*, *Clostridium durum*, *Clostridium esterheticum*, *Clostridium esterheticum estertheticum*, *Clostridium esterheticum laramiense*, *Clostridium fallax*, *Clostridium felsineum*, *Clostridium fervidum*, *Clostridium fimetarium*, *Clostridium formicaceticum*, *Clostridium frigidicarnis*, *Clostridium frigoris*, *Clostridium gangwhense*, *Clostridium gasigenes*, *Clostridium ghonii*, *Clostridium glycolicum*, *Clostridium glycyrrhizinilyticum*, *Clostridium grantii*, *Clostridium haemolyticum*, *Clostridium halophilum*, *Clostridium hastiforme*, *Clostridium hathewayi*, *Clostridium herbivorans*, *Clostridium hiranonis*, *Clostridium histolyticum*, *Clostridium homopropionicum*, *Clostridium huakuii*, *Clostridium hungatei*, *Clostridium hydrogeniformans*, *Clostridium hydroxybenzoicum*, *Clostridium hylemonae*, *Clostridium jejuense*, *Clostridium indolis*, *Clostridium innocuum*, *Clostridium intestinale*, *Clostridium irregulare*, *Clostridium isatidis*, *Clostridium josui*, *Clostridium kluyveri*, *Clostridium lactatifermentans*, *Clostridium lacusfryxellense*, *Clostridium laramiense*, *Clostridium lavalense*, *Clostridium lentocellum*, *Clostridium lentoputrescens*, *Clostridium leptum*, *Clostridium limosum*, *Clostridium litorale*, *Clostridium lituseburense*, *Clostridium ljungdahlii*, *Clostridium lortetii*, *Clostridium lundense*, *Clostridium magnum*, *Clostridium malenominatum*, *Clostridium mangenotii*, *Clostridium mayombei*, *Clostridium methoxybenzovorans*, *Clostridium methylpentosum*, *Clostridium neopropionicum*, *Clostridium nexile*, *Clostridium nitrophenolicum*, *Clostridium novyi*, *Clostridium oceanicum*, *Clostridium orbiscindens*, *Clostridium oroticum*, *Clostridium oxalicum*, *Clostridium papyrosolvens*, *Clostridium paradoxum*, *Clostridium paraperfringens* (Alias: C. welchii), *Clostridium paraputrificum*, *Clostridium pascui*, *Clostridium pasteurianum*, *Clostridium peptidivorans*, *Clostridium perenne*, *Clostridium perfringens*, *Clostridium pfennigii*, *Clostridium phytofermentans*, *Clostridium piliforme*, *Clostridium pitiforme*, *Clostridium polysaccharolyticum*, *Clostridium populeti*, *Clostridium propionicum*, *Clostridium proteoclasticum*, *Clostridium proteolyticum*, *Clostridium psychrophilum*, *Clostridium puniceum*, *Clostridium purinilyticum*, *Clostridium putrefaciens*, *Clostridium putrificum*, *Clostridium quercicolum*, *Clostridium quinii*, *Clostridium ramosum*, *Clostridium rectum*, *Clostridium roseum*, *Clostridium saccharobutylicum*, *Clostridium saccharogumia*, *Clostridium saccharolyticum*, *Clostridium saccharoperbutylacetonicum*, *Clostridium sardiniense*, *Clostridium sartagoforme*, *Clostridium scatologenes*, *Clostridium schirmacherense*, *Clostridium scindens*, *Clostridium septicum*, *Clostridium sordellii*, *Clostridium sphenoides*, *Clostridium spiroforme*, *Clostridium sporogenes*, *Clostridium sporosphaeroides*, *Clostridium stercorarium*, *Clostridium stercorarium leptospartum*, *Clostridium stercorarium stercorarium*, *Clostridium stercorarium thermolacticum*, *Clostridium sticklandii*, *Clostridium straminisolvens*, *Clostridium subterminale*, *Clostridium sufflavum*, *Clostridium sulfidigenes*, *Clostridium symbiosum*, *Clostridium tagluense*, *Clostridium tepidiprofundi*, *Clostridium termitidis*, *Clostridium tertium*, *Clostridium tetani*, *Clostridium tetanomorphum*, *Clostridium thermaceticum*, *Clostridium thermautotrophicum*, *Clostridium thermoalcaliphilum*, *Clostridium thermobutyricum*, *Clostridium thermocellum*, *Clostridium thermocopriae*, *Clostridium thermohydrosulfuricum*, *Clostridium thermolacticum*, *Clostridium thermopalmarium*, *Clostridium thermopapyrolyticum*, *Clostridium thermosaccharolyticum*, *Clostridium thermosuccinogenes*, *Clostridium thermosulfurigenes*, *Clostridium thiosulfatireducens*, *Clostridium tyrobutyricum*, *Clostridium uliginosum*, *Clostridium ultunense*, *Clostridium villosum*, *Clostridium vincentii*, *Clostridium viride*, *Clostridium xylanolyticum*, *Clostridium xylanovorans*

*Dactylosporangium*
*Dactylosporangium aurantiacum*
*Dactylosporangium fulvum*
*Dactylosporangium matsuzakiense*
*Dactylosporangium roseum*
*Dactylosporangium thailandense*
*Dactylosporangium vinaceum*

*Deinococcus*
*Deinococcus aerius*
*Deinococcus apachensis*
*Deinococcus aquaticus*
*Deinococcus aquatilis*
*Deinococcus caeni*
*Deinococcus radiodurans*
*Deinococcus radiophilus*

*Delftia*
*Delftia acidovorans*

*Desulfovibrio*
*Desulfovibrio desulfuricans*

*Diplococcus*
*Diplococcus pneumoniae*

*Echinicola*
*Echinicola pacifica*
*Echinicola vietnamensis*

(see below)
*Coccochloris*
*Coccochloris elabens*

*Corynebacterium*
*Corynebacterium flavescens*
*Corynebacterium variabile*

*Enterobacter*
*E. aerogenes*
*E. amnigenis*
*E. agglomerans*
*E. arachidis*

*Enterobacter kobei*
*E. ludwigii*
*E. mori*
*E. nimipressuralis*
*E. oryzae*

*Faecalibacterium*
*Faecalibacterium prausnitzii*

*Fangia*
*Fangia hongkongensis*

*Fastidiosipila*

*Flavobacterium*
*Flavobacterium antarcticum*
*Flavobacterium aquatile*
*Flavobacterium aquidurense*
*Flavobacterium balustinum*

TABLE 6-continued

Example Bacteria

Optionally, the producer cells are selected from this Table and/or the target cells are selected from this Table (eg, wherein the producer and target cells are of a different species; or of the same species but are a different strain or the host cells are engineered but the target cells are wild-type or vice versa). For example the producer cells are *E coli* and the target cells are *C dificile, E coli, Akkermansia, Enterobacteriacea, Ruminococcus, Faecalibacterium, Firmicutes, Bacteroidetes, Salmonella, Klebsiella, Pseudomonas, Acintenobacter or Streptococcus* cells.

| | | | |
|---|---|---|---|
| *E. asburiae* | | *E. pulveris* | *Fastidiosipila sanguinis* | *Flavobacterium croceum* |
| *E. cancerogenous* | | *E. pyrinus* | *Fusobacterium* | *Flavobacterium cucumis* |
| *E. cloacae* | | *E. radicincitans* | *Fusobacterium nucleatum* | *Flavobacterium daejeonense* |
| *E. cowanii* | | *E. taylorae* | | *Flavobacterium defluvii* |
| *E. dissolvens* | | *E. turicensis* | | *Flavobacterium degerlachei* |
| *E. gergoviae* | | *E. sakazakii Enterobacter soli* | | *Flavobacterium dentirificans* |
| *E. helveticus* | | *Enterococcus* | | *Flavobacterium filum* |
| *E. hormaechei* | | *Enterococcus durans* | | *Flavobacterium flevense* |
| *E. intermedius* | | *Enterococcus faecalis* | | *Flavobacterium frigidarium* |
| | | *Enterococcus faecium* | | *Flavobacterium mizutaii* |
| | | *Erwinia* | | *Flavobacterium okeanokoites* |
| | | *Erwinia hapontici* | | |
| | | *Escherichia* | | |
| | | *Escherichia coli* | | |
| *Gaetbulibacter* | | *Haemophilus* | *Ideonella* | *Janibacter* |
| *Gaetbulibacter saemankumensis* | | *Haemophilus aegyptius* | *Ideonella azotifigens* | *Janibacter anophelis* |
| *Gallibacterium* | | *Haemophilus aphrophilus* | *Idiomarina* | *Janibacter corallicola* |
| *Gallibacterium anatis* | | *Haemophilus felis* | *Idiomarina abyssalis* | *Janibacter limosus* |
| *Gallicola* | | *Haemophilus gallinarum* | *Idiomarina baltica* | *Janibacter melonis* |
| *Gallicola barnesae* | | *Haemophilus haemolyticus* | *Idiomarina fontislapidosi* | *Janibacter terrae* |
| *Garciella* | | *Haemophilus influenzae* | *Idiomarina loihiensis* | *Jannaschia* |
| *Garciella nitratireducens* | | *Haemophilus paracuniculus* | *Idiomarina ramblicola* | *Jannaschia cystaugens* |
| *Geobacillus* | | *Haemophilus parahaemolyticus* | *Idiomarina seosinensis* | *Jannaschia helgolandensis* |
| *Geobacillus thermoglucosidasius* | | *Haemophilus parainfluenzae* | *Idiomarina zobellii* | *Jannaschia pohangensis* |
| *Geobacillus stearothermophilus* | | *Haemophilus paraphrohaemolyticus* | *Ignatzschineria* | *Jannaschia rubra* |
| *Geobacter* | | *Haemophilus parasuis* | *Ignatzschineria larvae* | *Janthinobacterium* |
| *Geobacter bemidjiensis* | | *Haemophilus pittmaniae* | *Ignavigranum* | *Janthinobacterium agaricidamnosum* |
| *Geobacter bremensis* | | *Hafnia* | *Ignavigranum ruoffiae* | *Janthinobacterium lividum* |
| *Geobacter chapellei* | | *Hafnia alvei* | *Ilumatobacter* | *Jejuia* |
| *Geobacter grbiciae* | | *Hahella* | *Ilumatobacter fluminis* | *Jejuia pallidilutea* |
| *Geobacter hydrogenophilus* | | *Hahella ganghwensis* | *Ilyobacter* | *Jeotgalibacillus* |
| *Geobacter lovleyi* | | *Halalkalibacillus* | *Ilyobacter delafieldii* | *Jeotgalibacillus alimentarius* |
| *Geobacter metallireducens* | | *Halalkalibacillus halophilus* | *Ilyobacter insuetus* | *Jeotgalicoccus* |
| *Geobacter pickeringii* | | *Helicobacter* | *Ilyobacter polytropus* | *Jeotgalicoccus halotolerans* |
| *Geobacter sulfurreducens* | | *Helicobacter pylori* | *Ilyobacter tartaricus* | |
| *Geodermatophilus* | | | | |
| *Geodermatophilus obscurus* | | | | |
| *Gluconacetobacter* | | | | |
| *Gluconacetobacter xylinus* | | | | |
| *Gordonia* | | | | |
| *Gordonia rubripertincta* | | | | |
| *Kaistia* | | *Labedella* | *Listeria ivanovii* | *Micrococcus* | *Nesterenkonia* |
| *Kaistia adipata* | | *Labedella gwakjiensis* | *L. marthii* | *Micrococcus luteus* | *Nesterenkonia holobia* |
| *Kaistia soli* | | *Labrenzia* | *L. monocytogenes* | *Micrococcus lylae* | *Nocardia* |
| *Kangiella* | | *Labrenzia aggregata* | *L. newyorkensis* | *Moraxella* | *Nocardia argentinensis* |
| *Kangiella aquimarina* | | *Labrenzia alba* | *L. riparia* | *Moraxella bovis* | *Nocardia corallina* |

TABLE 6-continued

Example Bacteria

Optionally, the producer cells are selected from this Table and/or the target cells are selected from this Table (eg, wherein the producer and target cells are of a different species; or of the same species but are a different strain or the host cells are engineered but the target cells are wild-type or vice versa). For example the producer cells are *E coli* and the target cells are *C dificile*, *E coli*, *Akkermansia*, *Enterobacteriacea*, *Ruminococcus*, *Faecalibacterium*, *Firmicutes*, *Bacteroidetes*, *Salmonella*, *Klebsiella*, *Pseudomonas*, *Acintenobacter* or *Streptococcus* cells.

| | | | |
|---|---|---|---|
| *Kangiella koreensis* | *Labrenzia alexandrii* | *L. rocourtiae* | *Moraxella nonliquefaciens* |
| *Kerstersia* | *Labrenzia marina* | *L. seeligeri* | *Moraxella osloensis* |
| *Kerstersia gyiorum* | *Labrys* | *L. weihenstephanensis* | *Nakamurella* |
| *Kiloniella* | *Labrys methylaminiphilus* | *L. welshimeri* | *Nakamurella multipartita* |
| *Kiloniella laminariae* | *Labrys miyagiensis* | *Listonella* | *Nannocystis* |
| *Klebsiella* | *Labrys monachus* | *Listonella anguillarum* | *Nannocystis pusilla* |
| *K. gramilomatis* | *Labrys okinawensis* | *Macrococcus* | *Natranaerobius* |
| *K. oxytoca* | *Labrys* | *Macrococcus bovicus* | *Natranaerobius thermophilus* |
| *K. pneumoniae* | *portucalensis* | *Marinobacter* | *Natranaerobius trueperi* |
| *K. terrigena* | *Lactobacillus* | *Marinobacter algicola* | *Naxibacter* |
| *K. variicola* | [see below] | *Marinobacter bryozoorum* | *Naxibacter alkalitolerans* |
| *Kluyvera* | *Laceyella* | *Marinobacter flavimaris* | *Neisseria* |
| *Kluyvera ascorbata* | *Laceyella putida* | *Meiothermus* | *Neisseria cinerea* |
| *Kocuria* | *Lechevalieria* | *Meiothermus ruber* | *Neisseria denitrificans* |
| *Kocuria roasea* | *Lechevalieria aerocolonigenes* | *Methylophilus* | *Neisseria gonorrhoeae* |
| *Kocuria varians* | *Legionella* | *Methylophilus methylotrophus* | *Neisseria lactamica* |
| *Kurthia* | [see below] | *Microbacterium* | *Neisseria mucosa* |
| *Kurthia zopfii* | *Listeria* | *Microbacterium ammoniaphilum* | *Neisseria sicca* |
| | *L. aquatica* | *Microbacterium arborescens* | *Neisseria subflava* |
| | *L. booriae* | *Microbacterium liquefaciens* | *Neptunomonas* |
| | *L. cornellensis* | *Microbacterium oxydans* | *Neptunomonas japonica* |
| | *L. fleischmannii* | | *Nocardia otitidiscaviarum* |
| | *L. floridensis* | | |
| | *L. grandensis* | | |
| | *L. grayi* | | |
| | *L. innocua* | | |
| *Lactobacillus* | *L. catenaformis* | *L. mali* | *L. parakefiri* | *L. sakei* |
| *L. acetotolerans* | *L. ceti* | *L. manihotivorans* | *L. paralimentarius* | *L. salivarius* |
| *L. acidifarinae* | *L. coleohominis* | *L. mindensis* | *L. paraplantarum* | *L. sanfranciscensis* |
| *L. acidipiscis* | *L. collinoides* | *L. mucosae* | *L. pentosus* | *L. satsumensis* |
| *L. acidophilus* | *L. composti* | *L. murinus* | *L. perolens* | *L. secaliphilus* |
| *Lactobacillus agilis* | *L. concavus* | *L. nagelii* | *L. plantarum* | *L. sharpeae* |
| *L. algidus* | *L. coryniformis* | *L. namurensis* | *L. pontis* | *L. siliginis* |
| *L. alimentarius* | *L. crispatus* | *L. nantensis* | *L. protectus* | *L. spicheri* |
| *L. amylolyticus* | *L. crustorum* | *L. oligofermentans* | *L. psittaci* | *L. suebicus* |
| *L. amylophilus* | *L. curvatus* | *L. oris* | *L. reuteri* | *L. thailandensis* |
| *L. amylotrophicus* | *L. delbrueckii* subsp. *bulgaricus* | *L. panis* | *L. rennini* | *L. ultunensis* |
| *L. amylovorus* | *L. delbrueckii* subsp. *delbrueckii* | *L. pantheris* | *L. rhamnosus* | *L. vaccinostercus* |
| *L. animalis* | *L. delbrueckii* subsp. *lactis* | *L. parabrevis* | *L. rimae* | *L. vaginalis* |
| *L. antri* | *L. dextrinicus* | *L. parabuchneri* | *L. rogosae* | *L. versmoldensis* |
| *L. apodemi* | *L. diolivorans* | *L. paracasei* | *L. rossiae* | *L. vini* |
| *L. aviarius* | *L. equi* | *L. paracollinoides* | *L. ruminis* | *L. vitulinus* |
| *L. bifermentans* | *L. equigenerosi* | *L. parafarraginis* | *L. saerimneri* | *L. zeae* |
| *L. brevis* | *L. farraginis* | *L. homohiochii* | *L. jensenii* | *L. zymae* |
| *L. buchneri* | *L. farciminis* | *L. iners* | *L. johnsonii* | *L. gastricus* |
| *L. camelliae* | | *L. ingluviei* | *L. kalixensis* | *L. ghanensis* |
| *L. casei* | | | | |

TABLE 6-continued

Example Bacteria

Optionally, the producer cells are selected from this Table and/or the target cells are selected from this Table (eg, wherein the producer and target cells are of a different species; or of the same species but are a different strain or the host cells are engineered but the target cells are wild-type or vice versa). For example the producer cells are *E coli* and the target cells are *C dificile, E coli, Akkermansia, Enterobacteriacea, Ruminococcus, Faecalibacterium, Firmicutes, Bacteroidetes, Salmonella, Klebsiella, Pseudomonas, Acinetobacter* or *Streptococcus* cells.

| | | | |
|---|---|---|---|
| *L. kitasatonis* | *L. fermentum* | *L. intestinalis* | *L. kefiranofaciens* | *L. graminis* |
| *L. kunkeei* | *L. fornicalis* | *L. fuchuensis* | *L. kefiri* | *L. hammesii* |
| *L. leichmannii* | *L. fructivorans* | *L. gallinarum* | *L. kimchii* | *L. hamsteri* |
| *L. lindneri* | *L. frumenti* | *L. gasseri* | *L. helveticus* | *L. harbinensis* |
| *L. malefermentans* | | | *L. hilgardii* | *L. hayakitensis* |
| Legionella | | | | |
| Legionella adelaidensis | Legionella drancourtii | Candidatus Legionella jeonii | Legionella quinlivanii | |
| Legionella anisa | Legionella dresdenensis | Legionella jordanis | Legionella rowbothamii | |
| Legionella beliardensis | Legionella drozanskii | Legionella lansingensis | Legionella rubrilucens | |
| Legionella birminghamensis | Legionella dumoffii | Legionella londiniensis | Legionella sainthelensi | |
| Legionella bozemanae | Legionella erythra | Legionella longbeachae | Legionella santicrucis | |
| Legionella brunensis | Legionella fairfieldensis | Legionella lytica | Legionella shakespearei | |
| Legionella busanensis | Legionella fallonii | Legionella maceachernii | Legionella spiritensis | |
| Legionella cardiaca | Legionella feeleii | Legionella massiliensis | Legionella steelei | |
| Legionella cherrii | Legionella geestiana | Legionella micdadei | Legionella steigerwaltii | |
| Legionella cincinnatiensis | Legionella genomospecies | Legionella monrovica | Legionella taurinensis | |
| Legionella clemsonensis | Legionella gormanii | Legionella moravica | Legionella tucsonensis | |
| Legionella donaldsonii | Legionella gratiana | Legionella nagasakiensis | Legionella tunisiensis | |
| | Legionella gresilensis | Legionella nautarum | Legionella wadsworthii | |
| | Legionella hackeliae | Legionella norrlandica | Legionella waltersii | |
| | Legionella impletisoli | Legionella oakridgensis | Legionella worsleiensis | |
| | Legionella israelensis | Legionella parisiensis | Legionella yabuuchiae | |
| | Legionella jamestowniensis | Legionella pittsburghensis | | |
| | | Legionella pneumophila | | |
| | | Legionella quateirensis | | |
| Paenibacillus | | Prevotella | Quadrisphaera | |
| Paenibacillus thiaminolyticus | | Prevotella albensis | Quadrisphaera granulorum | |
| Pantoea | | Prevotella amnii | Quatrionicoccus | |
| Pantoea agglomerans | | Prevotella bergensis | Quatrionicoccus australiensis | |
| Paracoccus | | Prevotella bivia | Quinella | |
| Paracoccus alcaliphilus | | Prevotella brevis | Quinella ovalis | |
| Paucimonas | | Prevotella bryantii | Ralstonia | |
| Paucimonas lemoignei | | Prevotella buccae | Ralstonia eutropha | |
| Pectobacterium | | Prevotella buccalis | Ralstonia insidiosa | |
| Pectobacterium aroidearum | | Prevotella copri | Ralstonia mannitolilytica | |
| Pectobacterium atrosepticum | | Prevotella dentalis | Ralstonia pickettii | |
| Pectobacterium betavasculorum | | Prevotella denticola | Ralstonia pseudosolanacearum | |
| Pectobacterium cacticida | | Prevotella distens | Ralstonia syzygii | |
| Pectobacterium carnegieana | | Prevotella histicola | Ralstonia solanacearum | |
| Pectobacterium carotovorum | | Prevotella intermedia | Ramlibacter | |
| Pectobacterium chrysanthemi | | Prevotella maculosa | Ramlibacter henchirensis | |
| Pectobacterium cypripedii | | Prevotella marshii | Ramlibacter tataouinensis | |
| Pectobacterium rhapontici | | Prevotella melaninogenica | | |
| Pectobacterium wasabiae | | Prevotella micans | | |
| Planococcus | | Prevotella multiformis | | |
| Planococcus citreus | | Prevotella nigrescens | | |
| | | Prevotella oralis | | |
| Oceanibulbus | | | | |
| Oceanibulbus indolifex | | | | |
| Oceanicaulis | | | | |
| Oceanicaulis alexandrii | | | | |
| Oceanicola | | | | |
| Oceanicola batsensis | | | | |
| Oceanicola granulosus | | | | |
| Oceanicola nanhaiensis | | | | |
| Oceanimonas | | | | |
| Oceanimonas baumannii | | | | |
| Oceaniserpentilla | | | | |
| Oceaniserpentilla haliotis | | | | |
| Oceanisphaera | | | | |
| Oceanisphaera donghaensis | | | | |
| Oceanisphaera litoralis | | | | |
| Oceanithermus | | | | |
| Oceanithermus desulfurans | | | | |
| Oceanithermus profundus | | | | |
| Oceanobacillus | | | | |
| Oceanobacillus caeni | | | | |
| Oceanospirillum | | | | |
| Oceanospirillum linum | | | | |

TABLE 6-continued

Example Bacteria

Optionally, the producer cells are selected from this Table and/or the target cells are selected from this Table (eg, wherein the producer and target cells are of a different species; or of the same species but are a different strain or the host cells are engineered but the target cells are wild-type or vice versa). For example the producer cells are *E coli* and the target cells are *C dificile*, *E coli*, *Akkermansia*, *Enterobacteriacea*, *Ruminococcus* or *Faecalibacterium*, *Firmicutes*, *Bacteroidetes*, *Salmonella*, *Klebsiella*, *Pseudomonas*, *Acinetenobacter* or *Streptococcus* cells.

| | | |
|---|---|---|
| | *Planomicrobium* | *Raoultella* |
| | *Planomicrobium okeanokoites* | *Raoultella ornithinolytica* |
| | *Plesiomonas* | *Raoultella planticola* |
| | *Plesiomonas shigelloides* | *Raoultella terrigena* |
| | *Proteus* | *Rathayibacter* |
| | *Proteus vulgaris* | *Rathayibacter caricis* |
| | *Prevotella oris* | *Rathayibacter festucae* |
| | *Prevotella oulorum* | *Rathayibacter iranicus* |
| | *Prevotella pallens* | *Rathayibacter rathayi* |
| | *Prevotella salivae* | *Rathayibacter toxicus* |
| | *Prevotella stercorea* | *Rathayibacter tritici* |
| | *Prevotella tannerae* | *Rhodobacter* |
| | *Prevotella timonensis* | *Rhodobacter sphaeroides* |
| | *Prevotella veroralis* | *Ruegeria* |
| | *Providencia* | *Ruegeria gelatinovorans* |
| | *Providencia stuartii* | |
| | *Pseudomonas* | |
| | *Pseudomonas aeruginosa* | |
| | *Pseudomonas alcaligenes* | |
| | *Pseudomonas anguillispetica* | |
| | *Pseudomonas fluorescens* | |
| | *Pseudoalteromonas haloplanktis* | |
| | *Pseudomonas mendocina* | |
| | *Pseudomonas pseudoalcaligenes* | |
| | *Pseudomonas putida* | |
| | *Pseudomonas tutzeri* | |
| | *Pseudomonas syringae* | |
| | *Psychrobacter* | |
| | *Psychrobacter faecalis* | |
| | *Psychrobacter phenylpyruvicus* | |
| *Saccharococcus* | *Sagitula* | *Stenotrophomonas* |
| *Saccharococcus thermophilus* | *Sagitula stellata* | *Stenotrophomonas maltophilia* |
| *Saccharomonospora* | *Salegenibacter* | *Streptococcus* |
| *Saccharomonospora azurea* | *Salegenibacter salegens* | [also see below] |
| *Saccharomonospora cyanea* | *Salimicrobium* | *Streptomyces* |
| *Saccharomonospora viridis* | *Salimicrobium album* | *Streptomyces achromogenes* |
| *Saccharophagus* | *Salinibacter* | *Streptomyces cesalbus* |
| *Saccharophagus degradans* | *Salinibacter ruber* | |
| *Saccharopolyspora* | *Salinicoccus* | *Streptomyces cescaepitosus* |
| *Saccharopolyspora erythraea* | *Salinicoccus alkaliphilus* | *Streptomyces cesdiastaticus* |
| *Saccharopolyspora gregorii* | *Salinicoccus hispanicus* | *Streptomyces cesexfoliatus* |
| *Saccharopolyspora hirsuta* | *Salinicoccus roseus* | *Streptomyces fimbriatus* |
| *Saccharopolyspora hordei* | *Salinispora* | *Streptomyces fradiae* |
| *Saccharopolyspora rectivirgula* | *Salinispora arenicola* | *Streptomyces fulvissimus* |
| *Saccharopolyspora spinosa* | *Salinispora tropica* | *Streptomyces griseoruber* |
| *Saccharopolyspora taberi* | *Salinivibrio* | *Streptomyces griseus* |
| *Saccharothrix* | *Salinivibrio costicola* | *Streptomyces lavendulae* |
| *Saccharothrix australiensis* | *Salmonella* | *Streptomyces* |
| *Saccharothrix coeruleofusca* | *Salmonella bongori* | *Tatlockia* |
| *Saccharothrix espanaensis* | *Salmonella enterica* | *Tatlockia maceachernii* |
| | *Sanguibacter* | *Tatlockia micdadei* |
| | *Sanguibacter keddieii* | *Tenacibaculum* |
| | *Sanguibacter suarezii* | *Tenacibaculum amylolyticum* |
| | *Saprospira* | *Tenacibaculum discolor* |
| | *Saprospira grandis* | *Tenacibaculum gallaicum* |
| | *Sarcina* | *Tenacibaculum lutimaris* |
| | *Sarcina maxima* | *Tenacibaculum mesophilum* |
| | *Sarcina ventriculi* | *Tenacibaculum skagerrakense* |
| | *Sebaldella* | *Tepidanaerobacter* |
| | *Sebaldella termitidis* | *Tepidanaerobacter syntrophicus* |
| | *Serratia* | *Tepidibacter* |
| | *Serratia fonticola* | *Tepidibacter* |
| | *Serratia marcescens* | |
| | *Sphaerotilus* | |
| | *Sphaerotilus natans* | |
| | *Sphingobacterium* | |
| | *Sphingobacterium multivorum* | |
| | *Staphylococcus* | |
| | [see below] | |

TABLE 6-continued

Example Bacteria

Optionally, the producer cells are selected from this Table and/or the target cells are selected from this Table (eg, wherein the producer and target cells are of a different species; or of the same species but are a different strain or the host cells are engineered but the target cells are wild-type or vice versa). For example the producer cells are *E coli* and the target cells are *C dificile*, *E coli*, *Akkermansia*, *Enterobacteriacea*, *Ruminococcus*, *Faecalibacterium*, *Firmicutes*, *Bacteroidetes*, *Salmonella*, *Klebsiella*, *Pseudomonas*, *Acinetobacter* or *Streptococcus* cells.

| | | | |
|---|---|---|---|
| *Saccharothrix longispora* | *Salmonella subterranea* | *phaeochromogenes* | *formicigenes* |
| *Saccharothrix mutabilis* | *Salmonella typhi* | *Streptomyces* | *Tepidibacter thalassicus* |
| *Saccharothrix syringae* | | *thermodiastaticus* | *Thermus* |
| *Saccharothrix tangerinus* | | *Streptomyces tuberculdicus* | *Thermus aquaticus* |
| *Saccharothrix texasensis* | | | *Thermus filiformis* |
| | | | *Thermus thermophilus* |
| *Staphylococcus* | | | |
| *S. arlettae* | *S. equorum* | *S. microti* | *S. schleiferi* |
| *S. agnetis* | *S. felis* | *S. muscae* | *S. sciuri* |
| *S. aureus* | *S. fleurettii* | *S. nepalensis* | *S. simiae* |
| *S. auricularis* | *S. gallinarum* | *S. pasteuri* | *S. simulans* |
| *S. capitis* | *S. haemolyticus* | *S. petrasii* | *S. stepanovicii* |
| *S. caprae* | *S. hominis* | *S. pettenkoferi* | *S. succinus* |
| *S. carnosus* | *S. hyicus* | *S. piscifermentans* | *S. vitulinus* |
| *S. caseolyticus* | *S. intermedius* | *S. pseudintermedius* | *S. warneri* |
| *S. chromogenes* | *S. kloosii* | *S. pseudolugdunensis* | *S. xylosus* |
| *S. cohnii* | *S. leei* | *S. pulvereri* | |
| *S. condimenti* | *S. lentus* | *S. rostri* | |
| *S. delphini* | *S. lugdunensis* | *S. saccharolyticus* | |
| *S. devriesei* | *S. lutrae* | *S. saprophyticus* | |
| *S. epidermidis* | *S. lyticans* | | |
| | *S. massiliensis* | | |
| *Streptococcus* | | | |
| *Streptococcus agalactiae* | *Streptococcus infantarius* | *Streptococcus orisratti* | *Streptococcus thermophilus* |
| *Streptococcus anginosus* | *Streptococcus iniae* | *Streptococcus parasanguinis* | *Streptococcus sanguinis* |
| *Streptococcus bovis* | *Streptococcus intermedius* | *Streptococcus peroris* | *Streptococcus sobrinus* |
| *Streptococcus canis* | *Streptococcus lactarius* | *Streptococcus pneumoniae* | *Streptococcus suis* |
| *Streptococcus constellatus* | *Streptococcus milleri* | *Streptococcus pseudpneumoniae* | *Streptococcus uberis* |
| *Streptococcus downei* | *Streptococcus mitis* | *Streptococcus pyogenes* | *Streptococcus vestibularis* |
| *Streptococcus dysgalactiae* | *Streptococcus mutans* | *Streptococcus ratti* | *Streptococcus viridans* |
| *Streptococcus equines* | *Streptococcus oralis* | *Streptococcus salivarii* | *Streptococcus zooepidemicus* |
| *Streptococcus faecalis* | *Streptococcus tigurinus* | | |
| *Streptococcus ferus* | | | |
| *Uliginosibacterium* | *Vagococcus* | *Vibrio* | *Virgibacillus* |
| *gangwonense* | *Vagococcus carniphilus* | *Vibrio aerogenes* | *Virgibacillus halodenitrificans* |
| *Ulvibacter* | *Vagococcus elongatus* | *Vibrio aestuarianus* | *Virgibacillus pantothenticus* |
| *Ulvibacter litoralis* | *Vagococcus fessus* | *Vibrio albensis* | *Weissella* |
| *Umezawaea* | *Vagococcus fluvialis* | *Vibrio alginolyticus* | *Weissella cibaria* |
| *Umezawaea tangerina* | *Vagococcus lutrae* | *Vibrio campbellii* | *Weissella confusa* |
| *Undibacterium* | *Vagococcus salmoninarum* | *Vibrio cholerae* | *Weissella halotolerans* |
| *Undibacterium pigrum* | *Variovorax* | *Vibrio cincinnatiensis* | *Weissella hellenica* |
| *Ureaplasma* | *Variovorax boronicumulans* | *Vibrio coralliilyticus* | *Weissella kandleri* |
| *Ureaplasma urealyticum* | *Variovorax dokdonensis* | *Vibrio cyclitrophicus* | *Weissella koreensis* |
| *Ureibacillus* | *Variovorax paradoxus* | *Vibrio diazotrophicus* | *Weissella minor* |
| *Ureibacillus composti* | *Variovorax soli* | *Vibrio fluvialis* | *Weissella* |
| | *Veillonella* | *Vibrio furnissii* | |
| | *Veillonella atypica* | *Vibrio gazogenes* | |
| | | | *Xanthobacter* |
| | | | *Xanthobacter agilis* |
| | | | *Xanthobacter aminoxidans* |
| | | | *Xanthobacter autotrophicus* |
| | | | *Xanthobacter flavus* |
| | | | *Xanthobacter tagetidis* |
| | | | *Xanthobacter viscosus* |
| | | | *Xanthomonas* |
| | | | *Xanthomonas albilineans* |
| | | | *Xanthomonas alfalfae* |
| | | | *Xanthomonas* |

TABLE 6-continued

Example Bacteria

Optionally, the producer cells are selected from this Table and/or the target cells are selected from this Table (eg, wherein the producer and target cells are of a different species; or of the same species but are a different strain or the host cells are engineered but the target cells are wild-type or vice versa). For example the producer cells are *E coli* and the target cells are *C difficile*, *E coli*, *Akkermansia*, *Enterobacteriacea*, *Ruminococcus*, *Faecalibacterium*, Firmicutes, Bacteroidetes, Salmonella, Klebsiella, Pseudomonas, Acinetobacter or Streptococcus cells.

| | | | |
|---|---|---|---|
| Ureibacillus suwonensis | Veillonella caviae | Vibrio halioticoli | paramesenteroides |
| Ureibacillus terrenus | Veillonella criceti | Vibrio harveyi | Weissella soli |
| Ureibacillus thermophilus | Veillonella dispar | Vibrio ichthyoenteri | Weissella thailandensis |
| Ureibacillus thermosphaericus | Veillonella montpellierensis | Vibrio mediterranei | Weissella viridescens |
| | Veillonella parvula | Vibrio metschnikovii | Williamsia |
| | Veillonella ratti | Vibrio mytili | Williamsia marianensis |
| | Veillonella rodentium | Vibrio natriegens | Williamsia maris |
| | Venenivibrio | Vibrio navarrensis | Williamsia serinedens |
| | Venenivibrio stagnispumantis | Vibrio nereis | Winogradskyella |
| | Verminephrobacter | Vibrio nigripulchritudo | Winogradskyella |
| | Verminephrobacter eiseniae | Vibrio ordalii | thalassocola |
| | Verrucomicrobium | Vibrio orientalis | Wolbachia |
| | Verrucomicrobium spinosum | Vibrio parahaemolyticus | Wolbachia persica |
| | | Vibrio pectenicida | Wolinella |
| | | Vibrio penaeicida | Wolinella succinogenes |
| | | Vibrio proteolyticus | Zobellia |
| | | Vibrio shilonii | Zobellia galactanivorans |
| | | Vibrio splendidus | Zobellia uliginosa |
| | | Vibrio tubiashii | Zoogloea |
| | | Vibrio vulnificus | Zoogloea ramigera |
| | | | Zoogloea resiniphila |
| Xenophilus | Yangia | Yersinia mollaretii | Zooshikella |
| Xenophilus azovorans | Yangia pacifica | Yersinia philomiragia | Zooshikella ganghwensis |
| Xenorhabdus | Yaniella | Yersinia pestis | Zunongwangia |
| Xenorhabdus beddingii | Yaniella flava | Yersinia pseudotuberculosis | Zunongwangia profunda |
| Xenorhabdus bovienii | Yaniella halotolerans | Yersinia rohdei | Zymobacter |
| Xenorhabdus cabanillasii | Yeosuana | Yersinia ruckeri | Zymobacter palmae |
| Xenorhabdus doucetiae | Yeosuana aromativorans | Yokenella | Zymomonas |
| Xenorhabdus griffiniae | Yersinia | Yokenella regensburgei | Zymomonas mobilis |
| Xenorhabdus hominickii | Yersinia aldovae | Yonghaparkia | Zymophilus |
| Xenorhabdus koppenhoeferi | Yersinia bercovieri | Yonghaparkia alkaliphila | Zymophilus paucivorans |
| Xenorhabdus nematophila | Yersinia enterocolitica | Zavarzinia | Zymophilus raffinosivorans |
| Xenorhabdus poinarii | Yersinia entomophaga | Zavarzinia compransoris | |
| Xylanibacter | Yersinia frederiksenii | | |
| Xylanibacter oryzae | Yersinia intermedia | | |
| | Yersinia kristensenii | | |

| | |
|---|---|
| | arboricola |
| | Xanthomonas |
| | axonopodis |
| | Xanthomonas |
| | campestris |
| | Xanthomonas citri |
| | Xanthomonas codiaei |
| | Xanthomonas |
| | cucurbitae |
| | Xanthomonas |
| | euvesicatoria |
| | Xanthomonas fragariae |
| | Xanthomonas fuscans |
| | Xanthomonas gardneri |
| | Xanthomonas hortorum |
| | Xanthomonas hyacinthi |
| | Xanthomonas perforans |
| | Xanthomonas phaseoli |
| | Xanthomonas pisi |
| | Xanthomonas populi |
| | Xanthomonas theicola |
| | Xanthomonas |
| | translucens |
| | Xanthomonas |
| | vesicatoria |
| | Xylella |
| | Xylella fastidiosa |
| | Xylophilus |
| | Xylophilus ampelinus |
| | Zobellella |
| | Zobellella denitrificans |
| | Zobellella taiwanensis |
| | Zeaxanthinibacter |
| | Zeaxanthinibacter |
| | enoshimensis |
| | Zhihengliuella |
| | Zhihengliuella |
| | halotolerans |
| | Xylanibacterium |
| | Xylanibacterium ulmi |

TABLE 7

SaPIs

| Element | Staphylococcal genome | Baba* | Lindsay and Holden[#] | Size (kb) | Inducing phages | att site core (location, att/int group) | Refs |
|---|---|---|---|---|---|---|---|
| SaPI4 | S. aureus str. MRSA252 | NA | SaPI4 | 15.1 | Endogenous prophage | AAAGAAGAACAATAA TAT (~8', I) | 7.39 |
| SaPI1028 | S. aureus str. NY940 | NA | NA | 15.6 | Endogenous prophage | AAAGAAGAACAATAA TAT (~8, I) | 7.40 |
| SaPIbov1 | S. aureus str. RF122 | vSa2 | NA | 15.8 | φ11 and 80α | TAATTATTCCCAGTC AAT (~9', II) | 25.41 |
| SaPIbov2 | S. aureus str. V329 | NA | NA | 27 | 80α | TAATTATTCCCACTC GAT (~9', II) | 25 |
| SaPIm4 | S. aureus str. mu50 | vSa3 type I | NA | 14.4 | Endogenous prophage | TCCCGCCGTCTCCAT (~18, III) | 7.12 |
| SaPImw2 | S. aureus str. mw2 | vSa3 type II | SaPI3 | 14.4 | Endogenous prophage | TCGCGCCGTCTCCAT (~18, III) | 7.12 |
| SePI1 | S. aureus str. FRI909 | NA | NA | 9.9 | Not known | TCCGCCGTCTCCAT (location unknown[§], III) | 11 |
| ShPI2 | S. haemolyticus | vSh2 | NA | 16.6 | Not known | TCCCGCCGTCTCCAT (48', III)[¶] | 8 |
| SaPI1 | S. aureus str. RN4282 | vSa1 | NA | 15.2 | 80α and φ13 | TTATTTAGCAGGAAT AA (~19', IV) | 6 |
| SaPI3 | S. aureus str. COL | vSa1 | SaPI1 | 15.6 | Not known | TTATTTAGCAGGAAT AA (~19', IV) | 42 |
| SaPI5 | S. aureus str. USA300 | NA | NA | 14.0 | Not known | TTATTTAGCAGGAAT AA (~19', IV) | 43 |
| SaPIn1 and SaPIm1 | S. aureus str. n315 and S. aureus str. mu50, respectively | vSa4 type I | SaPI2 | 15 | 80α | GTTTTACCATCATTC CCGGCAT (~44', V) | 36 and J. R. P., unpublished observations |
| SaPI2 | S. aureus str. RN3984 | NA | NA | 14.7 | 80 and 80α | ATTTTACATCATTCC TGGCAT (~44', V) | 7.20 |
| SaRIfusB | S. aureus European fusidic acid-resistant impetigo clone CS6 | NA | NA | 20.7 | Not known | ATGCCAGGTATGATG TAAAAC (~44', V) | 38 |
| SaPI122 | S. aureus str. RF122 | NA | NA | 17.9 | Endogenous prophage | GTTTTACATCATTCC TGGCAT (~44', V) | NA[¶] |
| SaPI6Δ | S. aureus strains 8325, COL, USA300, MSSA476, Newman and mw2 | vSa4 type II | NA | 3.14 | Not known | GTTTTACCATCATTC CCGGCATGTTTTACA TCATTCCTGGCAT (~44', V) | 12 |
| SsPI15305 | S. saprophyticus str. 15305 | vSs15305 | NA | 16.7 | Not known | Unknown sequence (~48', VI) | 9 | int, integrase:
NA, not applicable;
S. aureus, Staphylococcus aureus;
S. haemolyticus, Staphylococcus haemolyticus;
S. saprophyticus, Staphylococcus saprophyticus.
*Nomencalture proposed by Baba et al[36].
[#]Nomenclature used by Lindsay and Holden[37].
[§]This strain has not been sequenced yet, so the genomic location of SaPI1 is unknown.
ShPI2 is located 180° away from the other SaPIs with the same att core sequence, owling to the major chromosomal inverison that has been documented in the S. haemolyticus genome[8].
[¶]GenBank accession NC_007622.

TABLE 8

Example Plasmids and Copy Number

| Common Vectors | Copy Number+ | ORI | Incompatibility Group | Control |
|---|---|---|---|---|
| pUC | ~500-700 | pMB1 (derivative) | A | Relaxed |
| pBR322 | ~15-20 | pMB1 | A | Relaxed |
| pET | ~15-20 | pBR322 | A | Relaxed |
| pGEX | ~15-20 | pBR322 | A | Relaxed |
| pColE1 | ~15-20 | ColE1 | A | Relaxed |
| pR6K | ~15-20 | R6K* | C | Stringent |
| pACYC | ~10 | p15A | B | Relaxed |
| pSC101 | ~5 | pSC101 | C | Stringent |
| pBluescript | ~300-500 | ColE1 (derivative) and F1** | A | Relaxed |
| pGEM | ~300-500 | pUC and F1* | A | Relaxed |

The invention claimed is:

1. A method of producing transduction particles wherein the particles are capable of recognizing a receptor on bacterial target cells for transduction of the cells, the method comprising producing the particles in bacterial producer cells, wherein the bacterial producer cells do not express the receptor on their surface,
  wherein the production yield of transduction particles is enhanced compared to production in bacterial producer cells that express the receptor on their surface.

2. The method of claim 1, wherein the bacterial producer and bacterial target cells are cells of the same species.

3. The method of claim 1, wherein the bacterial producer cells are *E. coli* cells.

4. The method of claim 1, wherein the transduction particles comprise a phage capsid, wherein the capsid comprises a packaged nucleic acid of interest (NSI) for transduction into bacterial target cells.

5. The method of claim 4, wherein the NSI comprises or encodes an antibacterial agent that kills bacterial target cells, or wherein the NSI comprises or encodes a component of such an agent.

6. The method of claim 5, wherein the NSI comprises a nucleotide sequence encoding a guide RNA of a CRISPR/Cas system.

7. The method of claim 1, wherein the transduction particles are phages.

8. The method of claim 1, wherein the transduction particles are non-self-replicative.

9. The method of claim 1, wherein the genome of each bacterial producer cell comprises a genetic modification that disrupts synthesis of the receptor and/or its expression as a cell surface receptor.

10. The method of claim 9, wherein the modification is a modification of a lipopolysaccharide (LPS) synthesis pathway.

11. The method of claim 1, wherein the receptor comprises an LPS.

12. The method of claim 1, wherein the yield is increased at least 10-fold compared to production in bacterial producer cells that surface-express the receptor.

13. The method of claim 12, wherein the yield is increased at least 100-fold.

14. The method of claim 12, wherein the yield is increased 10- to 1000-fold.

15. The method of claim 1, comprising isolating the transduction particles from cellular material to obtain a composition comprising the transduction particles.

16. The method of claim 15, wherein the composition comprises no bacterial producer cell LPS.

17. The method of claim 1, wherein the bacterial target cells are *Escherichia, Klebsiella, Clostridium* or *Pseudomonas* cells.

18. The method of claim 1, wherein the bacterial target cells are *E. coli, K. pneumoniae, C. difficile* or *P. aeruginosa* cells.

19. The method of claim 1, wherein the transduction particles comprise a P2 phage capsid and the receptor is a P2 receptor.

20. The method of claim 1, further comprising infecting bacterial producer cells not expressing the receptor on their surface to produce the transduction particles.

* * * * *

SEQUENCE LISTING

<160> NUMBER OF SEQ ID NOS: 20

<210> SEQ ID NO 1
<211> LENGTH: 88
<212> TYPE: DNA
<213> ORGANISM: Artificial Sequence
<220> FEATURE:
<223> OTHER INFORMATION: Primer rfaDupR

<400> SEQUENCE: 1

```
attcgtgtct gagattgtct ctgactccat aattcgaagg ttacagttat gatcatcgtt    60
gatatcgcta gctcgagcac gtgttgac                                        88
```

<210> SEQ ID NO 2
<211> LENGTH: 88
<212> TYPE: DNA
<213> ORGANISM: Artificial Sequence
<220> FEATURE:
<223> OTHER INFORMATION: Primer rfaDdnR

<400> SEQUENCE: 2

```
ccaagacggg ccgatcacca gtattttcat gcagagctct tatgcgtcgc gattcagcca    60
cgttgtaaaa cgacggccag tgccaagc                                        88
```

<210> SEQ ID NO 3
<211> LENGTH: 933
<212> TYPE: DNA
<213> ORGANISM: Escherichia coli
<220> FEATURE:
<223> OTHER INFORMATION: RfaD coding sequence

<400> SEQUENCE: 3

```
atgatcatcg ttaccggcgg cgcgggcttt atcggcagca acatcgttaa agccctgaat    60
gataaaggca tcaccgatat tctggtggtg gacaacctga agacggcac caagtttgtg    120 aacctggtgg atctggatat cgcggactat atggataagg aagacttcct gatccagatt    180
atggctggcg aagagttcgg cgatgtcgaa gcgatttttcc acgaaggtgc gtgctcttcc    240
accaccgagt gggacggcaa gtatatgatg gataacaact atcaatactc caaagagctg    300
ctgcactact gtctggagcg cgaaatcccg ttcctgtatg cctcttccgc agccacctac    360
ggcggacgca cctccgactt tattgaatcc cgcgagtacg aaaaaccgtt gaatgtctac    420
ggttactcaa aattcctgtt tgatgaatat gttcgtcaaa tcctgccaga agcgaactcg    480
cagattgttg gcttccgcta tttcaacgtt tatggaccgc gtgaaggcca taaaggcagc    540
atggcgagcg tcgctttcca tctcaacact cagcttaaca acggtgaatc gccgaagctg    600
ttcgaaggta gcgagaactt caaacgcgac ttcgtttacg taggcgacgt ggcagatgta    660
aacctgtggt tcctggaaaa tggcgtttcc ggcatcttca acctcggtac tggtcgtgcg    720
```

```
gaatccttcc aggcggtagc agatgctacg cttgcttatc acaagaaagg ccaaatcgaa      780
tacattccgt tcccggataa actgaaaggc cgctaccagg cgttcacgca ggcagatctg      840
acaaatctgc gcgcggcggg ttacgacaaa ccgttcaaaa ccgttgccga aggtgtaacg      900
gaatacatgg cttggctgaa tcgcgacgca taa                                   933
```

<210> SEQ ID NO 4
<211> LENGTH: 534
<212> TYPE: DNA
<213> ORGANISM: Artificial Sequence
<220> FEATURE:
<223> OTHER INFORMATION: Zeo marker

<400> SEQUENCE: 4

```
gatatcgcta gctcgagcac gtgttgacaa ttaatcatcg gcatagtata tcggcatagt       60
ataatacgac aaggtgagga actaaaccat ggccaagttg accagtgccg ttccggtgct      120
caccgcgcgc gacgtcgccg gagcggtcga gttctggacc gaccggctcg ggttctcccg      180
ggacttcgtg gaggacgact tcgccggtgt ggtccgggac gacgtgaccc tgttcatcag      240
cgcggtccag gaccaggtgg tgccggacaa caccctggcc tgggtgtggg tgcgcggcct      300
ggacgagctg tacgccgagt ggtcggaggt cgtgtccacg aacttccggg acgcctccgg      360
gccggccatg accgagatcg gcgagcagcc gtggggggcgg gagttcgccc tgcgcgaccc      420
ggccggcaac tgcgtgcact tcgtggccga ggagcaggac tgagaattcc cggggatcct      480
ctagagtcga cctgcaggca tgcaagcttg gcactggccg tcgttttaca acgt           534
```

<210> SEQ ID NO 5
<211> LENGTH: 18
<212> TYPE: DNA
<213> ORGANISM: Staphylococcus aureus
<220> FEATURE:
<223> OTHER INFORMATION: att site core

<400> SEQUENCE: 5

```
aaacaagaac aataatat                                                     18
```

<210> SEQ ID NO 6
<211> LENGTH: 18
<212> TYPE: DNA
<213> ORGANISM: Staphylococcus aureus
<220> FEATURE:
<223> OTHER INFORMATION: att site core

<400> SEQUENCE: 6

```
aaagaagaac aataatat                                                     18
```

<210> SEQ ID NO 7
<211> LENGTH: 18
<212> TYPE: DNA
<213> ORGANISM: Staphylococcus aureus
<220> FEATURE:
<223> OTHER INFORMATION: att site core

<400> SEQUENCE: 7

```
taattattcc cactcaat                                                     18
```

<210> SEQ ID NO 8
<211> LENGTH: 18
<212> TYPE: DNA
<213> ORGANISM: Staphylococcus aureus
<220> FEATURE:

```
<223> OTHER INFORMATION: att site core

<400> SEQUENCE: 8
taattattcc cactcgat                                                 18

<210> SEQ ID NO 9
<211> LENGTH: 15
<212> TYPE: DNA
<213> ORGANISM: Staphylococcus aureus
<220> FEATURE:
<223> OTHER INFORMATION: att site core

<400> SEQUENCE: 9
tcccgccgtc tccat                                                    15

<210> SEQ ID NO 10
<211> LENGTH: 15
<212> TYPE: DNA
<213> ORGANISM: Staphylococcus aureus
<220> FEATURE:
<223> OTHER INFORMATION: att site core

<400> SEQUENCE: 10
tcccgccgtc tccat                                                    15

<210> SEQ ID NO 11
<211> LENGTH: 15
<212> TYPE: DNA
<213> ORGANISM: Staphylococcus aureus
<220> FEATURE:
<223> OTHER INFORMATION: att site core

<400> SEQUENCE: 11
tcccgccgtc tccat                                                    15

<210> SEQ ID NO 12
<211> LENGTH: 15
<212> TYPE: DNA
<213> ORGANISM: Staphylococcus aureus
<220> FEATURE:
<223> OTHER INFORMATION: att site core

<400> SEQUENCE: 12
tcccgccgtc tccat                                                    15

<210> SEQ ID NO 13
<211> LENGTH: 17
<212> TYPE: DNA
<213> ORGANISM: Staphylococcus aureus
<220> FEATURE:
<223> OTHER INFORMATION: att site core

<400> SEQUENCE: 13
ttatttagca ggaataa                                                  17

<210> SEQ ID NO 14
<211> LENGTH: 17
<212> TYPE: DNA
<213> ORGANISM: Staphylococcus aureus
<220> FEATURE:
<223> OTHER INFORMATION: att site core

<400> SEQUENCE: 14
ttatttagca ggaataa                                                  17
```

```
<210> SEQ ID NO 15
<211> LENGTH: 17
<212> TYPE: DNA
<213> ORGANISM: Staphylococcus aureus
<220> FEATURE:
<223> OTHER INFORMATION: att site core

<400> SEQUENCE: 15
ttatttagca ggaataa                                                    17

<210> SEQ ID NO 16
<211> LENGTH: 22
<212> TYPE: DNA
<213> ORGANISM: Staphylococcus aureus
<220> FEATURE:
<223> OTHER INFORMATION: att site core

<400> SEQUENCE: 16
gttttaccat cattcccggc at                                              22

<210> SEQ ID NO 17
<211> LENGTH: 21
<212> TYPE: DNA
<213> ORGANISM: Staphylococcus aureus
<220> FEATURE:
<223> OTHER INFORMATION: att site core

<400> SEQUENCE: 17
attttacatc attcctggca t                                               21

<210> SEQ ID NO 18
<211> LENGTH: 21
<212> TYPE: DNA
<213> ORGANISM: Staphylococcus aureus
<220> FEATURE:
<223> OTHER INFORMATION: att site core

<400> SEQUENCE: 18
atgccaggta tgatgtaaaa c                                               21

<210> SEQ ID NO 19
<211> LENGTH: 21
<212> TYPE: DNA
<213> ORGANISM: Staphylococcus aureus
<220> FEATURE:
<223> OTHER INFORMATION: att site core

<400> SEQUENCE: 19
gttttacatc attcctggca t                                               21

<210> SEQ ID NO 20
<211> LENGTH: 43
<212> TYPE: DNA
<213> ORGANISM: Staphylococcus aureus
<220> FEATURE:
<223> OTHER INFORMATION: att site core

<400> SEQUENCE: 20
gttttaccat cattcccggc atgtttttaca tcattcctgg cat                      43
```